US009244800B2

(12) United States Patent
Nakajima et al.

(10) Patent No.: US 9,244,800 B2
(45) Date of Patent: Jan. 26, 2016

(54) MANAGEMENT SYSTEM FOR MANAGING COMPUTER SYSTEM COMPRISING MULTIPLE MONITORING-TARGET DEVICES

(75) Inventors: Jun Nakajima, Yokohama (JP); Masataka Nagura, Yokohama (JP)

(73) Assignee: HITACHI, LTD., Tokyo (JP)

( * ) Notice: Subject to any disclaimer, the term of this patent is extended or adjusted under 35 U.S.C. 154(b) by 406 days.

(21) Appl. No.: 13/991,671

(22) PCT Filed: Sep. 3, 2012

(86) PCT No.: PCT/JP2012/072310
§ 371 (c)(1),
(2), (4) Date: Jun. 5, 2013

(87) PCT Pub. No.: WO2014/033945
PCT Pub. Date: Mar. 6, 2014

(65) Prior Publication Data
US 2014/0068343 A1 Mar. 6, 2014

(51) Int. Cl.
G06F 11/00 (2006.01)
G06F 11/30 (2006.01)
G06F 11/07 (2006.01)
G06F 11/22 (2006.01)
G06F 11/14 (2006.01)

(52) U.S. Cl.
CPC .......... G06F 11/3051 (2013.01); G06F 11/079 (2013.01); G06F 11/0727 (2013.01); *G06F 11/0793* (2013.01); *G06F 11/1484* (2013.01); *G06F 11/2257* (2013.01)

(58) Field of Classification Search
CPC combination set(s) only.
See application file for complete search history.

(56) References Cited

U.S. PATENT DOCUMENTS

| 6,108,748 | A | 8/2000 | Ofek et al. |
| 7,107,185 | B1 | 9/2006 | Yemini et al. |
| 2004/0025077 | A1* | 2/2004 | Salem ................. G06F 11/0748 714/2 |
| 2010/0023798 | A1* | 1/2010 | Meijer ................ G06F 11/0709 714/2 |
| 2010/0325493 | A1 | 12/2010 | Morimura et al. |
| 2014/0058717 | A1* | 2/2014 | Fukumoto ............. G06F 3/0605 703/21 |

FOREIGN PATENT DOCUMENTS

| JP | 05-114899 A | 5/1993 |
| JP | 3645270 A | 2/2005 |
| JP | 2005-339015 A | 8/2005 |
| JP | 2010-086115 A | 4/2010 |

(Continued)

*Primary Examiner* — Bryce Bonzo
*Assistant Examiner* — India Davis
(74) *Attorney, Agent, or Firm* — Volpe and Koenig, P.C.

(57) ABSTRACT

A management system manages a computer system including multiple monitoring-target devices. A storage device of the management system stores a general rule, general plan information, unresolved information, and configuration information. A control device of the management system creates multiple expanded rules based on the general rule and the configuration information, and if an event related to any of the multiple monitoring-target devices has occurred, identifies, based on the multiple expanded rules, a first conclusion event constituting a candidate for the cause of the occurred event, creates, based on the general plan information, one or more expanded plans, which are recovery plans that can be implemented if the first conclusion event is a cause, identifies an unresolved event based on the unresolved information, identifies a risk site based on the identified unresolved event, and displays data showing the first conclusion event, expanded plan, and risk site.

15 Claims, 44 Drawing Sheets

(56) References Cited

FOREIGN PATENT DOCUMENTS

| | | |
|---|---|---|
| JP | 2010-182044 A | 8/2010 |
| JP | 2012-022614 A | 2/2012 |
| JP | 2012-059063 A | 3/2012 |

* cited by examiner

Fig. 8

| | | Event ID | Apparatus type | Apparatus component type | Metrics | Status |
|---|---|---|---|---|---|---|
| 11921 | Condition part | 1 | Host computer | Drive | Response time | Threshold abnormality |
| | | 2 | Storage apparatus | LV | Response time | Threshold abnormality |
| | | 3 | Storage apparatus | Pool | Response time | Threshold abnormality |
| 11922 | Conclusion part | | Storage apparatus | Pool | Response time | Bottleneck |
| 11923 | General rule ID | Rule1 | | | | |
| 11924 | Applied topology | Configuration information table | | | | |

Fig. 9

| General plan ID | Plan |
|---|---|
| Plan1 | Volume Migration |
| Plan2 | Change Tier Policy |
| Plan3 | Reboot Host |
| Plan4 | Change storage port bandwidth |
| Plan5 | Add disk to pool |
| Plan6 | VM migration |
| Plan7 | Change switch port setting |
| Plan8 | Replace storage port |
| Plan9 | Replace switch |
| Plan10 | Storage vMotion migration |
| Plan11 | Inter-enclosure Volume Migration |
| ... | ... |

Fig. 10

| General rule ID | General plan ID | Unresolved event ID |
|---|---|---|
| Rule1 | Plan1 | 3 |
|  | Plan5 | NONE |
| Rule2 | Plan2 | 5 |
|  | Plan3 | 1, 3, 4 |

Fig. 11

| | Event ID | Apparatus ID | Apparatus component ID | Metrics | Status |
|---|---|---|---|---|---|
| Condition part | 1 | Physical server A | /var | Response time | Threshold abnormality |
| | 2 | Storage apparatus A | LV2 | Response time | Threshold abnormality |
| | 3 | Storage apparatus A | POOL1 | Response time | Threshold abnormality |
| Conclusion part | | Storage apparatus A | POOL1 | Response time | Bottleneck |
| Expanded rule ID | ExRule1-1 | | | | |
| Pre-expansion general rule ID | Rule1 | | | | |

Fig. 12A

| | Expanded plan ID | Plan target | | | | | | Risk site |
|---|---|---|---|---|---|---|---|---|
| | | Migration-target volume | | Migration-source pool | | Migration-destination pool | | |
| | | Volume ID | I/O Response Time prediction | Pool ID | I/O Response Time prediction | Pool ID | I/O Response Time prediction | |
| Plan details | ExPlan 1-1 | LV2 | 2.5 (msec) | Pool1 | 3 (msec) | Pool 2 | 2.5 (msec) | /opt |
| | ExPlan 1-2 | LV2 | 4 (msec) | Pool1 | 3 (msec) | Pool 3 | 2 (msec) | /opt |
| | ExPlan 1-3 | LV2 | 3 (msec) | Pool1 | 3 (msec) | Pool 4 | 3 (msec) | /opt |
| General plan ID | Plan1 | | | | | | | |
| Expanded rule ID | ExRule1-1 | | | | | | | |

Fig. 12B

| | Expanded plan ID | Plan target | | | Risk site |
|---|---|---|---|---|---|
| | | Pool ID | Added disk | I/O ResponseTime prediction | |
| Plan details | ExPlan5-1 | Pool1 | Disk3 | 1(msec) | - |
| | ExPlan5-2 | Pool1 | Disk4 | 1.5(msec) | - |
| | ExPlan5-3 | Pool1 | Disk5 | 2(msec) | - |
| General plan ID | Plan5 | | | | |
| Expanded rule ID | ExRule1-1 | | | | |

Fig. 13

| Cause apparatus ID | Cause component ID | Metrics | Certainty factor | Expanded rule ID | Received event ID |
|---|---|---|---|---|---|
| Storage A | POOL1 | Response time | 3/3 | ExRule1-1 | EV2 |
| | | | | | EV3 |
| | | | | | EV5 |
| Storage A | LV2 | Response time | 2/3 | ExRule2-1 | EV3 |
| | | | | | EV5 |
| Physical server A | S2 | Operating rate | 1/4 | ExRule3-1 | EV5 |
| ⋮ | ⋮ | ⋮ | ⋮ | ⋮ | ⋮ |

Fig. 20

List of plans (9000)

9001

| # | Failure cause | | | | Candidate Plans | | Cost ($) | Down time | Performance | Risk site |
|---|---|---|---|---|---|---|---|---|---|---|
| | Apparatus | Apparatus component | Cause | Certainty factor | | | | | | |
| 1 | Storage A | POOL1 | Response time down | ☆☆☆ | 1 | VolumeMigration Target: LV2 POOL1→POOL2 | $10 | 3hr | LV: 2.5(msec) | Physical server A, /opt |
| | | | | | 2 | VolumeMigration Target: LV2 POOL1→POOL3 | $10 | 4hr | LV: 4(msec) | Physical server A, /opt |
| | | | | | 3 | VolumeMigration Target: LV2 POOL1→POOL4 | $10 | 4hr | LV: 3(msec) | Physical server A, /opt |
| | | | | | 4 | Add disk to POOL Target: POOL1, Disk3 | $100 | 1day | POOL: 1(msec) | - |
| | | | | | 5 | Add disk to POOL Target: POOL1, Disk4 | $100 | 1day | POOL: 1.5(msec) | - |
| | | | | | 6 | Add disk to POOL Target: POOL1, Disk5 | $100 | 1day | POOL: 2(msec) | - |
| 2 | ... | ... | ... | ... | 1 | ... | ... | ... | ... | ... |
| | | | | | 2 | ... | ... | ... | ... | ... |

[Plan details] (9002)  [Execute plan] (9003)

Fig. 26

| Physical server | Drive | Server data I/F | Switch information | | | Storage | Storage data I/F | Logical volume | Disk pool |
|---|---|---|---|---|---|---|---|---|---|
| | | | Switch | Switch data I/F IN | Switch data I/F OUT | | | | |
| Physical server A | /opt | Data I/F S1 | - | - | - | Storage A | Data I/F P1 | Logical volume LV1 | Pool POOL 1 |
| Physical server A | /var | Data I/F S2 | Switch B | Data I/F R10 | Data I/F R11 | Storage A | Data I/F P2 | Logical volume LV2 | Pool POOL 1 |
| | | | Switch C | Data I/F R20 | Data I/F R21 | | | | |
| - | - | - | - | - | - | - | - | Logical volume LV3 | Pool POOL 2 |
| - | - | - | - | - | - | - | - | Logical volume LV4 | Pool POOL 2 |
| VM1 | E: | Data I/F S3 | Switch A | Data I/F R1 | Data I/F R2 | Storage B | Data I/F P3 | Logical volume LV10 | Pool POOL 3 |
| VM2 | F: | Data I/F S3 | Switch A | Data I/F R1 | Data I/F R2 | Storage B | Data I/F P3 | Logical volume LV11 | Pool POOL 3 |
| VM3 | D: | Data I/F S4 | Switch D | Data I/F R5 | Data I/F R6 | Storage B | Data I/F P4 | Logical volume LV12 | Pool POOL 4 |

Fig. 27

| Virtual server | Power | Physical Server | Server data I/F |
|---|---|---|---|
| VM1 | OFF | Physical Server B | Data I/F S3 |
| VM2 | ON | | |
| VM3 | ON | Physical Server C | Data I/F S4<br>Data I/F S5<br>Data I/F S6 |

| Apparatus ID | Device ID | Metrics | Equipment OS | Performance value | Alert execution threshold | Threshold type | Status |
|---|---|---|---|---|---|---|---|
| Storage B | Data I/F P3 | Operating rate | - | 40(%) | 20(%) | Upper limit | Threshold abnormality |
| | Data I/F P4 | Operating rate | - | 60(%) | 80(%) | Upper limit | Normal |
| | LV10 | I/Os per unit of time | - | 300 (IOPS) | 1000 (IOPS) | Upper limit | Normal |
| | LV11 | I/Os per unit of time | - | 400 (IOPS) | 1000 (IOPS) | Upper limit | Normal |
| | LV12 | I/Os per unit of time | - | 400 (IOPS) | 1000 (IOPS) | Upper limit | Normal |
| | POOL3 | I/Os per unit of time | - | 700 (IOPS) | 5000 (IOPS) | Upper limit | Normal |
| | POOL4 | I/Os per unit of time | - | 0 (IOPS) | 5000 (IOPS) | Upper limit | Normal |
| VM1 | E: | Response time | Windows | 5(msec) | 10(msec) | Upper limit | Normal |
| VM2 | F: | Response time | Windows | 5(msec) | 10(msec) | Upper limit | Normal |
| VM3 | D: | Response time | Windows | 5(msec) | 10(msec) | Upper limit | Normal |
| Hypervisor B | - | I/Os per unit of time | - | 5(msec) | 10(msec) | Upper limit | Normal |
| Hypervisor C | - | I/Os per unit of time | - | 5(msec) | 10(msec) | Upper limit | Normal |
| Switch A | Data I/F R3 | Transferred I/Os | - | 400 (IOPS) | 1000 (IOPS) | Upper limit | Normal |
| Switch B | Data I/F R5 | Transferred I/Os | - | 400 (IOPS) | 1000 (IOPS) | Upper limit | Normal |
| ... | ... | ... | ... | ... | ... | ... | ... |

Fig. 30A

| | Event ID | Apparatus type | Apparatus component type | Metrics | Status |
|---|---|---|---|---|---|
| Condition part | 1 | Host computer (VM) | Drive | Response time | Threshold abnormality |
| | 2 | Switch | Data I/F | Transferred I/Os | Threshold abnormality |
| | 3 | Storage | Data I/F | Transferred I/Os | Threshold abnormality |
| Conclusion part | | Storage | Data I/F | Transferred I/Os | Bottleneck |
| General rule ID | Rule3 | | | | |
| Applied topology | Configuration information table | | | | |

Fig. 30B

| | Event ID | Apparatus type | Apparatus component type | Metrics | Status |
|---|---|---|---|---|---|
| Condition part | 1 | Host computer (virtual server) | Drive | Response time | Threshold abnormality |
| | 2 | Switch | Data I/F | Transferred I/Os | Threshold abnormality |
| Conclusion part | | Switch | Data I/F | Transferred I/Os | Bottleneck |
| General rule ID | Rule4 | | | | |
| Applied topology | Configuration information table | | | | |

Fig. 31

| General rule ID | General plan ID | Unresolved event ID |
|---|---|---|
| Rule3 | Plan1 | 2 |
|  | Plan6 | 2, 3 |
|  | ... | ... |
| Rule4 | Plan6 | 2 |
|  | ... | ... |

Fig. 32A

Table 11950:

| | Event ID | Apparatus ID | Apparatus component ID | Metrics | Status |
|---|---|---|---|---|---|
| Condition part (11951) | 1 | VM2 | F: | Response time | Threshold abnormality |
| | 2 | Switch A | Data I/F R3 | Transferred I/Os | Threshold abnormality |
| | 3 | Switch A | Data I/F R4 | Transferred I/Os | Threshold abnormality |
| | 4 | Storage B | Data I/F P3 | Transferred I/Os | Threshold abnormality |
| Conclusion part (11952) | | Storage B | Data I/F P3 | Transferred I/Os | Bottleneck |
| Expanded rule ID (11953) | | ExRule3-1 | | | |
| Pre-expansion general rule ID (11954) | | Rule3 | | | |

Fig. 32B

Table 11950:

| | Event ID | Apparatus ID | Apparatus component ID | Metrics | Status |
|---|---|---|---|---|---|
| Condition part (11951) | 1 | VM2 | F: | Response time | Threshold abnormality |
| | 2 | Switch A | Data I/F R3 | Transferred I/Os | Threshold abnormality |
| | 3 | Switch A | Data I/F R4 | Transferred I/Os | Threshold abnormality |
| Conclusion part (11952) | | Switch A | Switch A | Transferred I/Os | Bottleneck |
| Expanded rule ID (11953) | | ExRule4-1 | | | |
| Pre-expansion general rule ID (11954) | | Rule4 | | | |

Fig. 33A

| | Expanded plan ID | Plan target | | | | | | Risk site |
|---|---|---|---|---|---|---|---|---|
| | | Migration-target volume | | Migration-source pool | | Migration-destination pool | | |
| | | 11965A | 11965B | 11966A | 11966B | 11967A | 11967B | |
| Plan details | ExPlan 1-1 | LV2 | 2.5 (msec) | Pool 1 | 3 (msec) | Pool 2 | 2.5 (msec) | E: |
| | ExPlan 1-2 | LV2 | 4 (msec) | Pool 1 | 3 (msec) | Pool 3 | 2 (msec) | E: |
| | ExPlan 1-3 | LV2 | 3 (msec) | Pool 1 | 3 (msec) | Pool 4 | 3 (msec) | E: |
| General plan ID | Plan1 | | | | | | | |
| Expanded rule ID | ExRule3-1 | | | | | | | |

Fig. 33B

| | Expanded plan ID | Plan target | | | | | | Risk site |
|---|---|---|---|---|---|---|---|---|
| | | Target VM | | Migration source | | Migration destination | | |
| | | 1196BA | 1196BB | 1196CA | 1196CB | 1196DA | 1196DB | |
| | | ID | Performance | ID | Performance | ID | Performance | |
| Plan details | ExPlan 6-1 | VM 2 | 4 (msec) | Hypervisor B | 4 (msec) | Hypervisor C | 4 (msec) | E: |
| | ExPlan 6-2 | VM 2 | 5 (msec) | Hypervisor B | 4 (msec) | Hypervisor D | 6 (msec) | E: |
| General plan ID | Plan6 | | | | | | | |
| Expanded rule ID | ExRule3-1 | | | | | | | |

Fig. 33C

| | Expanded plan ID | Plan target | | | | | | Risk site |
|---|---|---|---|---|---|---|---|---|
| | | Target VM | | Migration source | | Migration destination | | |
| | | ID | Performance | ID | Performance | ID | Performance | |
| Plan details | ExPlan 6-3 | VM 2 | 4 (msec) | Hypervisor B | 4 (msec) | Hypervisor C | 4 (msec) | E: |
| | ExPlan 6-4 | VM 2 | 5 (msec) | Hypervisor B | 4 (msec) | Hypervisor D | 6 (msec) | E: |
| General plan ID | Plan6 | | | | | | | |
| Expanded rule ID | ExRule4-1 | | | | | | | |

Fig. 34

| Cause apparatus ID | Cause component ID | Metrics | Certainty factor | Expanded rule ID | Received event ID |
|---|---|---|---|---|---|
| Storage B | Data I/F P3 | Transferred I/Os | 4/4 | ExRule3-1 | EV1 |
| | | | | | EV2 |
| | | | | | EV3 |
| | | | | | EV5 |
| Switch A | Data I/F R3 | Transferred I/Os | 3/3 | ExRule4-1 | EV2 |
| | | | | | EV3 |
| | | | | | EV5 |
| : | : | : | : | : | : |

Fig. 39

| General rule ID | General plan ID | Unresolved event ID |
|---|---|---|
| Rule4 | Plan6 | 2 |
|  | Plan9 | NONE |
|  | ... | ... |
| ... | ... | ... |

Fig. 40A

| | Expanded plan ID | Plan target | | | | | | Risk site |
|---|---|---|---|---|---|---|---|---|
| | | Target VM | | Before migration | | After migration | | |
| | | ID | Performance | ID | Performance | ID | Performance | |
| Plan details | ExPlan 6-3 | VM 2 | 4 (msec) | Hypervisor B | 4 (msec) | Hypervisor C | 4 (msec) | E: |
| | ExPlan 6-4 | VM 2 | 5 (msec) | Hypervisor B | 4 (msec) | Hypervisor D | 6 (msec) | E: |
| General plan ID | Plan6 | | | | | | | |
| Expanded rule ID | ExRule4-1 | | | | | | | |

Fig. 40B

| | Expanded plan ID | Plan target | |
|---|---|---|---|
| | | Replacement-target switch | Cost |
| Plan details | ExPlan9-1 | Switch A | $20K |
| General plan ID | Plan9 | | |
| Expanded rule ID | ExRule4-1 | | |

| Apparatus | Apparatus component | Replacement reason | Replacement date/time | Affected service | Cost |
|---|---|---|---|---|---|
| Switch A | Switch A | Replace | 2012-06-30 24:00 | Service 1-100 | $20K |
| Storage B | Disk 100 | Warranty expiration | 2012-07-07 24:00 | Service 20-30 | $20 |
| Storage B | Disk 101 | Warranty expiration | 2012-07-07 24:00 | Service1 20-30 | $20 |
| Storage B | Controller 3 | Replace | 2012-07-08 12:00 | Service1 31-50 | $10K |
| Network 1 | Fibre cable 002 | Error rate | 2012-07-15 12:00 | - | $8 |

MANAGEMENT SYSTEM FOR MANAGING COMPUTER SYSTEM COMPRISING MULTIPLE MONITORING-TARGET DEVICES

TECHNICAL FIELD

The present invention, for example, relates to technology for managing a computer system comprising monitoring-target devices, such as a host computer, a network switch, and a storage apparatus.

BACKGROUND ART

In the management of a computer system, the use of Event Correlation technology or another such technology for identifying the cause of an event-based failure makes it possible for the administrator of the computer system to detect the cause of a failure, which has occurred in the computer system (refer to Patent Literature 1).

There exists technology in which an analysis engine for analyzing the causal relationship between multiple failure events, which have occurred in a machine that is under management, applies a general rule, which comprises a predetermined condition statement and conclusion statement, to an event related to the machine under management, for example, an event in which a performance value exceeds a prescribed threshold, to create an expanded rule comprising a conclusion event, which is the cause of a drop in performance, and a condition event group caused thereby, and identifies the failure based on the created expanded rule (refer to Patent Literature 2).

There are numerous useful methods capable of being implemented in recent computer systems as recovery methods with respect to the cause of a failure identified in accordance with cause analysis, and, for example, there is a method for recovering from a failure by performing an appropriate data migration at system resource (virtual machine, data) allocation. As data migration technology in an environment in which multiple virtual host computers (that is, virtual machines, hereinafter called "VM") are running on a physical host computer, for example, technology (first VM migration) for transferring a VM operating environment from a certain physical host computer to another physical host computer, and technology (second VM migration) for migrating a VM stored in a certain storage area to another storage area, in accordance with information denoting VM performance and resource utilization information are known. Here, the VM is a type of data stored in a storage area, and the VM migration (the first VM migration and the second VM migration) is a type of data migration between storage areas. Data migration technology (volume migration) between data storage areas (volumes) in a storage apparatus is also known (refer to Patent Literature 3).

CITATION LIST

Patent Literature

[PTL 1]
U.S. Pat. No. 7,107,185 (Description)
[PTL 2]
Japanese Patent Application Laid-open No. 2010-86115
[PTL 3]
U.S. Pat. No. 6,108,748 (Description)

SUMMARY OF INVENTION

Technical Problem

When dealing with a failure identified using Event Correlation technology such as that of Patent Literature 1, the administrator does not specifically know which method should be implemented to recover from the failure, and recovering from the failure is costly.

In order to deal with a failure identified using the Event Correlation technology, cases can exists in which a variety of plans are capable of being implemented, such as a plan for recovering from the failure cause itself, and a plan that places the highest priority on resuming a business operation, which was affected by the failure cause. For example, in the case of a drop in performance in business responses resulting from a performance failure in a storage port, there is a plan for migrating the business operation to another server (for example, a plan related to the VM migration) so as not to use the failed port, and a plan for replacing the port.

In the case of an action, which has implemented a plan that does not achieve recovery from the failure cause itself, the administrator does not know what problems remain in what parts of the computer system although the risk of a failure arising from the failure cause could continue to exist even after the plan has been executed. Thus, in a case where the risk of a failure is likely to remain, the administrator could unintentionally select a plan that does not achieve recovery from the failure cause itself (for example, a plan that places the highest priority on resuming business operations).

Solution to Problem

A management system manages a computer system comprising multiple monitoring-target devices. A storage device of the management system stores: a general rule, which shows a corresponding relationship between one or more condition events, which are related to any of the multiple monitoring-target devices, and a conclusion event, which is related to any of the multiple monitoring-target devices and constitutes a cause in a case where the one or more condition events have occurred, this general rule moreover denoting a monitoring-target device related to the condition event and the conclusion event according to the relevant monitoring-target device type; general plan information, which shows a corresponding relationship between the general rule and one or more general plans, which are recovery plans available in a case where the conclusion event of the general rule is a cause; unresolved information, which shows, for each combination of the general rule and the general plan, a condition event of the relevant general rule that remains unresolved in a case where the relevant general plan has been implemented; and configuration information, which shows a coupling relationship between the multiple monitoring-target devices, wherein the control device: creates, based on the general rule and the configuration information, multiple expanded rules, which denote, by means of data showing an identified monitoring-target device, the type of monitoring-target device related to the condition event and the conclusion event; performs, based on the created multiple expanded rules in a case where an event related to any of the multiple monitoring-target devices has occurred, a cause analysis by regarding the occurred event as the condition event, and identifies a first conclusion event, which constitutes a candidate for the cause of the occurred event; creates, based on the general plan information, one or more expanded plans, which are recovery plans that can be implemented in a case where the first conclusion event is a cause, and expand, by taking into account the actual configuration of the computer system, a general plan corresponding to the general rule, which constitutes the basis of an expanded rule comprising the first conclusion event; identifies, based on the unresolved information for each of the created one or more expanded plans, an unresolved event, which remains unresolved in a case where the relevant expanded plan has been implemented, and identifies, based on the identified unresolved event, a risk site, which is a monitoring-target device for which a problem remains even after the relevant expanded plan has been implemented; and displays data showing the first conclusion event, the created one or more expanded plans, and the identified risk site.

BRIEF DESCRIPTION OF DRAWINGS

FIG. 8 is a constitutional diagram of an example of a general rule table related to Example 1.

FIG. 9 is a constitutional diagram of an example of a general plan table related to Example 1.

FIG. 10 is a constitutional diagram of an example of a rule-plan association table related to Example 1.

FIG. 11 is a constitutional diagram of an example of an expanded rule table related to Example 1.

FIG. 12A is a first constitutional diagram of an expanded plan table related to Example 1.

FIG. 12B is a second constitutional diagram of an expanded plan table related to Example 1.

FIG. 13 is a constitutional diagram of an example of an analysis result management table related to Example 1.

FIG. 20 is a constitutional diagram of an example of a plan presentation screen related to Example 1.

FIG. 26 is a constitutional diagram of an example of a configuration information table related to Example 2.

FIG. 27 is a constitutional diagram of an example of a VM configuration information table related to Example 2.

FIG. 28 is a constitutional diagram of an example of a performance information table related to Example 2.

FIG. 30A is a first constitutional diagram of a general rule table related to Example 2.

FIG. 30B is a second constitutional diagram of a general rule table related to Example 2.

FIG. 31 is a constitutional diagram of an example of a rule-plan association table related to Example 2.

FIG. 32A is a first constitutional diagram of an expanded rule table related to Example 2.

FIG. 32B is a second constitutional diagram of an expanded rule table related to Example 2.

FIG. 33A is a first constitutional diagram of an expanded plan table related to Example 2.

FIG. 33B is a second constitutional diagram of an expanded plan table related to Example 2.

FIG. 33C is a third constitutional diagram of an expanded plan table related to Example 2.

FIG. 34 is a constitutional diagram of an example of an analysis result management table related to Example 2.

FIG. 39 is a constitutional diagram of an example of a rule-plan association table related to Example 3.

FIG. 40A is a first constitutional diagram of an expanded plan table related to Example 3.

FIG. 40B is a second constitutional diagram of an expanded plan table related to Example 3.

DESCRIPTION OF EMBODIMENTS

Figure 1:
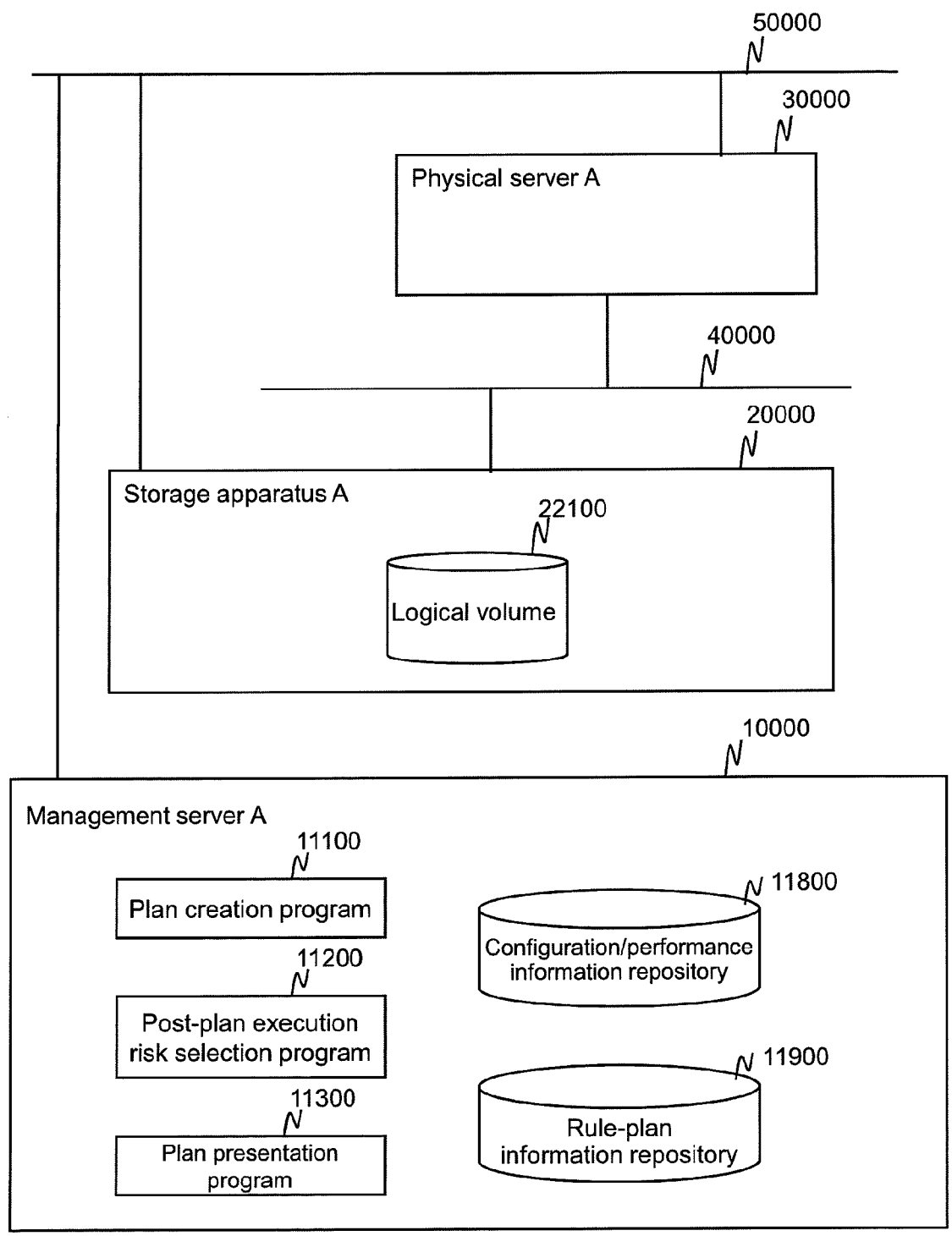
FIG. 1 is a constitutional diagram of an example of a computer system related to Example 1.

A number of examples will be explained by referring to the drawings. Furthermore, the examples explained below do not limit the invention related to the claims, and not all of the elements and combinations thereof explained in the examples are essential for the solution provided by the invention. In the drawings, the same reference signs denote the same components throughout the multiple drawings. In the following explanation, information on the present invention is explained using the expression "aaa table", but this information may also be expressed using a data structure other than a table. Thus, to show that the information is not dependent on the data structure, "aaa table" may be called "aaa information". In addition, when explaining the contents of the respective information, the expressions "identification information", "identifier", "name" and "ID" are used, but these expressions are interchangeable.

In the following explanation, there may be cases where an explanation is given using a "program" as the doer of the action, but since the defined processing is performed in accordance with a program being executed by a processor while using a memory and a communication port (a communication device, a management I/F, and a data I/F), the explanation may also give the processor as the doer of the action. A process, which is disclosed as having a program as the doer of the action, may be regarded as a process performed by a management server or other such computer, and an information processing apparatus. Furthermore, either all or a portion of a program may be realized in accordance with dedicated hardware. Various types of programs may be installed in respective computers using a program delivery server or computer-readable storage media.

Hereinafter, a set of one or more computers, which manage the computer system and display the display information of the present invention may be called a management system. In a case where a management server displays the display information, the management server is the management system, and a combination of a management server and a display computer is also the management system. Furthermore, processing similar to that of the management server may be realized using multiple computers to increase the speed and reliability of management processing, and in this case, the relevant multiple computers (to include a display computer in a case where a display computers carries out displays) is the management system.

Example 1

First, a computer system related to Example 1 will be explained.

FIG. 1 is a constitutional diagram of an example of a computer system related to Example 1.

The computer system related to Example 1 comprises one or more management servers 10000 (management server A in FIG. 1), one or more storage apparatuses 20000 (storage apparatus A in FIG. 1), and one or more physical servers 30000 (physical server A in FIG. 1). The physical server 30000 and the storage apparatus 20000 are coupled together via a SAN (Storage Area network) 40000 (specifically, a fibre channel). The management server 10000, the storage apparatus 20000, and the physical server 30000 are coupled together via a management network 50000.

Figure 2:
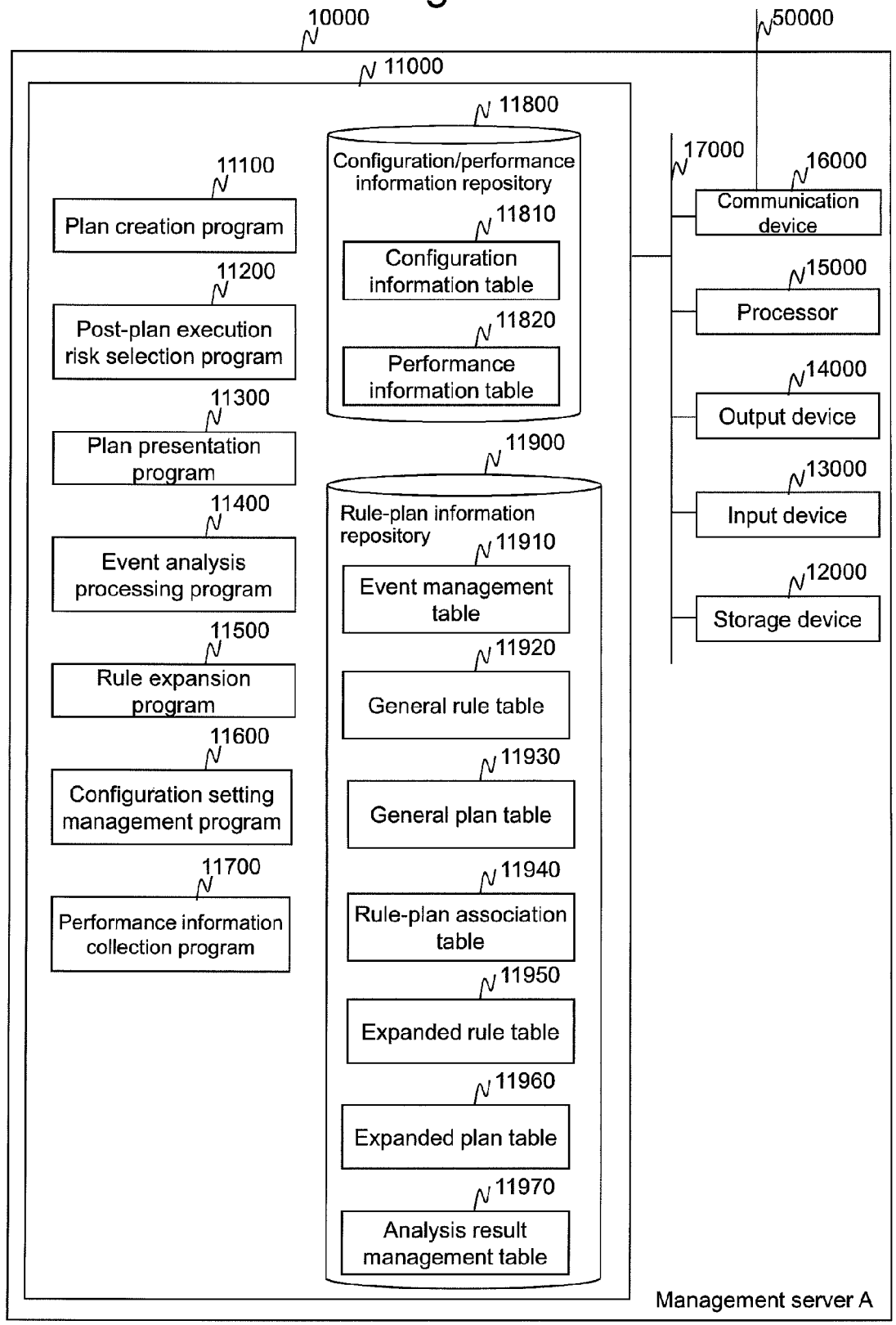
FIG. 2 is a constitutional diagram of an example of a management server related to Example 1.

The management server 10000 stores a plan creation program 11100, a post-plan execution risk selection program 11200, a plan presentation program 11300, a configuration/performance information repository 11800, and a rule-plan information repository 11900 in a memory 11000 (refer to FIG. 2). The management server 10000 is able to communicate with a program running on the storage apparatus 20000 and the physical server 30000 via the management network 50000.

One or more logical volumes 22100 are prepared in the storage apparatus 20000. The logical volume 22100, for example, is provided to the physical server 30000. In the example shown in FIG. 1, the storage apparatus A provides the logical volume 22100 to the physical server A.

The physical server 30000 executes various business operations using the logical volume 22100 provided from the storage apparatus 20000. In the example shown in FIG. 1, the physical server A and the storage apparatus A are coupled together via the SAN 40000.

In the example shown in FIG. 1, the management server 10000 stores programs, such as the plan creation program 11100, the post-plan execution risk selection program 11200, and the plan presentation program 11300, but the constitution of the computer system is not limited thereto. For example, either the storage apparatus 20000 or the physical server 30000 may store a variety of programs, and another apparatus, such as a switch (not shown in the drawing) installed between the respective apparatuses, may also store various programs. The connection between the storage apparatus 20000 and the physical server 30000 is not limited to a direct connection via a fibre channel, and the storage apparatus 20000 and the physical server 30000 may be coupled via network equipment, such as one or more fibre channel switches. The connection between the storage apparatus 20000 and the physical server 30000 is a data communication network, and, for example, may be an IP (Internet Protocol) network.

FIG. 2 is a constitutional diagram of an example of the management server related to Example 1.

The management server 10000 comprises a memory 11000, a storage device 12000, an input device 13000, an output device 14000, a processor 15000, and a communication device 16000, and these elements are coupled together via an internal path or other such communication channel 17000.

The memory 11000 stores the plan creation program 11100, the post-plan execution risk selection program 11200, the plan presentation program 11300, an event analysis processing program 11400, a rule expansion program 11500, a configuration setting management program 11600, a performance information collection program 11700, the configuration/performance information repository 11800, and the rule-plan information repository 11900.

A configuration information table 11810 and a performance information table 11820 are stored in the configuration/performance information repository 11800. An event management table 11910, one or more general rule tables 11920, a general plan table 11930, a rule-plan association table 11940, one or more expanded rule tables 11950, one or more expanded plan tables 11960, and an analysis result management table 11970 are stored in the rule-plan information repository 11900.

The configuration information table 11810 manages information showing an apparatus and a device that exist on an I/O (input/output) route from the physical server 30000 to a physical disk, which configures the logical volume 22100 used by the physical server 30000, that is, information (hereinafter referred to as "configuration information") showing the coupling relationship of the apparatus and the device based on the I/O route.

The performance information table 11820 manages performance information with respect to monitoring-target apparatuses coupled to the SAN 40000 and the devices in the monitoring-target apparatuses (monitoring-target devices).

The event management table 11910 manages information showing when an event occurred in relation to what type of metrics for which device in the computer system.

The general rule table 11920 manages a general rule showing the corresponding relationship between one or more condition events capable of occurring in the computer system and a conclusion event, which is regarded as the cause of a failure with respect to the one or more condition events.

The general plan table 11930 manages information showing a recovery plan capable of being implemented in the computer system with respect to a failure.

The rule-plan association table 11940 manages information (general plan information) denoting the corresponding relationship between the general rule and a general plan, which represents a recovery plan corresponding to the relevant general rule, that is, a recovery plan capable of being implemented in a case where the conclusion event of the relevant general rule is the cause of the failure, and information (unresolved information) denoting which of the failure events in the general rule remains unresolved after the respective general plans have been executed.

The expanded rule table 11950 stores information (an expanded rule), which embodies the information of the general rule table 11920 based on the information of the configuration information table 11810.

The expanded plan table 11960 manages information (an expanded plan), which embodies the information of the general plan table 11930 based on the information of the configuration information table 11810 and the performance information table 11820.

The analysis result management table 11970 stores information related to an apparatus and a device in which an event judged to be the cause of a failure has occurred, and a failure event judged to be the cause thereof.

The storage device 12000 is an HDD (Hard Disk Drive), SSD (Solid State Drive) or the like for storing information. The input device 13000 is a device for the administrator to input an indication to the management server 10000, and, for example, is a keyboard. The output device 14000 is a device for outputting the result of processing executed by the management server 10000, for example, the result of the execution of the plan presentation program 11300, and, for example, is a display. The processor 15000 executes a program deployed on the memory 11000. The communication device 16000 is a device for coupling to the management network 50000.

In the example shown in FIG. 2, various programs and tables are stored in the memory 11000, but these programs and tables may be stored in either the storage device 12000 or another storage medium (not shown in the drawing). In accordance with this, at program execution, the processor 15000 reads a target program on the memory 11000, and executes the program that has been read. Also, the above-mentioned programs and tables may be stored in either the memory 21000 of the storage apparatus 20000 (refer to FIG. 3) or the memory 31000 of the physical server 30000 (refer to FIG. 4), and either the storage apparatus 20000 or the physical server 30000 may execute a stored program. Another apparatus, such as another physical server 30000 or a switch (not shown in the drawing) may store the above-mentioned programs and tables, and may execute a stored program.

Figure 3:
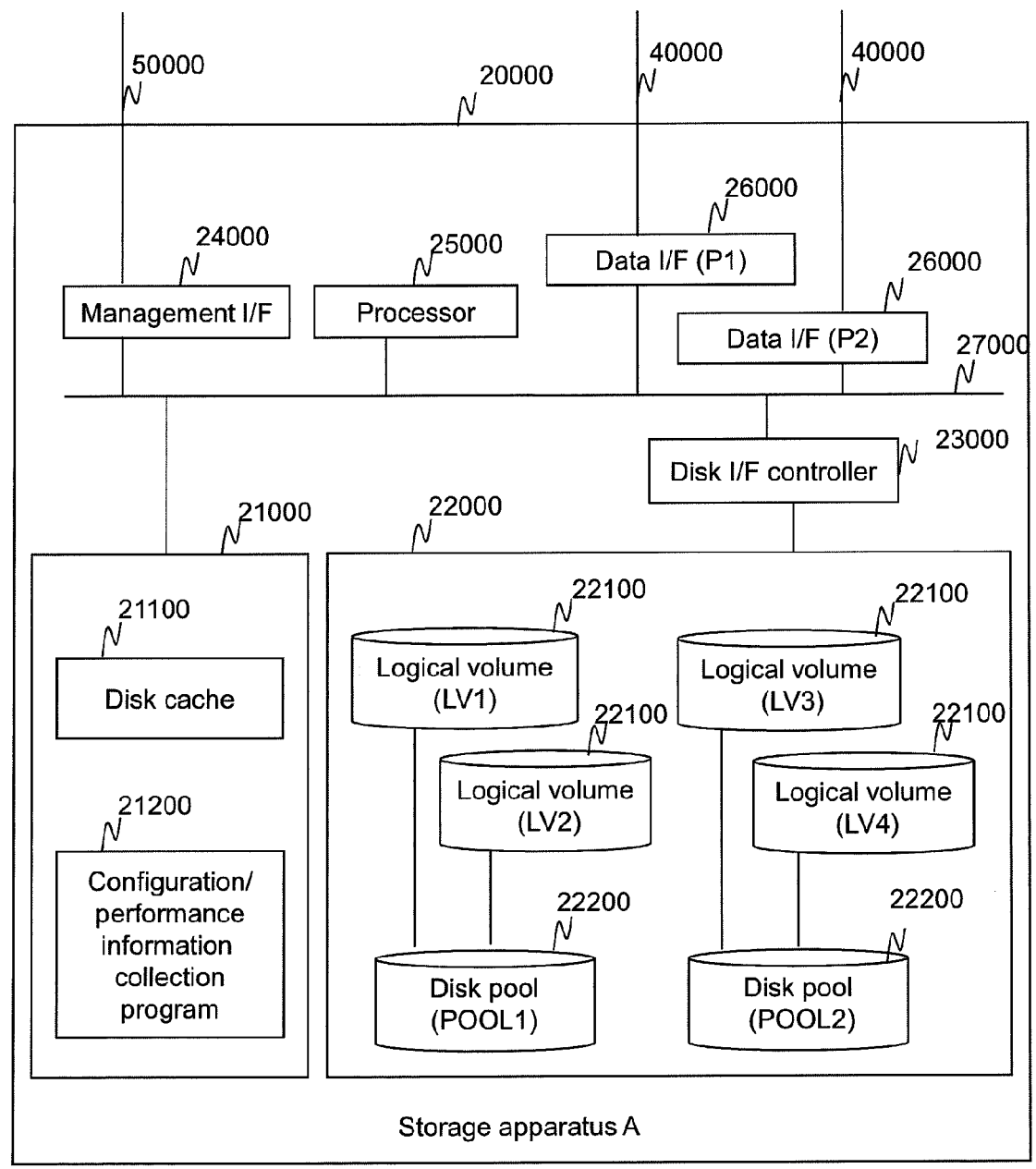
FIG. 3 is a constitutional diagram of an example of a storage apparatus related to Example 1.

FIG. 3 is a constitutional diagram of an example of the storage apparatus related to Example 1.

The storage apparatus 20000 comprises a memory 21000, a logical volume provision part 22000, a disk I/F controller 23000, a management I/F 24000, a processor 25000, and a data I/F 26000, and these elements are coupled via a communication channel 27000, such as an internal bus.

The memory 21000 comprises a disk cache 21100. The memory 21000 stores a configuration/performance information collection program 21200. The disk cache 21100 is a storage area for temporarily storing information. The configuration/performance information collection program 21200 is for sending/receiving the management information and the performance information of the storage apparatus 20000 and the like to/from the management server 10000.

The logical volume provision part 22000 comprises a disk pool 22200 configured from a storage area of one or more physical disks (not shown in the drawing), logically partitions the storage area of the disk pool 22200, and provides the relevant logically partitioned storage areas as logical volumes 22100. This makes it possible to access a logical volume 22100 from an apparatus outside the relevant storage apparatus 20000. A disk pool number is appended to a disk pool 22200, and a logical volume number is appended to a logical volume 22100. This makes it possible for the storage apparatus 20000 to uniquely identify each disk pool 22200 and logical volume 22100.

In the example shown in FIG. 3, each of two disk pools 22200 (POOL1 and POOL2) is logically partitioned, and four logical volumes 22100 (LV1, LV2, LV3 and LV4) are provided to an apparatus (for example, the physical server 30000) outside the storage apparatus 20000. The disk I/F controller 23000 is an interface device for coupling to the logical volume provision part 22000. The management I/F 24000 is an interface device for coupling to the management network 50000. The processor 25000 executes a program deployed on the memory 21000. The data I/F 26000 is an interface device for coupling to the SAN 40000. Furthermore, there may be multiple disk I/F control parts 23000, management I/Fs 24000, and data I/Fs 26000.

In the example shown in FIG. 3, the storage apparatus 20000 comprises two data I/Fs 26000, data I/F (P1) and data I/F (P2). In the example shown in FIG. 3, the configuration/performance information collection program 21200 is stored in the memory 21000, but this program 21200 may be stored in another storage device (not shown in the drawing) or another storage medium (not shown in the drawing). In accordance with this, at process execution time, the processor 25000 reads the configuration/performance information collection program 21200 on the memory 21000, and executes the read configuration/performance information collection program 21200.

The configuration/performance information collection program 21200 may be stored in the memory 11000 of the management server 10000, and the management server 10000 may execute the stored program 21200. Also, another storage apparatus 20000 may store the configuration/performance information collection program 21200 and may execute the stored program 21200. The logical volume provision part 22000 may make all the storage areas on a single physical disk 22200 into one logical volume 22100. The logical volume provision part 22000 may also prepare a logical volume 22100 using the storage area of a storage medium other than the physical disk 22200, for example, a flash memory.

Figure 4:
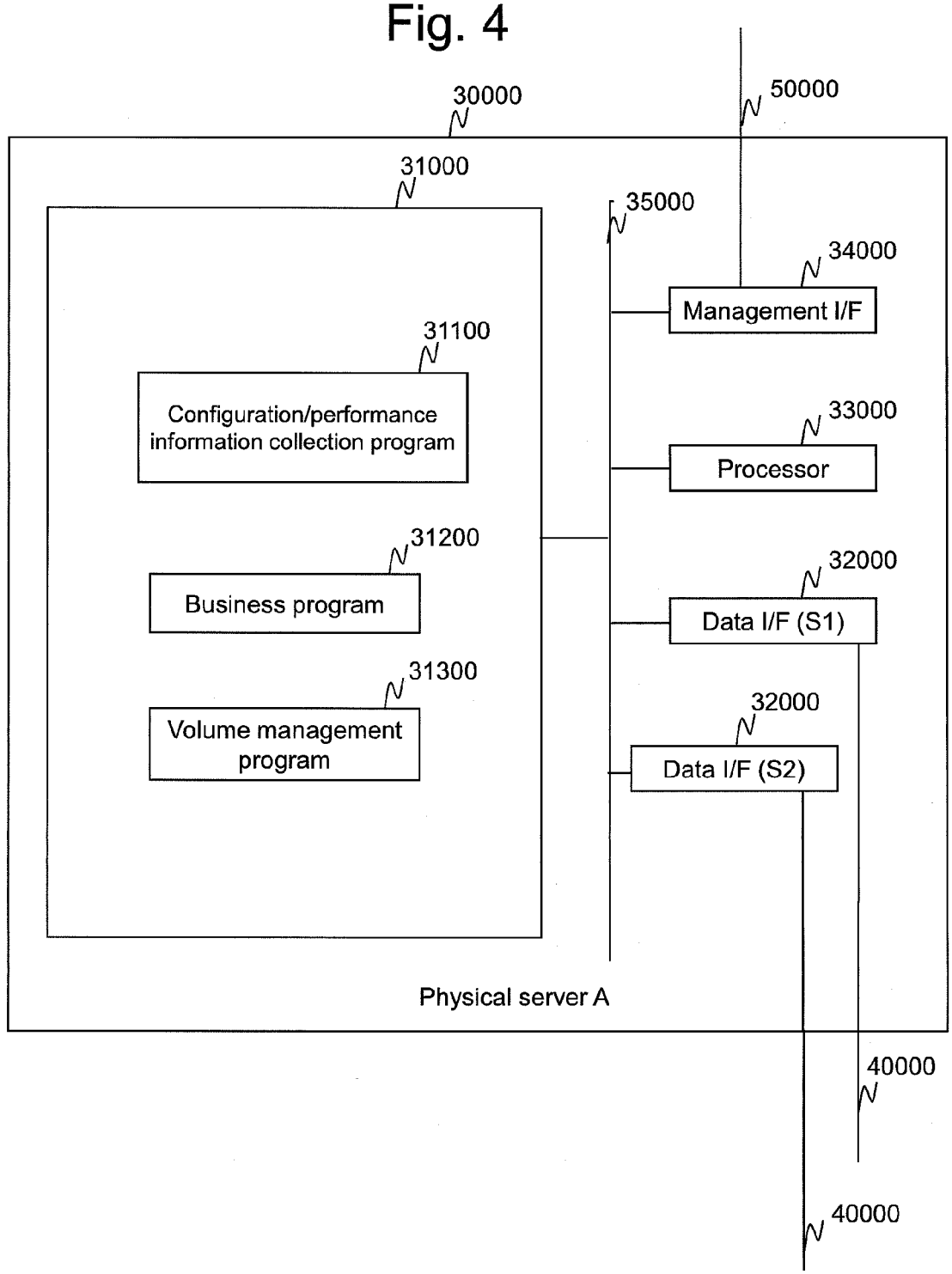
FIG. 4 is a constitutional diagram of an example of a physical server related to Example 1.

FIG. 4 is a constitutional diagram of an example of the physical server related to Example 1.

The physical server 30000 comprises a memory 31000, a data I/F 32000, a processor 33000, and a management I/F 34000, and these elements are coupled together via an internal bus or other such communication channel 35000.

The memory 31000 stores a configuration performance information collection program 31100, a business program 31200, and a volume management program 31300.

The configuration performance information collection program 31100 is for sending/receiving physical server 30000 management information, performance information, and the like to/from the management server 10000. The business program 31200 is for realizing a business operation executed by the physical server 30000, and, for example, is a DBMS (Data Base Management System) or a file system. The volume management program 31300 is for allocating a logical volume 22100 provided by the storage apparatus 20000 to the physical server 30000. The physical server 30000 executes a business operation using the logical volume 22100 allocated by the volume management program 31300.

The data I/F 32000 is an interface device for coupling to the SAN 40000. The processor 33000 executes a program deployed on the memory 31000. The management I/F 34000 is an interface device for coupling to the management network 50000.

There may be multiple data I/Fs 32000 and management I/Fs 34000. In the example shown in FIG. 4, a variety of programs are stored in the memory 31000, but these programs may be stored in another storage apparatus (not shown in the drawing). In accordance with this, at process execution time, the processor 33000 reads a target program on the memory 31000, and executes the read program.

Figure 5:
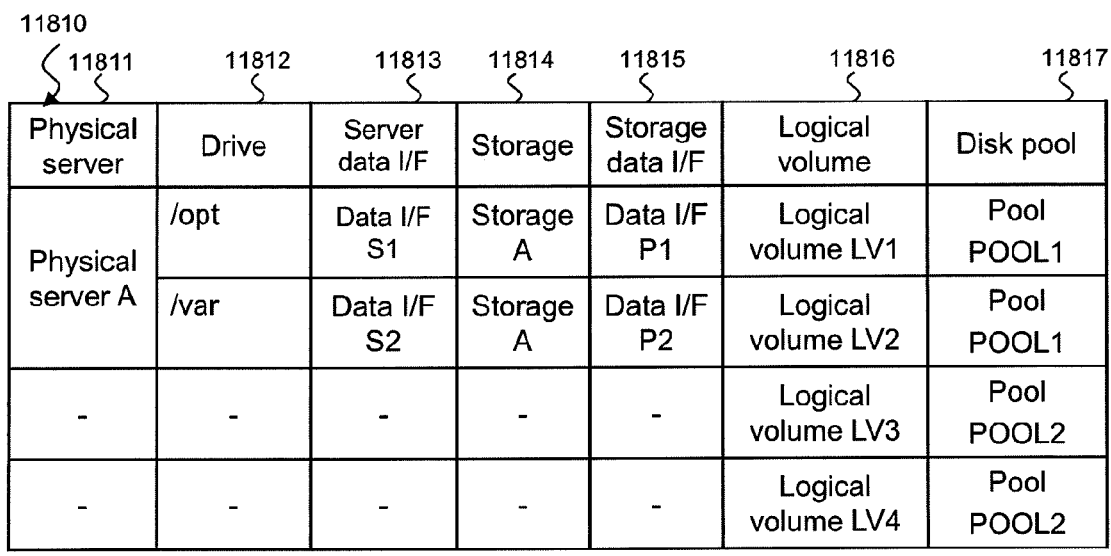
FIG. 5 is a constitutional diagram of an example of a configuration information table related to Example 1.

FIG. 5 is a constitutional diagram of an example of the configuration information table related to Example 1.

The configuration information table 11810 stores information related to an I/O route, which extends from the physical server 30000 to the physical disk configuring the logical volume 22100 provided to the relevant physical server 30000, and which the physical server 30000 uses to access the logical volume 22100. An entry is added to the configuration information table 11810 in accordance with the configuration setting management program 11600 being executed.

The configuration information table 11810 comprises the fields of a physical server 11811, a drive 11812, a server data I/F 11813, a storage 11814, a storage data I/F 11815, a logical volume 11816, and a disk pool 11817. An identifier for uniquely identifying a physical server 30000 is stored in the physical server 11811. An identifier for uniquely identifying a mount point of a volume on the physical server 30000 is stored in the drive 11812. An identifier for uniquely identifying a physical server 30000 data I/F 32000 (hereinafter may be referred to as "server data I/F") used when the physical server 30000 accesses the logical volume 22100 shown by a logical volume 11816 identifier is stored in the server data I/F 11813. An identifier for uniquely identifying a storage apparatus 20000 constituting the access destination of the physical server 30000 is stored in the storage 11814. An identifier for uniquely identifying a storage apparatus 20000 data I/F 26000 (hereinafter may be referred to as "storage data I/F") used when the physical server 30000 accesses the logical volume 22100 shown by the logical volume 11816 identifier is stored in the storage data I/F 11815. An identifier for uniquely identifying a logical volume 22100 is stored in the logical volume 11816. An identifier for uniquely identifying a disk pool 22200 by which the logical volume 22100 shown by the logical volume 11816 identifier is prepared is stored in the disk pool 11817.

For example, the first entry from the top of FIG. 5 shows that the logical volume "LV1" created from the disk pool "POOL1" of the storage A (storage apparatus A) is coupled to the physical server A via the storage data I/F "P1" and the server data I/F "S1", and is recognized as the logical volume "/opt" on the physical server A.

Here, the configuration information table 11810 related to this example comprises information on the physical server 30000, the server data I/F, the storage apparatus 20000, the storage data I/F, the logical volume 22100, and the disk pool 22200 as the apparatuses and devices that exist on the access route, but the constitution of this table is not limited thereto. For example, the configuration information table 11810 may comprise information on a switch and a switch data I/F, and may associatively store business program (DBMS and so forth) information or VM information on the business server 30000, a snapshot volume holding a VM snapshot, and a clone volume holding a clone. The configuration information table 11810 may hold configuration management operation historical information, and may be linked to a Syslog server and hold detailed log information denoting system operations.

Figure 6:
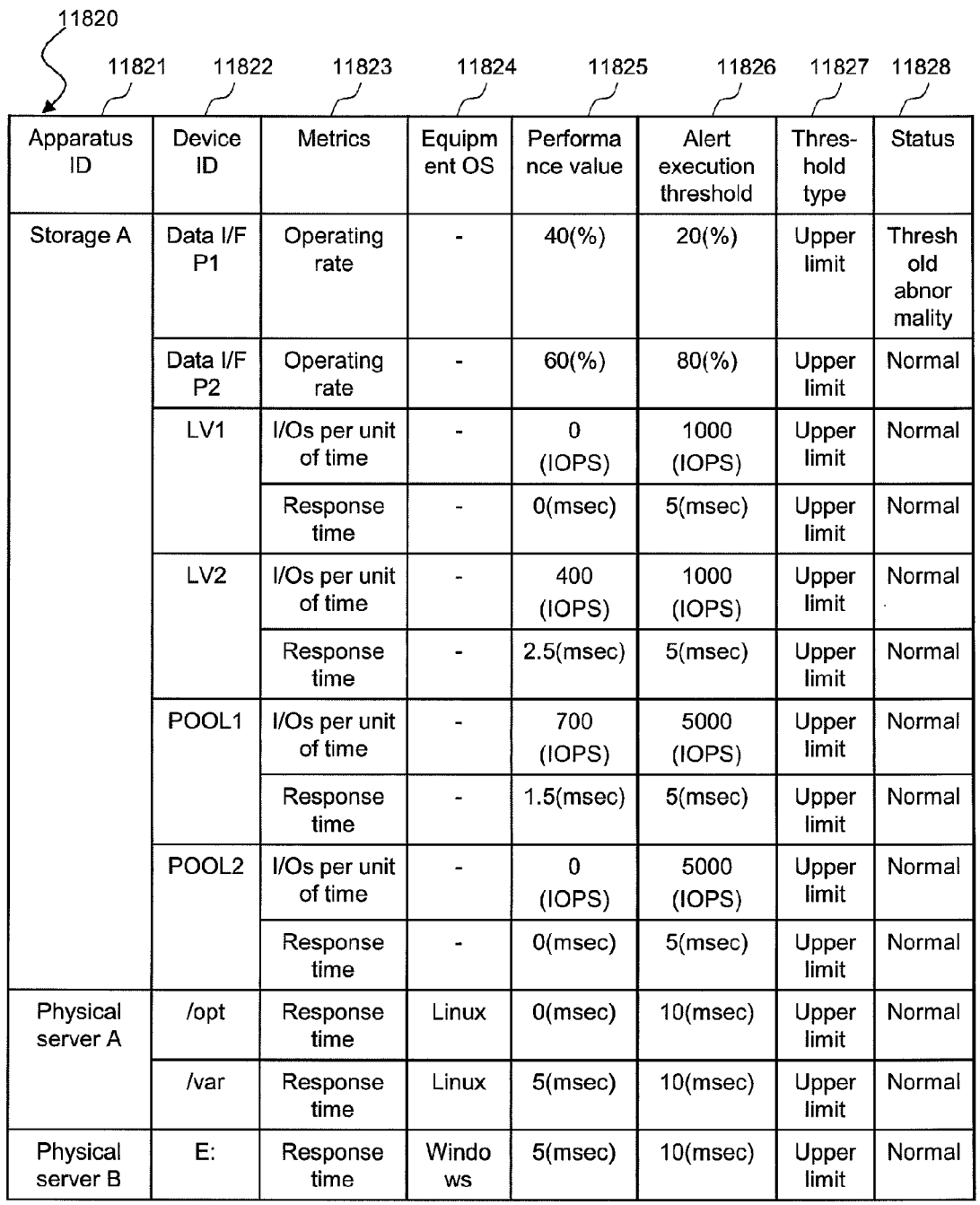
FIG. 6 is a constitutional diagram of an example of a performance information table related to Example 1.

FIG. 6 is a constitutional diagram of an example of the performance information table related to Example 1.

The performance information table 11820 stores performance information related to either an apparatus or a device inside an apparatus comprising the computer system, for example, performance information related to the logical volume 22100, the disk pool 22200, and so forth in each storage apparatus 20000. An entry is added to the performance information table 11820 in accordance with the performance information collection program 11700 being executed.

The performance information table 11820 comprises the fields of an apparatus ID 11821, a device ID 11822, a metrics 11823, an equipment OS 11824, a performance value 11825, an alert execution threshold 11826, a threshold type 11827, and a Status 11828.

An identifier (apparatus ID) for uniquely identifying an apparatus is stored in the apparatus ID 11821. An identifier (device ID) for uniquely identifying a device, which is the performance information acquisition target, is stored in the device ID 11822. Information showing a type of performance information, such as a CPU utilization rate, a number of IOs (IOPS) per unit of time (for example, one second) for a storage apparatus, and a response time with respect to a request, is stored in the metrics 11823. Data showing a type of OS (Operating System) running on the apparatus corresponding to the apparatus ID in the apparatus ID 11821 is stored in the equipment OS 11824. A value of the performance information for the type shown by the metrics 11823 for the device shown by the device ID 11822 is acquired from the apparatus comprising the device and stored in the performance value 11825. Either an upper limit or a lower limit threshold for a normal range of management-target performance values (hereinafter referred to as "alert execution threshold") is specified by the user and stored in the alert execution threshold 11826. Data showing whether the alert execution threshold is the upper limit or the lower limit of the normal values is stored in the threshold type 11827. Data showing whether the performance value 11825 is a normal value or an abnormal value is stored in the Status 11828.

In the performance information table 1820 shown in FIG. 6 here, only one performance value is supported for one arbitrary metrics for one arbitrary device on one arbitrary apparatus, but the configuration may be such that each piece of information of the performance information table 11820 is stored together with a value showing the time at with the performance information collection program 11700 acquired information held by each apparatus by communicating with the configuration performance information collection programs 21200 and 31100, and the performance values at multiple time points corresponding to the acquired times may be held as historical information.

The storage data I/F, the logical volume 22100, the disk pool 22200, and the mount point which is recognized by the physical server 30000, was cited as the performance information acquisition-target device which is shown by the device ID in the device ID 11822, but the constitution is not limited thereto, and the performance information acquisition-target device may also be a server data I/F, a physical disk, a switch, a switch port, and so forth.

Furthermore, as examples of metrics, a CPU utilization rate, an IOPS, a response time with respect to a request, and so forth were given, but other performance indicators, such as an I/O busy rate, a transfer rate, a throughput, a buffer hit rate and a number of records inserted/updated/deleted in database management software, a Web server response time, a free capacity or utilization rate for a file system or disk, an amount of I/O data, a utilization time, a number of network interface errors, a buffer overflow, and frame errors may also be used.

As the alert execution threshold stored in the alert execution threshold 11826, rather than a threshold specified by the user, for example, a value capable of triggering an alert notification, such as a value that differs from a baseline value obtained using an average value of the performance information historical information, may be employed.

Figure 7:
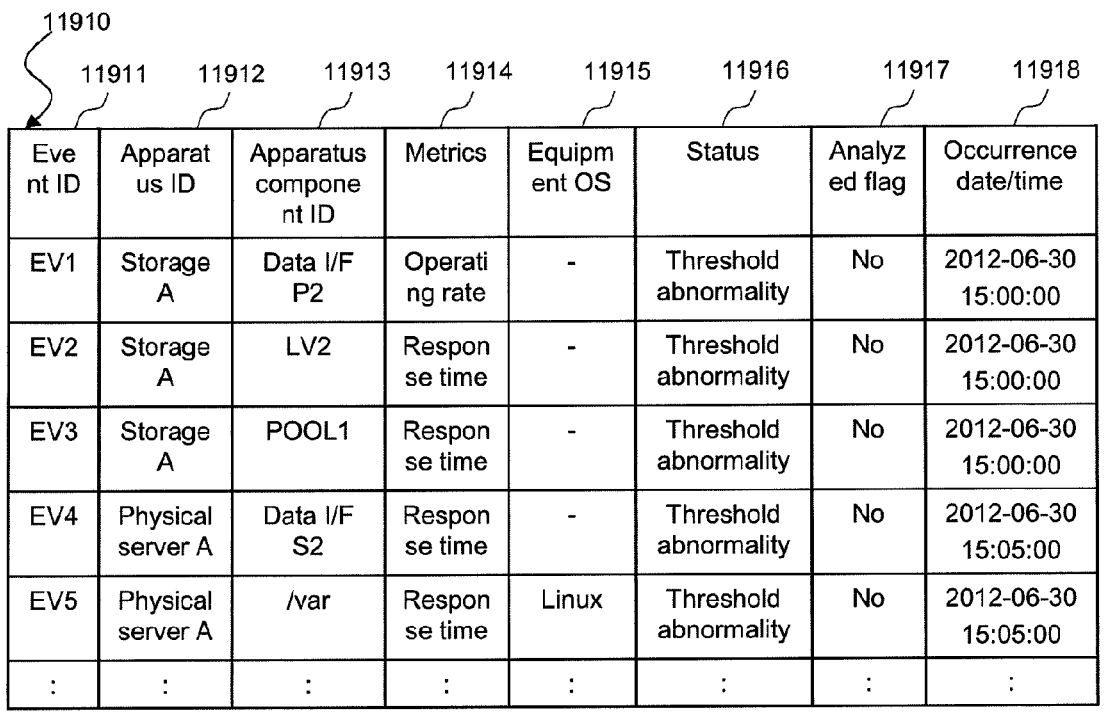
FIG. 7 is a constitutional diagram of an example of an event management table related to Example 1.

FIG. 7 is a constitutional diagram of an example of the event management table related to Example 1.

The event analysis processing program 11400 compares a performance value registered in the performance information table 11820 to an alert execution threshold registered in the performance information table 11820, and in a case where the performance value exceeds the alert execution threshold, prepares an entry showing the corresponding event, and registers the prepared entry in the event management table 11910. The event analysis processing program 11400 receives an event message showing the occurrence of an event from various apparatuses in the system, and may register an entry showing the event corresponding to the received event message in the event management table 11910. The event management table 11910 is referred to as needed in a rule expansion process (refer to FIG. 15).

The event management table 11910 comprises the fields of an event ID 11911, an apparatus ID 11912, an apparatus component ID 11913, a metrics 11914, an equipment OS 11915, a status 11916, an analyzed flag 11917, and an occurrence date/time 11918. An event ID, which is the identifier of the event itself, is stored in the event ID 11911. An apparatus ID, which is the identifier of the apparatus in which the event occurred, is stored in the apparatus ID 11912. An identifier of the device in which the event occurred is stored in the apparatus component ID 11913. The name of a metrics for which a threshold abnormality was detected is stored in the metrics 11914. Data showing the type of OS in the apparatus in which the threshold abnormality was detected is stored in the equipment OS 11915. Data showing a state at event occurrence of a device in which the event occurred is stored in the status 11916. Data showing whether or not the event has been analyzed by the rule expansion program 11500 is stored in the analyzed flag 11917. Data showing the date and time at which the event occurred is stored in the occurrence date/time 11918.

For example, the first entry from the top of FIG. 7 shows that the management server 10000 detected a threshold abnormality of the processor operating rate in the data I/F "P2" of the storage apparatus A at 15:00:00 hours on 30 Jun. 2012, that the event ID thereof is "EV1", and that this event has not been analyzed by the rule expansion program 115000.

FIG. 8 is a constitutional diagram of an example of the general rule table related to Example 1.

One or more general rule tables 11920 are stored in the rule-plan information repository 11900. In this example, one general rule is defined by one general rule table 11920. The general rule (the same holds true for an expanded rule, which will be explained further below) is data showing the relationship between a combination of one or more condition events capable of occurring in a node apparatus comprising the computer system, and a conclusion event, which is regarded as the failure cause with respect to the one or more condition events. Generally speaking, an event propagation model for identifying the cause in a failure analysis uses an "IF-THEN" format to describe a combination of events, which are expected to occur as the result of a certain failure, and the cause thereof. The general rule is not limited to that given in FIG. 8, and a larger number of rules are allowed.

The general rule table 11920 comprises a condition part 11921, a conclusion part 11922, a general rule ID 11923, and an applied topology 11924.

Data showing an observed event, that is, each of one or more condition events, which is equivalent to the IF part of the general rule described using the "IF-THEN" format, is stored in the condition part 11921. The condition part 11921 comprises the fields of an event ID 11925, an apparatus type 11926, an apparatus component type 11927, a metrics 11928, and a status 11929. Data showing a causal event, that is, a conclusion event, which is equivalent to the THEN part of the general rule described using the "IF-THEN" format, is stored in the conclusion part 11922. The conclusion part 11922 comprises the fields of the apparatus type 11926, the apparatus component type 11927, the metrics 11928, and the status 11929. A general rule ID, which is the identifier of the general rule, is stored in the general rule ID 11923. Data showing a topology which is referenced when the management server 10000 expands the general rule to an actual system and creates an expanded rule, is stored in the applied topology 11924. An identifier (event ID) for uniquely identifying an event (condition event) included in an observed event equivalent to the IF part of the general rule described using the "IF-THEN" format, is stored in the event ID 11925. Data showing the type of apparatus in which either the condition event or the conclusion event occurs is stored in the apparatus type 11926. Data showing the type of device in which either the condition event or the conclusion event occurs is stored in the apparatus component type 11927. Information showing a type of performance information, such as a CPU utilization rate, a storage apparatus IOPS, and a response time with respect to a request, is stored in the metrics 11928. Here, the same performance information stored in the metrics 11823 of the performance information table 11820, or other performance information may be used as the performance information stored in the metrics 11928. Data showing the state at event occurrence of the device in the apparatus is stored in the status 11929.

In a case where one or more condition events described in the condition part 11921 have been detected, it is determined that the conclusion event described in the conclusion part 11922 is the cause of the failure. In a case where the status of the conclusion part 11922 transitions to normal, that is, a case in which the performance value related to the conclusion event returns to normal, the problem in the condition part 11921 is also resolved, that is, the performance value related to each condition event can also be expected to return to a normal value. In the example of FIG. 8, three events are described in the condition part 11921, but the number of events is not limited.

For example, the general rule given as an example in FIG. 8, that is, the general rule for which the general rule ID is shown as "RULE 1" shows that when a threshold abnormality in the response time of a drive on a host computer, a threshold abnormality in the I/Os per unit of time in the logical volume 22100 of the storage apparatus 20000, and a threshold abnormality in the I/Os per unit of time in the disk pool 22200 of the storage apparatus 20000 have been detected as observed events, the threshold abnormality in the I/Os per unit of time in the disk pool 22200 of the storage apparatus 20000 is concluded to be the cause. The fact that a certain condition is normal may also be defined as an event included in the observed events. Topology information is acquired from the configuration information table 11810 when an expanded rule is created based on this general rule.

FIG. 9 is a constitutional diagram of an example of the general plan table related to Example 1.

The general plan table 11930 shows a list of available plans in the computer system. The general plan table 11930 comprises the fields of a general plan ID 11931 and a plan 11932. A general plan ID, which is the identifier of the general plan, is stored in the general plan ID 11931. Information showing the plans, which are available in the computer system, is stored in the plan 11932. As plans, for example, there are reboot host, change switch setting, storage apparatus 20000 volume migration, and VM migration, among others. The plans are not limited to those given in FIG. 9.

FIG. 10 is a constitutional diagram of an example of the rule-plan association table related to Example 1.

The rule-plan association table 11940 shows the corresponding relationship between a general rule, a list of plans available in a case where this general rule was applied and the cause of a failure was identified, and an event (hereinafter referred to as "unresolved event"), which remains in an unresolved state in a case where the plans have been executed. The rule-plan association table 11940 comprises a general rule ID 11941, a general plan ID 11942, and an unresolved event ID 11943. A general rule ID, which is the identifier of a general rule, is stored in the general rule ID 11941. The general rule ID stored in the general rule ID 11941 corresponds to the general rule ID stored in the general rule ID 11923 of the general rule table 11920. A general plan ID, which is the identifier of a general plan, is stored in the general plan ID 11942. The general plan ID stored in the general plan ID 11942 corresponds to the general plan ID stored in the general plan ID 11931 of the general plan table 11930. An unresolved event ID, which is the identifier of an event (unresolved event), which remains in an unresolved state in a case where the plans have been executed, is stored in the unresolved event ID 11943. The unresolved event ID corresponds to the identifier (event ID) of a condition event stored in the event ID 11925 of the general rule table 11920. In the unresolved event ID 11943, for example, in a case where an unresolved event does not exist, "NONE" is stored, and in a case where all of the condition events remain as unresolved events, "ALL" is stored.

FIG. 11 is a constitutional diagram of an example of the expanded rule table related to Example 1.

One or more expanded rule tables 11950 are stored in the rule-plan information repository 11900. In this example, one expanded rule is defined by one expanded rule table 11950. The expanded rule is data, which expands the general rule in a format that depends on the actual configuration of the computer system. The expanded rule shown in FIG. 11 is created in accordance with replacing the values of the apparatus type 11926 and the apparatus component type 11927 in the general rule shown in FIG. 8 with the identifier (apparatus ID) of the identified apparatus and the identifier (device ID) of the identified device defined in the configuration information table 11810.

The expanded rule table 11950 comprises the fields of a condition part 11951, a conclusion part 11952, an expanded rule ID 11953, and a pre-expansion general rule ID 11954.

Data showing an observed event, that is, each of one or more condition events, which is equivalent to the IF part of the expanded rule described using the "IF-THEN" format, is stored in a condition part 11951. The condition part 11951 comprises the fields of an event ID 11955, an apparatus ID 11956, an apparatus component ID 11957, a metrics 11958, and a status 11959. Data showing a causal event, that is, a conclusion event, which is equivalent to the THEN part of the expanded rule described using the "IF-THEN" format, is stored in a conclusion part 11952. The conclusion part 11952 comprises the fields of the apparatus ID 11956, the apparatus component ID 11957, the metrics 11958, and the status 11959. An expanded rule ID, which is the identifier of the expanded rule, is stored in the expanded rule ID 11953. The general rule ID of the general rule, which constitutes the basis of the expanded rule, is stored in the pre-expansion general rule ID 11954. An identifier for uniquely identifying a condition event included in an observed event equivalent to the IF part of the expanded rule described using the "IF-THEN" format, is stored in the event ID 11955. An ID (apparatus ID) of an apparatus in which either the condition event or the conclusion event occurs is stored in the apparatus ID 11956. An ID (device ID) of the device in which either the condition event or the conclusion event occurs is stored in the apparatus component ID 11957. Information showing a type of performance information, such as a CPU utilization rate, a storage apparatus IOPS, and a response time with respect to a request, is stored in the metrics 11958. The same performance information stored in the metrics 11823 of the performance information table 11820, or other performance information may be used as the performance information stored in the metrics 11958. Data showing the state at event occurrence of the device in the apparatus is stored in the status 11959.

The expanded rule is created in accordance with taking into account the actual configuration of the computer system (for example, the coupling relationship shown in the configuration information table 11810) and embodying the apparatus type and the device type related to the condition event and the conclusion event in the identified apparatus and the identified device in the actual configuration of the computer system.

For example, the expanded rule, for which the expanded rule ID is shown as "ExRule 1-1", given as an example in FIG. 11 is created in accordance with replacing the values of the apparatus type 11926 and the apparatus component type 11927 in the general rule "Rule 1" shown in FIG. 8 with the identifiers of the identified apparatuses (physical server A and storage apparatus A) and the identifiers of the identified devices (drive "/var", logical volume "LV1", and disk pool "POOL1") defined in the configuration information table 11810.

As is clear from the expanded rule "ExRule 1-1" shown in the expanded rule table 11950 of FIG. 11, the expanded rule "ExRule 1-1" is expanded on the basis of the general rule "Rule 1", and shows that when a threshold abnormality in the response time of the logical volume "/var" of the physical server A, a threshold abnormality in the response time of the logical volume "LV2" of the storage apparatus A, and a threshold abnormality in the response time of the disk pool "POOL1" of the storage apparatus A have been detected as observed events, the threshold abnormality in the response time of the disk pool "POOL1" of the storage apparatus A is concluded to be the cause.

FIG. 12A is a first constitutional diagram of the expanded plan table related to Example 1. FIG. 12B is a second constitutional diagram of the expanded plan table related to Example 1.

One or more expanded plan tables 11960 are stored in the rule-plan information repository 11900. In this example, one or more expanded plans are defined by one expanded plan table 11960. The expanded plan is information for expanding a general plan in a format, which relies on the actual configuration of the computer system. The expanded plan table 11960 is created by the plan creation program 11100 based on the general plan table 11930, the expanded rule table 11950, the configuration information table 11810, and the performance information table 11820.

The expanded plan table 11960 comprises the fields of a plan details 11961, a general plan ID 11962, and an expanded rule ID 1196A. The general plan ID of the general plan, which constitutes the basis of the expanded plan, is stored in the general plan ID 11962. The expanded rule ID of the expanded rule corresponding to the expanded plan is stored in the expanded rule ID 1196A as information for identifying the failure cause for which the expanded plan is implemented.

Specific processing contents for each of one or more expanded plans, which have been expanded, and information on the post-execution state of the expanded plan are stored in the plan details 11961. The plan details 11961 comprises the fields of an expanded plan ID 11963, a plan target 11964, and a risk site 11969. An expanded plan ID, which is the identifier of the expanded plan, is stored in the expanded plan ID 11963. Data showing a problem site (hereinafter referred to as "risk site"), which latently remains as-is even after the plan has been executed, is stored in the risk site 11969.

In the plan target 11964, for example, there is stored information showing the configuration element (device) related to the plan, and post-plan execution information. The post-plan execution information here comprises a predicted value for a post-plan execution performance value related to the device, which is related to the plan. The predicted value of the post-plan execution performance value, for example, is calculated in accordance with the plan creation program 11100 referencing the performance information table 11820 to simulate the situation subsequent to plan execution. The fields included in the plan target 11964 will differ in accordance with the plan contents.

The expanded plan defined by the expanded plan table 11960 of FIG. 12A is an expanded plan based on the general plan "Plan 1", that is, an expanded plan related to a volume migration. In the case of an expanded plan related to a volume migration, the plan target 11964, for example, comprises the fields of a migration-target volume 11965, a migration-source pool 11966, and a migration-destination pool 11967. The migration-target volume 11965 comprises a volume ID 11965A in which is stored an identifier of the logical volume 22100 (hereinafter referred to as "migration-target volume"), which constitutes the volume migration target, and an I/O Response Time prediction 11965B in which is stored a predicted value for the I/O response time with respect to the migration-target volume subsequent to volume migration execution. The migration-source pool 11966 comprises a pool ID 11966A in which is stored an identifier of the disk pool 22200 to which the migration-target volume belongs (that is, the migration-source disk pool 22200, hereinafter referred to as "migration-source pool"), and an I/O Response Time prediction 11966B in which is stored a predicted value for the I/O response time with respect to the migration-source pool subsequent to volume migration execution. The migration-destination pool 11967 comprises a pool ID 11967A in which is stored an identifier of the disk pool 22200, which constitutes the migration destination of the migration-target volume (hereinafter referred to as "migration-destination pool"), and an I/O Response Time prediction 11967B in which is stored a predicted value for the I/O response time with respect to the migration-destination pool subsequent to volume migration execution.

The plan creation program 11100 acquire information from the configuration information table 11810, and stores the information in the volume ID 11965A, the pool ID 11966A, and the pool ID 11967A. Further, an arbitrary method may be used as the method for calculating the values stored in the respective I/O Response Time predictions 11965B, 11966B, and 11967B. For example, the values of the respective I/O Response Time predictions 11965B, 11966B, and 11967B may be values (I/O response times) obtained, for example, by the plan creation program 11100 acquiring the I/Os per unit of time of the migration-target volume, the migration-source pool, and the migration-destination pool from the performance information table 11820, subtracting the value of the I/Os per unit of time of the migration-target volume from the I/Os per unit of time of the migration-source pool, adding the value of the I/Os per unit of time of the migration-target volume to the I/Os per unit of time of the migration-destination pool, predicting the I/Os of the migration-source pool and the migration-destination pool subsequent to volume migration execution, and adopting a value (I/O response time) obtained by inversing thereof.

The expanded plan defined in accordance with the expanded plan table 11960 of FIG. 12B is an expanded plan based on the general plan "Plan 5", that is, the expanded plan related to the addition of a disk to the pool. In the case of an expanded plan related to the addition of a disk to the pool, the plan target 11964, for example, comprise the fields of a pool ID 11968A in which is stored the identifier of the disk pool 22200, which constitutes the destination of the disk (hereinafter referred to as "add-target pool"), an additional disk 11968B in which is stored the identifier of the disk to be added, and an I/O Response Time prediction 11968C in which is stored a predicted value for the I/O response time with respect to the add-target pool.

The plan creation program 11100 acquired information from the configuration information table 11810 and stores the information in the pool ID 11968A and the additional disk 11968B. Further, an arbitrary method may be used as the method for calculating the value (a predicted value of I/O response time with respect to add-target pool) of the I/O Response Time prediction 11968C. For example, the plan creation program 11100 may calculate the I/O response time of the add-target pool subsequent to disk addition by acquiring the value of the I/Os per unit of time of the add-target pool, the value of the capacity of the add-target pool, and the value of the capacity of the disk to be added from the performance information table 11820, and assuming that the I/Os per unit of time are distributed in proportion to the capacity values, multiplying a value obtained by dividing the capacity of the add-target pool prior to disk addition by the capacity of the add-target pool subsequent to disk addition by the I/O response time of the add-target pool prior to disk addition. In the example of FIG. 12B, there is described an example in which performance information is stored as the contents of the plan details 11961, but cost information related to the plan, or information on system downtime resulting from a failure when the plan is executed may be stored as the contents of the plan details 11961.

In FIG. 12, there is described an example of an expanded plan related to a volume migration, and an expanded plan related to the addition of a disk to a pool, but an expanded plan corresponding to each general plan of the other general plans included in the general plan table 11930 is created in the same way. In a case where another general plans is to be expanded into an expanded plan, the plan creation program 11100, for example, computes a predicted value for a post-plan execution performance value related a device, which is related to the plan, by referencing the configuration information table 11810, listing post-processing execution configuration information candidates, referencing the performance information table 11820, and simulating post-plan execution status information, such as performance information, capacity information, cost information, and downtime information.

FIG. 13 is a constitutional diagram of an example of the analysis result management table related to Example 1.

The analysis result management table 11970 comprises the fields of a cause apparatus ID 11971, a cause component ID 11972, a metrics 11973, a certainty factor 11974, an expanded rule ID 11975, and a received event ID 11976. The identifier (apparatus ID) of an apparatus related to an event, which has been judged as the cause of a failure in a failure cause analysis process, is stored in the cause apparatus ID 11971. The identifier (device ID) of a device related to the event judged to be the cause of the failure is stored in the cause component ID 11972. Information showing a type of performance information, such as a CPU utilization rate and a response time with respect to a request, for which a threshold abnormality has been detected, is stored in the metrics 11973. In other words, in the metrics 11973 data showing the type of performance information related to an event judged to be the cause of a failure is stored. A value (certainty factor) showing the probability of the event judged to be the cause of the failure being the root cause is stored in the certainty factor 11974. In this example, an incidence of the condition event, for example, serves as the certainty factor. The expanded rule ID of the expanded rule, which constitutes the basis upon which the event was judged to be the cause of the failure, is stored in the expanded rule ID 11975. The event ID of the event, which actually occurred from among the condition events, is stored in the received event ID 11976.

For example, the first entry from the top of FIG. 13 shows that, based on the expanded rule "ExRule 1-1", the management server 10000 has judged that the response time threshold abnormality in the disk pool "POOL1" of the storage apparatus A is the failure cause, that the occurrence of events, which are shown with the event IDs "EV 2" "EV 3" and "EV 5", is the basis of the judgment, and that the certainty factor, that is, the incidence of the condition event is 3/3. This entry, for example, shows a case in which, in a case where it is assumed that the performance of the disk comprising the disk pool "POOL1" has slowed, the performance of the disk pool "POOL1" has deteriorated, and the performance of the logical volume "LV2" has slowed, an event has not occurred based on the logical volume "LV1" or the drive "/opt" since there is no sending/receiving of I/Os to/from the drive "/opt" of the physical server A or the logical volume "LV1" of the storage apparatus A.

Next, the respective processes executed by the management server 10000 will be explained. First, a configuration information acquisition process executed by the management server 10000 will be explained. The configuration information acquisition process is executed in accordance with the management server 10000 processor 15000 executing the configuration setting management program 11600 deployed on the memory 11000. First, the configuration setting management program 11600 communicates with a program, which collects information on the respective apparatuses coupled to the SAN 40000 (in this example, the configuration/performance information collection program 21200 of the storage apparatus 20000 and the configuration/performance information collection program 31100 of the physical server 30000), and acquires the configuration information held by the apparatuses.

Here, the management server 10000, for example, may use an SCSI (Small Computer System Interface) Inquiry command to acquire the coupling relationship between the physical server 30000, the drive on the physical server 30000, the server data I/F, the storage apparatus 20000, the storage data I/F, the logical volume 22100 accessed by the physical server 30000, and the disk pool 22200 to which the logical volume 22100 belongs. Also, the physical server 30000 may acquire configuration information from the storage apparatus 20000 in accordance with the physical server 30000 issuing an SCSI Inquiry command to the storage apparatus 20000. The configuration information collection program 31100 of the physical server 30000 may acquire configuration information related to the physical server 30000 using any method, such as, for example, a request to the OS. The configuration information collection program 21200 on the storage apparatus 20000 may acquire configuration information related to the storage apparatus 20000 using any method, such as, for example, acquiring the information from the memory 21000. Next, the configuration setting management program 11600 stores the acquired configuration information in the configuration information table 11810, and ends the configuration information acquisition process.

Next, a performance information collection process executed by the management server 10000 will be explained. The performance information collection process is executed in accordance with the management server 10000 processor 15000 executing the performance information collection program 11700 deployed on the memory 11000. First, the performance information collection program 11700 communicates with a program, which collects information on the respective apparatuses coupled to the SAN 40000 (in this example, the configuration/performance information collection program 21200 of the storage apparatus 20000 and the configuration/performance information collection program 31100 of the physical server 30000), and acquires the performance information held by the apparatuses.

Here, the management server 10000, for example, may use the SCSI Inquiry command to acquire the respective data registered in the performance information table 11820, that is, the data of the apparatus ID 11821, the device ID 11822, the metrics 11823, the equipment OS 11824, the performance value 11825, the alert execution threshold 11826, the threshold type 11827, and the Status 11828. Also, the physical server 30000 may acquire performance information from the storage apparatus 20000 in accordance with the physical server 30000 issuing an SCSI Inquiry command to the storage apparatus 20000. The performance information collection program 11700 of the physical server 30000 may acquire performance information related to the physical server 30000 using any method, such as, for example, a request to the OS. The configuration/performance information collection program 21200 on the storage apparatus 20000 may acquire performance information related to the storage apparatus 20000 using any method, such as, for example, acquiring the information from the memory 21000. Next, the performance information collection program 11700 stores the acquired performance information in the performance information table 11820, and ends the performance information collection process.

Figure 14:
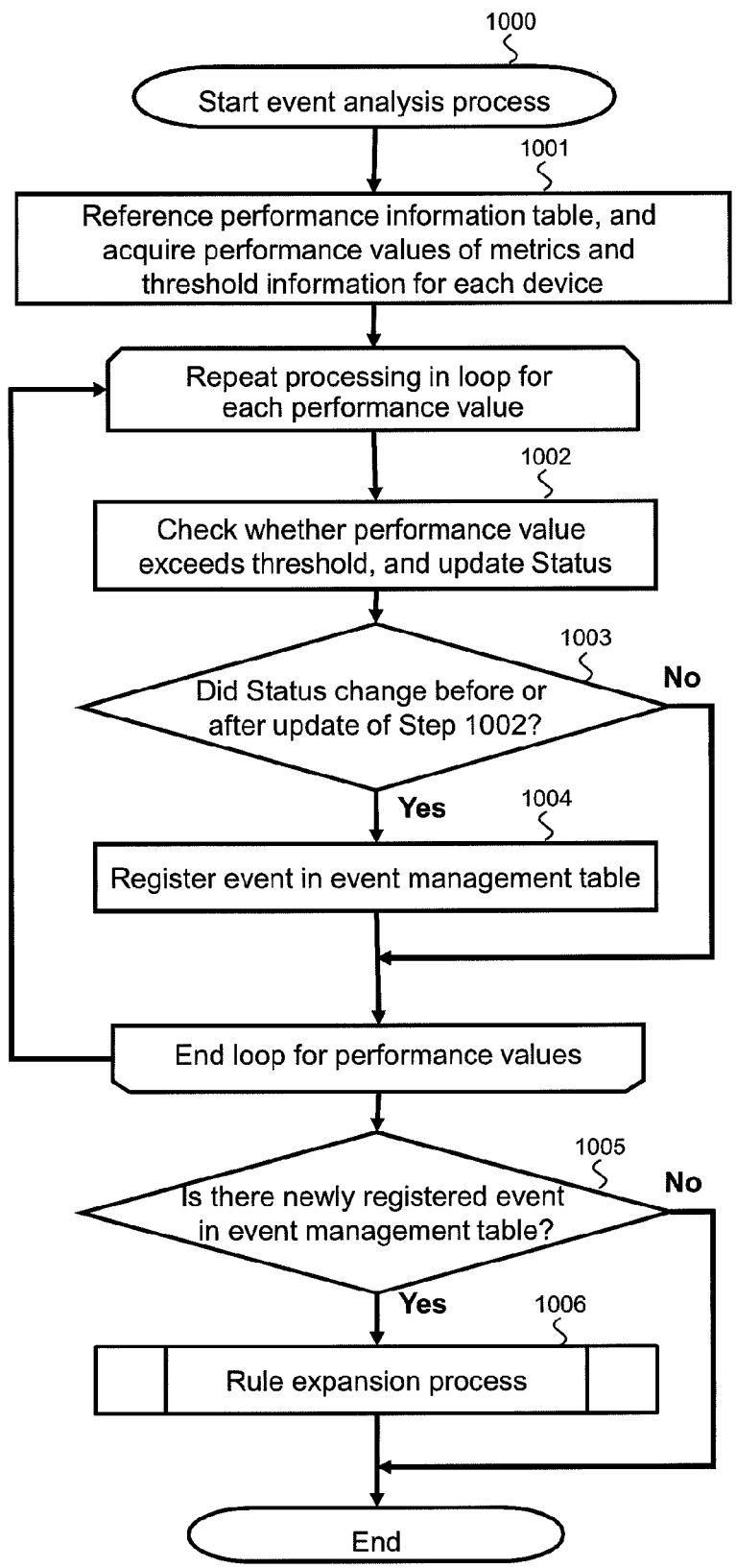
FIG. 14 is a flowchart of an event analysis process related to Example 1.

FIG. 14 is a flowchart of an event analysis process related to Example 1.

The event analysis process is executed in accordance with the management server 10000 processor 15000 executing the event analysis processing program 11400 deployed on the memory 11000.

First, the event analysis processing program 11400 references the performance information table 11820, and acquires the performance values and alert execution threshold for each device (Step 1001). Next, the event analysis processing program 11400 carries out the processing of the following Steps 1002 through 1004 for the acquired performance values.

The event analysis processing program 11400 checks whether or not the processing-target performance value exceeds the alert execution threshold corresponding to the processing-target performance value, and, based on the result, updates the value of the Status 11828 of the performance information table 11820 (Step 1002). Specifically, in a case where the processing-target performance value exceeds the alert execution threshold, the event analysis processing program 11400 stores "threshold abnormality" in the Status 11828, and in a case where the processing-target performance value does not exceed the alert execution threshold, stores "normal" in the Status 11828.

Next, the event analysis processing program 11400 determines whether or not the value of the Status 11828 changed before or after the update of Step 1002 (Step 1003). In a case where a change occurred (Step 1003: Yes), the event analysis processing program 11400 registers an entry related to the event showing that the processing-target performance value exceeds the alert execution threshold in the event management table 11910 (Step 1004), and advances to the next step. At this time, the date and time at which the performance information collection program 11700 collected the processing-target performance value is stored in the entry occurrence date/time 11918. Alternatively, in a case where the value of the Status 11828 has not changed (Step 1003: No), the event analysis processing program 11400 advances to the next step without executing Step 1004.

After the processing (Steps 1002 through 1004) has been completed for all the performance values, the event analysis processing program 11400 determines whether or not there exists an entry related to an event, which has been newly registered in the event management table 11910 (Step 1005), and in a case where an entry related to a newly registered event exists (Step 1005: Yes), instructs the rule expansion program 11500 to execute a rule expansion process (refer to FIG. 15) (Step 1006), and ends the event analysis process. Alternatively, in a case where an entry related to a newly registered event does not exist (Step 1005: No), the event analysis processing program 11400 ends the event analysis process.

Here, in this example, the event analysis processing program 11400 registers an entry related to an event in the event management table 11910 based on performance information acquired by the performance collection program 11700, but may update the information in the event management table 11910 using the notified information, such as a SNMP (Simple Network Management Protocol) trap or the like, which is notified from an apparatus.

Figure 15:
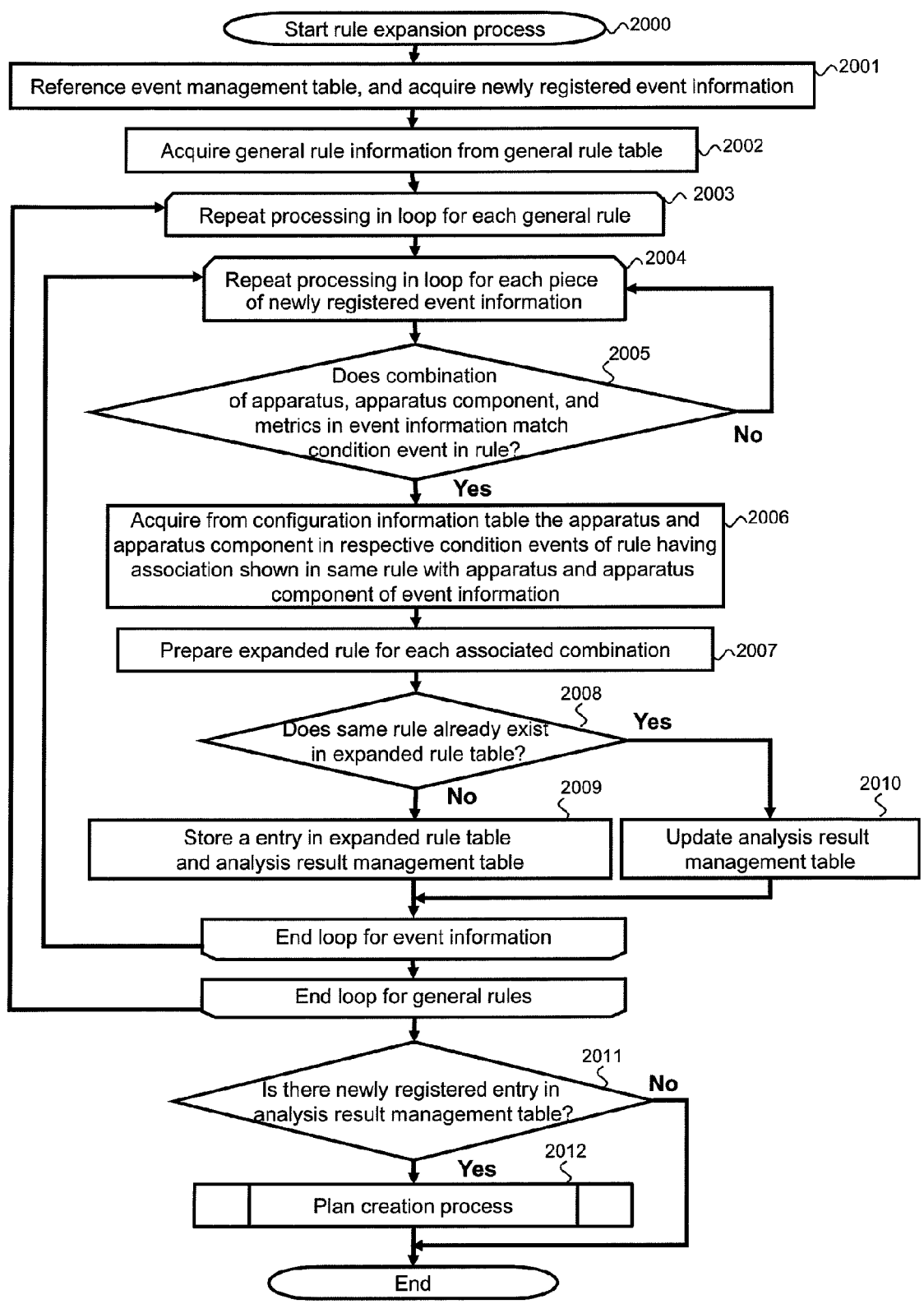
FIG. 15 is a flowchart of a rule expansion process related to Example 1.

FIG. 15 is a flowchart of the rule expansion process related to Example 1.

The rule expansion process is executed in accordance with the management server 10000 processor 15000 executing the rule expansion program 11500 deployed on the memory 11000.

First, the rule expansion program 11500 acquires an entry (event entry) related to a newly registered event from the event management table 11910, and updates the analyzed flag 11917 of the acquired event entry to "Yes" (Step 2001). Next, the rule expansion program 11500 acquires one or more general rules shown by one or more general rule tables 11920, which are being stored in the rule-plan information repository 11900 (Step 2002). The rule expansion program 11500 performs the processing of Steps 2004 through 2010 below for each acquired general rule (Step 2003). The rule expansion program 11500 also performs the processing of Steps 2005 through 2010 below for each event entry acquired in Step 2001.

The rule expansion program 11500 determines whether or not the event (processing-target event) shown in the processing-target event entry matches any of the condition events in the processing-target general rule (Step 2005). For example, the rule expansion program 11500 determines that the processing-target event and a condition event match in a case where the apparatus and device related to the processing-target event correspond to the types of the apparatus and device related to the condition event, and, in addition, the type of the processing-target event matches the type of the condition event.

In a case where it has been determined that there is no match in Step 2005 (Step 2005: No), the rule expansion program 11500 executes the processing (Steps 2004 through 2010) by making the next event entry the processing target. Alternatively, in a case where it has been determined that there is a match in Step 2005 (Step 2005: Yes), the rule expansion program 11500 acquires from the configuration information table 11810 the identifiers of the apparatus and device having the association shown in the processing-target general rule with the apparatus and device related to the processing-target event (Step 2006). Next, the rule expansion program 11500 prepares an expanded rule based on the processing-target general rule for each combination having the association (Step 2007).

For example, in a case where the EV5 in the event management table 11910 is regarded as the processing-target event, and the general rule "Rule 1" is regarded as the processing-target general rule, the processing-target event matches the condition event 1 (the condition event for which the event ID 11925 is "1") of the general rule "Rule 1". Therefore, the rule expansion program 11500 lists all of the logical volume 22100 and disk pool 22200 of the storage apparatus 20000, which are the apparatus and device having the association described in the general rule "Rule 1" (a coupling relationship exists between the components) with the physical server A drive "/var", which is the site where the processing-target event occurred. Then, the rule expansion program 11500 prepares an expanded rule, which corresponds to the combination of the physical server A drive "/var", the logical volume 22100 of the storage apparatus 20000, and the disk pool 22200 of the storage apparatus 20000.

Next, the rule expansion program 11500 determines whether or not an expanded rule table 11950, which shows the same expanded rule as the prepared expanded rule, already exists in the rule-plan information repository 11900 (Step 2008).

In a case where an expanded rule table 11950 showing the same expanded rule as the prepared expanded rule does not exist (Step 2008: No), the rule expansion program 11500 stores the expanded rule table 11950 showing the prepared expanded rule in the rule-plan information repository 11900, and registers a new entry in the analysis result management table 11970 (Step 2009). Alternatively, in a case where an expanded rule table 11950 showing the same expanded rule as the prepared expanded rule exists (Step 2008: Yes), the rule expansion program 11500 adds the event ID of the processing-target event in the received event ID 11976 and changes the value of the certainty factor 11974 of the analysis result management table 11970 (Step 2010).

After the processing (Steps 2005 through 2010) for all the entries in the general rule has been completed, the rule expansion program 11500 executes the processing (Steps 2004 through 2010) by making the next general rule the processing target. Then, after the processing (Steps 2004 through 2010) for all the general rules has been completed, the rule expansion program 11500 determines whether or not a newly registered entry exists in the analysis result management table 11970 (Step 2011), and in a case where a newly registered entry exists (Step 2011: Yes), instructs the plan creation program 11100 to execute a plan creation process (refer to FIG. 16) (Step S2012), and ends the rule expansion process. Alternatively, in a case where a newly registered entry does not exist (S2011: No), the rule expansion program 11500 ends the rule expansion process.

Figure 16:
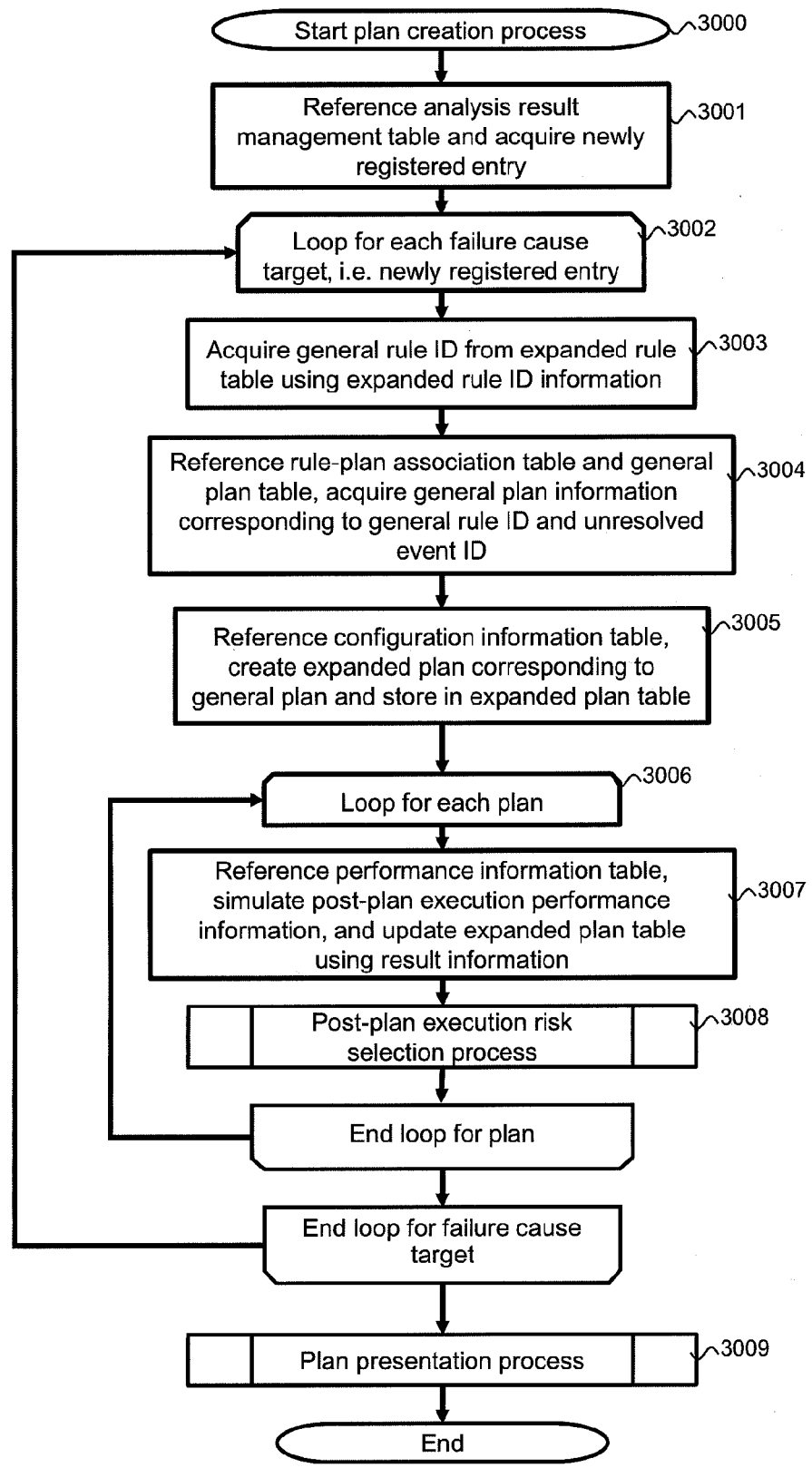
FIG. 16 is a flowchart of a plan creation process related to Example 1.

FIG. 16 is a flowchart of the plan creation process related to Example 1.

The plan creation process is executed in accordance with the management server 10000 processor 15000 executing the plan creation program 11100 deployed on the memory 11000.

First, the plan creation program 11100 acquires a newly registered entry related to analysis result (analysis result entry) from the analysis result management table 11970 (Step 3001). The plan creation program 11100 implements the processing of Steps 3003 through 3008 below for each acquired analysis result entry (Step 3002).

The plan creation program 11100 acquires the expanded rule ID stored in the expanded rule ID 11975 of the processing-target analysis result entry in the analysis result management table 11970. Hereinafter, the expanded rule having the acquired expanded rule ID will be called "processing-target expanded rule". Then, the plan creation program 11100 acquires the general rule ID of the general rule, which constitutes the basis of the processing-target expanded rule, from the pre-expansion general rule ID 11954 of the expanded rule table 11950 showing the processing-target expanded rule (Step 3003).

Next, the plan creation program 11100 acquires from the rule-plan association table 11940 one or more general plan IDs corresponding to the general rule ID acquired in Step 3003. The plan creation program 11100 also acquires from the rule-plan association table 11940 an unresolved event ID corresponding to a combination of the acquired general plan ID and the general rule ID acquired in Step 3003 (Step 3004).

Next, the plan creation program 11100 references the configuration information table 11810 and the general plan table 11930, and creates an expanded plan which is based on a general plan having the general plan ID acquired in Step 3004 and which corresponds to the processing-target expanded rule, and stores the expanded plan table 11960 showing the created expanded plan in the rule-plan information repository 11900 (Step 3005). For example, in a case where a volume migration general plan is to be expanded, the plan creation program 11100 references the configuration information table 11810 and identifies all the disk pools 22200 that could be the migration-destination pool. For example, the plan creation program 11100, based on the configuration information table 11810, identifies a disk pool 22200, which differs from the migration-source pool and can be accessed by the physical server 10000, which had been accessing the migration-target volume, and regards the identified disk pool 22200 as the migration-destination pool.

Next, the plan creation program 11100 repeatedly executes the processing of Steps 3007 and 3008 with respect to each expanded plan created in Step 3005 (Step 3006). The plan creation program 11100 references the performance information table 11820, calculates a predicted value for the post-plan execution performance value in accordance with simulating a post-plan execution state, and, based on the simulated result information, updates the value of the plan target 11964 in the expanded plan table 11960 showing the processing-target expanded plan (Step 3007).

Next, the plan creation program 11100 instructs the post-plan execution risk selection program 11200 to execute a post-plan execution risk selection process (refer to FIG. 17) for the processing-target expanded plan (Step 3008). At this time, the plan creation program 11100 inputs to the post-plan execution risk selection program 11200 an unresolved event ID of an unresolved event corresponding to the processing-target expanded plan, that is, an unresolved event, which corresponds to a combination of the general rule constituting the basis of the processing-target expanded rule and the general plan constituting the basis of the processing-target expanded plan. A risk site with respect to the processing-target expanded plan is identified in accordance with the post-plan execution risk selection process.

The plan creation program 11100, after completing the processing (Steps 3003 through 3008) for all the acquired analysis result entries, instructs the plan presentation processing program 11300 to execute a plan presentation process (refer to FIG. 18) (Step 3009). Thereafter, the plan creation program 11100 ends the plan creation process.

This example takes up performance information, in particular, a predicted value for an I/O response time, and gives an example of a simulation method, but a value other than a performance value may be used as the value to be stored in the expanded plan table 11960 as long as the value is capable of serving as an index, which demotes the characteristics of the plan. The management server 10000, for example, may perform the same simulation as that for a performance value by storing cost information pertaining to plan execution and time information pertaining to plan execution in the configuration information table 11810 or the performance information table 11820.

Figure 17:
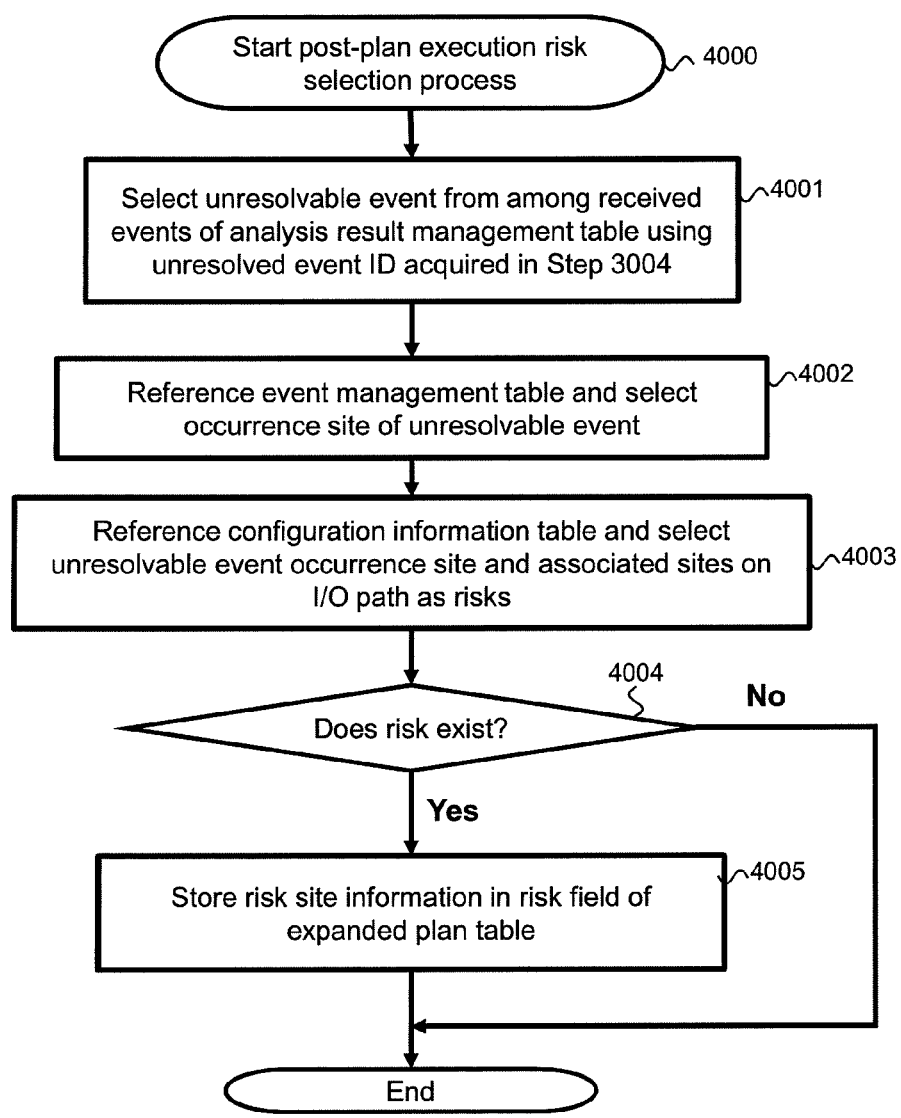
FIG. 17 is a flowchart of a post-plan execution risk selection process related to Example 1.

FIG. 17 is a flowchart of the post-plan execution risk selection process related to Example 1.

The post-plan execution risk selection process is executed in accordance with the management server 10000 processor 15000 executing the post-plan execution risk selection program 11200 deployed on the memory 11000.

First, the post-plan execution risk selection program 11200 uses an unresolved event ID received from the plan creation program 11100 to select an unresolvable event from among the actually occurred condition events registered in the received event ID 11976 of the processing-target analysis result entry in the analysis result management table 11970 (Step 4001). As used here, unresolvable event refers to an event, which corresponds to the condition event shown by the unresolved event ID, from among the condition events that have actually occurred.

For example, in a case where the first entry from the top of the analysis result management table 11970 of FIG. 13 (the entry in which the disk pool "POOL1" of the storage apparatus A is the failure cause) is selected as the processing-target analysis result entry in Step 3002 of FIG. 16, and the expanded plan "ExPlan 1-1" is selected as the processing-target expanded plan in Step 3006, the processing-target expanded rule, that is, the expanded rule shown by the expanded rule ID 11975 of the processing-target analysis result entry is the expanded rule "ExRule 1-1", and the general rule, which constitutes the basis of the processing-target expanded rule, is the general rule "Rule 1". Therefore, the unresolved event corresponding to the processing-target expanded plan "ExPlan 1-1" is the unresolved event corresponding to the combination of the general plan "Plan 1", which constitutes the basis of the expanded plan "ExPlan 1-1", and the general rule "Rule 1", and the unresolved event "3" is acquired from the rule-plan association table 11940 of FIG. 10. The unresolved event "3" shows the condition event 3 of the general rule "Rule 1", that is, the response time threshold abnormality event in the disk pool 22200 of the storage apparatus 20000. Therefore, the event "EV3", which corresponds to the response time threshold abnormality event in the disk pool 22200 of the storage apparatus 20000, is selected as the unresolvable event from among the events (event "EV2", event "EV3", and event "EV5") registered in the received event ID 11976 of the processing-target analysis result entry.

Next, the post-plan execution risk selection program 11200 references the event management table 11910 and the expanded rule table 11950, and identifies the occurrence sites (the occurrence source apparatus and device) of the unresolvable event selected in Step 4001 (Step 4002). Next, the post-plan execution risk selection program 11200 references the configuration information table 11810, and selects any one or more of the unresolvable event occurrence sites and the sites (apparatus and device) associated on the I/O path with the unresolvable event occurrence sites as risk sites (Step 4003).

In a case where risk sites have been selected in Step 4003 (Step 4004: Yes), the post-plan execution risk selection program 11200 stores data showing the selected risk sites in the risk site 11969 of the processing-target expanded plan in the expanded plan table 11969 (Step 4005), and ends the post-plan execution risk selection process. Alternatively, in a case where a risk site was not selected in Step 4003 (Step 4004: No), the post-plan execution risk selection program 11200 ends the post-plan execution risk selection process.

In this example, only business side information, which is most important for the administrator, that is, only information of the volume "/opt" of the physical server A is selected as the risk site (for example, refer to FIG. 12), but other sites on the I/O path shown by the entry of the configuration information table 11810, for example, the server data I/F and the logical volume of the storage apparatus 20000 may also be selected as the risk site.

Figure 18:
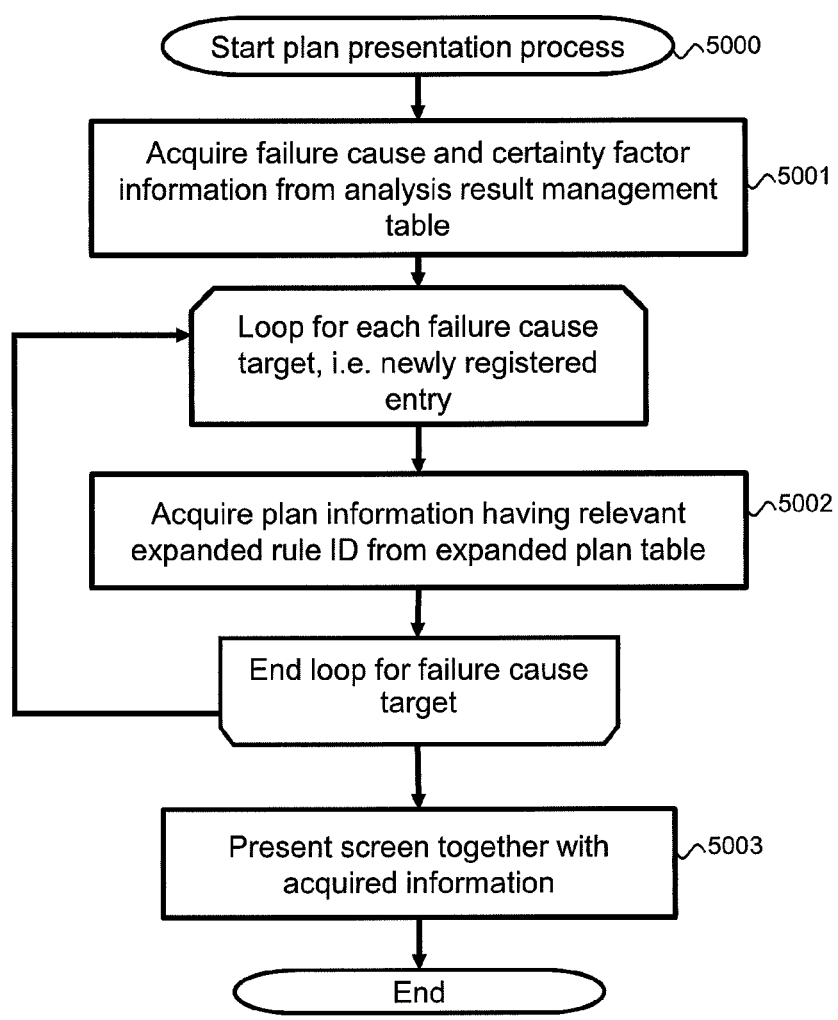
FIG. 18 is a flowchart of a plan presentation process related to Example 1.

FIG. 18 is a flowchart of the plan presentation process related to Example 1.

The plan presentation process is executed in accordance with the management server 10000 processor 15000 executing the plan presentation program 11300 deployed on the memory 11000.

First, the plan presentation program 11300 acquires from the analysis result management table 11970 information showing a failure cause, that is, the values of the cause apparatus ID 11971, the cause component ID 11972, the metrics 11973, and the certainty factor 11974 (Step 5001).

Next, the plan presentation program 11300 implements the processing of Step 5002 below with respect to each analysis result entry of the analysis result management table 11970. Here, the expanded rule having the expanded rule ID stored in the expanded rule ID 11975 of the processing-target analysis result entry will be referred to as "processing-target expanded rule".

The plan presentation program 11300 acquires from the rule-plan information repository 11900 one or more expanded plan tables 11960, which show one or more expanded plans corresponding to the processing-target expanded rule (plans, which are candidates for failure recovery) (Step 5002).

After completing the processing for all the analysis result entries (Step 5002), the plan presentation program 11300 creates a plan presentation screen (refer to FIG. 20) based on information showing the failure cause and the certainty factor acquired in Step 5001 and the expanded plan table 11960 acquired in Step 5002, and causes the output device 14000 to display the created plan presentation screen (Step 5003). Thereafter, the plan presentation program 11300 ends the plan presentation process.

Figure 19:
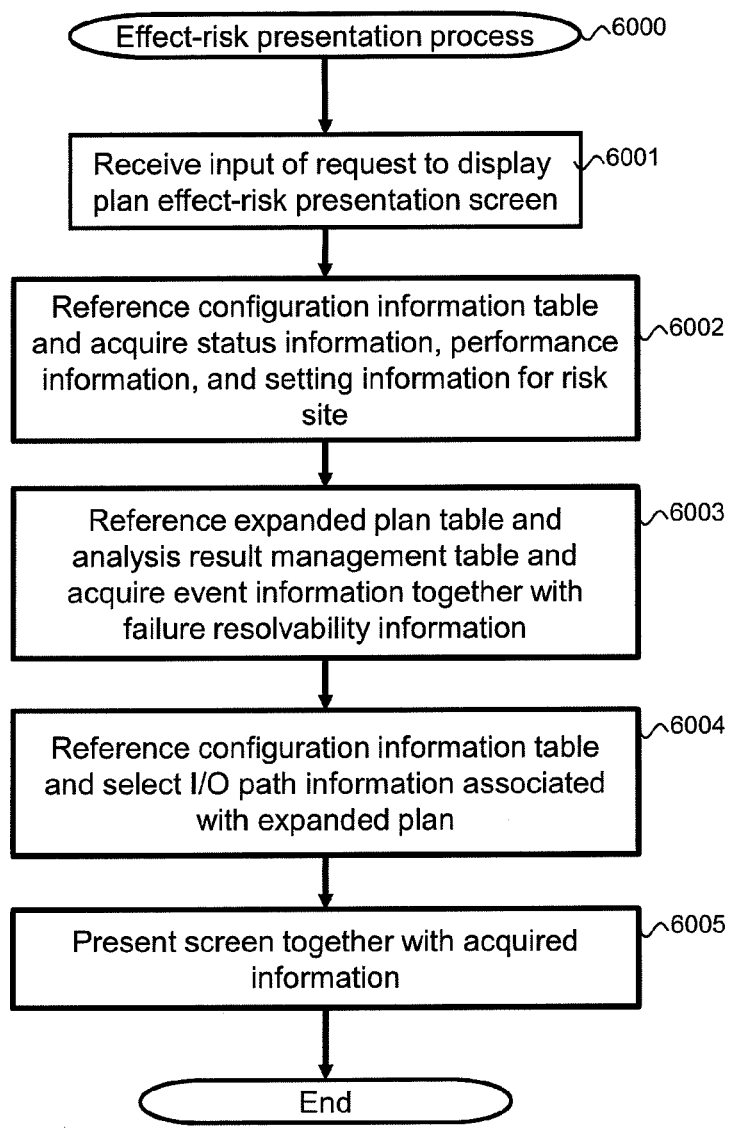
FIG. 19 is a flowchart of an effect-risk presentation process related to Example 1.

FIG. 19 is a flowchart of an effect-risk presentation process related to Example 1.

The plan presentation process is executed and the plan presentation screen is displayed in accordance with the management server 10000 processor 15000 executing the plan presentation program 11300 deployed on the memory 11000.

The plan presentation program 11300 starts the effect-risk presentation process when a desired expanded plan is selected and an input requesting the display of the plan details screen with respect to the selected expanded plan is received in the plan presentation screen (Step 6001).

First, the plan presentation program 11300 references the configuration information table 11810 and acquires risk site status information, performance information, and setting information (Step 6002). Next, the plan presentation program 11300 references the expanded plan table 11960 and the analysis result management table 11970, and acquires information showing which event of the condition events included in the expanded rule corresponding to the selected expanded plan occurred, and information showing which event will be resolved in a case where the selected expanded plan is implemented (Step 6003). Next, the plan presentation program 11300 selects I/O path information associated with the selected expanded plan (Step 6004).

Thereafter, the plan presentation program 11300 creates a plan details screen (refer to FIG. 21) based on the information acquired in Steps 6002 through 6004, and causes the output device 14000 to display the created plan details screen (Step 6005). Thereafter, the plan presentation program 11300 ends the effect-risk presentation process.

FIG. 20 is a constitutional diagram of an example of the plan presentation screen related to Example 1.

The plan presentation screen 9000 comprises a display area 9001 for displaying information, which is referenced when, in a case where a failure has occurred in the computer system, the administrator is investigating the cause of the failure and implementing countermeasures, specifically, information showing the corresponding relationship between a failure cause and a list of plans available with respect to the failure, a plan details button 9002 for displaying the details of the plans, and an execute plan button 9003 for executing a plan.

As information showing the failure cause, for example, the ID of the apparatus related to the failure cause event, the ID of the device related to the failure cause event, the type of the failure cause event, and the certainty factor of the failure cause, that is, the percentage of the number of condition events, which have actually occurred relative to the total number of condition events, are displayed in the display area 9001, which displays the association between the failure cause and a plan for countering the failure. The plan presentation program 11300 acquires these values from the analysis result management table 11970 shown in FIG. 13 in Step 5001 of FIG. 18.

As information about the plan with respect to the failure, for example, the display area 9001 displays information showing the contents of candidate plans, the costs pertaining to plan execution, the time required for plan execution (that is, the time during which the failure will remain, hereinafter referred to as "downtime"), post-plan execution performance information, and information showing a risk site. The information showing a risk site, for example, comprises data (for example, the name of the risk site) showing the risk site stored in the risk site 11969 of the expanded plan table 11960, and data (for example, the name of the apparatus) showing the apparatus, which comprises the device regarded as the risk site.

Regarding the cost information pertaining to the plan execution, for example, the management server 10000 may prestore the approximate cost pertaining to each general plan in the general plan table 11930 shown in FIG. 9, and may determine the cost based on this information. For example, with respect to the plan for replacing the storage port of general plan "Plan 8", the management server 10000 may store a sum obtained by adding up the cost of purchasing a storage port and the labor costs for the maintenance personnel needed to replace the storage port, and may display this sum as the cost. With respect to the volume migration plan of general plan "Plan 1", the management server 10000 may store the cost per bit in a case where data is migrated from a certain storage device to a different storage device, and may calculate the cost displayed in the "Cost ($)" field of FIG. 20 in accordance with the capacity of the volume to be migrated.

Regarding downtime, for example, in the case of the volume migration plan, the management server 10000 may prestore data showing about how much data can be migrated per unit of time (for example, one second) for each combination of the media type of both the migration source and the migration destination storage devices and a RAID level, and may calculate the downtime displayed in the "Downtime" field of FIG. 20 in accordance with the capacity of the volume to be migrated. At this time, the management server 10000 may take into account the fact that the migration time will fluctuate in accordance with the utilization state in the actual environment, and, using past migration history information, may calculate the capacity capable of being migrated per unit of time, and may seek to revise the prestored information by averaging the prestored information and the historical information. One example of a method for determining the cost information and downtime pertaining to plan execution has been given here, but another determination method may be employed.

As the post-plan execution performance information, for example, a predicted value for the post-plan execution performance value, which was simulated in Step 3007 of the plan creation process shown in FIG. 16 and stored in the plan target 11964 of the expanded plan table 11960 shown in FIG. 12, and, for example, the values stored in the I/O Response Time predictions 11965B, 11966B, 11967B, and 11968C are displayed. In the example of FIG. 20, a predicted value for the I/O response time with respect to the migration-target volume is displayed for the first plan from the top (the volume migration plan), and a predicted value for the I/O response time with respect to the add-target pool is displayed for the fifth plan from the top (the add disk to pool plan), but other values, for example, a predicted value for the I/O response time with respect to the migration-source pool and the migration-destination pool may be displayed for the first plan from the top (the volume migration plan), and other performance values may also be displayed. The predicted value for multiple performance values may also be displayed.

The order in which the candidate plans are displayed here may be sorted on the basis of the characteristics of the plan, such as being arranged in order from the plan with the lowest plan execution cost, being arranged in order from the plan with the shortest time required for plan execution, or being arranged in order from the plan with no risk site.

Any method may be used as the arrangement method, such as, for example, arranging the plans in order from the one having the lowest cost by clicking on the "Cost ($)" in the display area 9001.

Figure 21:
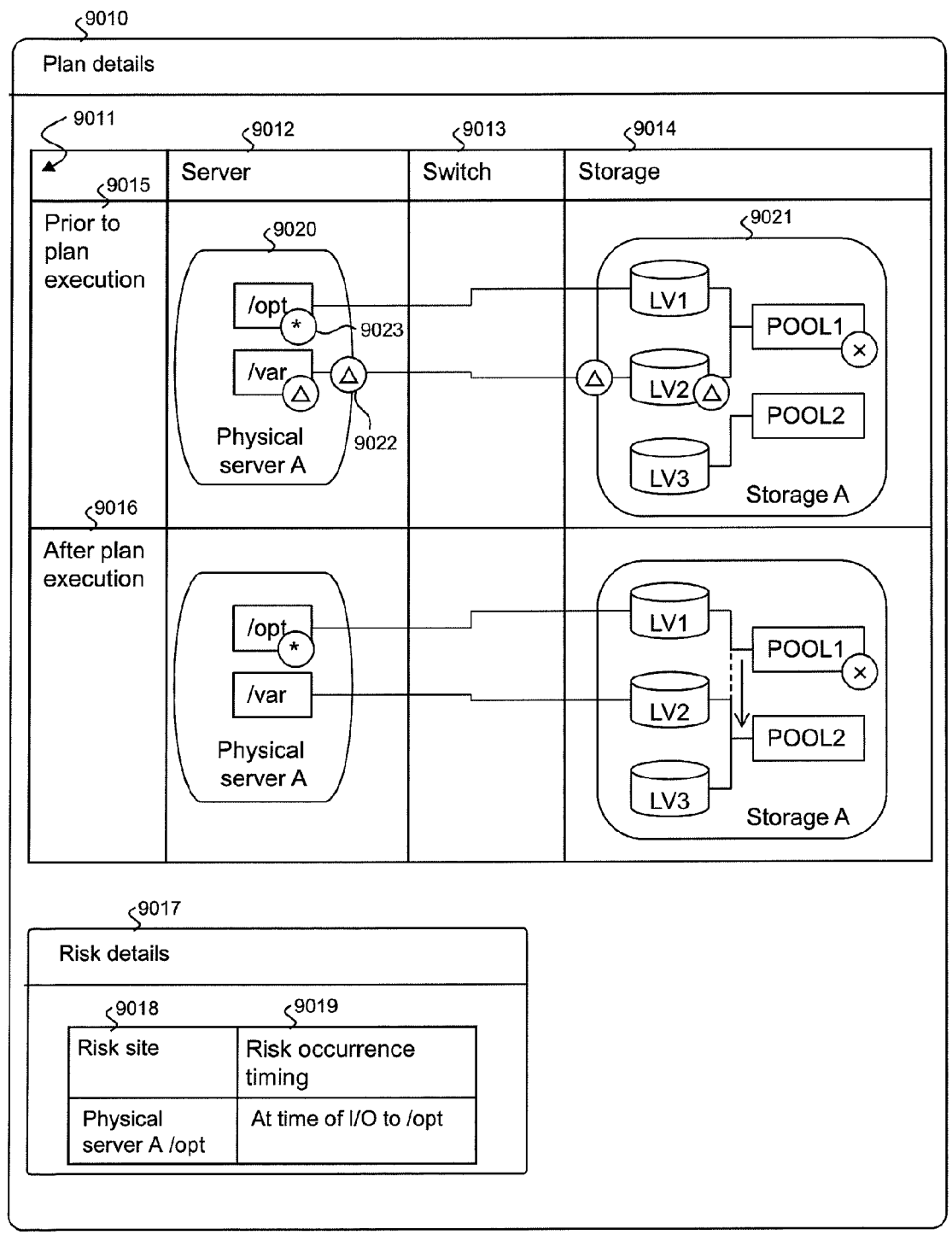
FIG. 21 is a constitutional diagram of an example of a plan details screen related to Example 1.

The plan details button 9002 is for instructing the display of the plan details screen (FIG. 21). When the administrator selects a desired plan from within the display area 9001 using the input apparatus 15000 and presses the plan details button 9002, the management server 10000 starts the execution of the effect-risk presentation process of FIG. 19, and displays the plan details screen (FIG. 21) for displaying the selected plan details information on the output apparatus 14000.

The plan execution button 9003 is for instructing the execution of the selected plan, and when this button is pressed, the management server 10000 issues a plan execution indication to the program, which provides the function corresponding to the selected plan. The program, which receives the plan execution indication, executes the selected plan. The program, which executes the plan here, for example, is a program in the memory 11000 of the management server 10000, and, for example, is a volume migration program or a VM migration program.

Also, for example, predicted values for a pre-plan execution performance value and a post-plan execution performance value may be displayed in the display area 9001 in graph form as trend information.

FIG. 20 is an example of the plan display screen 9000, and plan characteristics-denoting information other than the plan execution cost and time required for plan execution, such as, for example, a list of business operations, which are using plan-related resources and could have an affect at plan execution time, may be displayed together in the display area 9001, and another display mode may be used.

FIG. 21 is a constitutional diagram of an example of the plan details screen related to Example 1.

The plan details screen 9010 comprises a display area 9011 for displaying information, which is referenced when, in a case where a failure has occurred in the computer system, the administrator is investigating the cause of the failure and implementing countermeasures, specifically, information showing the coupling relationship between the apparatus and the device related to the failure, and a display area 9017 for displaying detailed information regarding a risk site. The display area 9011 comprises a server area 9012, which denotes the configuration of the physical server 30000 in the computer system, a switch area 9013, which denotes the configuration of the switch, a storage area 9014, which denotes the configuration of the storage apparatus 20000, an area 9015 showing the coupling relationship and the setting relationship between each apparatus and device prior to executing the plan selected in the plan presentation screen 9000, and an area 9016 showing the coupling relationship and the setting relationship between each apparatus and device after executing the selected plan. The display area 9017 for displaying detailed information regarding a risk site comprises a risk site 9018, which denotes a site where a risk remains even after plan execution, and a risk occurrence timing 9019, which denotes, when the risk site is left unattended, the timing at which the relevant risk will occur.

In the example of FIG. 21, a diagram 9020 denoting the physical server A, and a diagram 9021 denoting the storage apparatus A are displayed in the server area 9012 of the display area 9011. Also, diagrams denoting the drive "/opt" and the drive "/var", which are mount points, are displayed inside the diagram 9020, and diagrams denoting the logical volume "LV1" and the disk pool "POOL1" are displayed inside the diagram 9021. That is, the server area 9012 is for expressing the coupling relationships and the setting relationships of the computer system. In addition, a mark 9022 showing a failure event, which has occurred in the system and is being managed by the analysis result management table 11910, is displayed in the server area 9012 on the site where the failure event occurred, for example, on the data I/F "S2" of the physical server A. Also, a mark 9023 showing a risk site, which is being managed by the expanded plan table 11960, is displayed in the server area 9012 on the risk occurrence site, for example, on the drive "/opt" of the physical server A. Furthermore, the coupling relationship of an apparatus and a device, such as the physical server A and the storage apparatus A, in the area 9011 is expressed using a solid line connecting the diagrams denoting the apparatus and the device.

In the example shown in FIG. 21, the area 9015 showing the state before plan execution shows the fact that the drive "/opt" of the physical server A, the logical volume "LV1" and the disk pool "POOL1" of the storage apparatus A are associated, the drive "/var" of the physical server A, the logical volume "LV2" and the disk pool "POOL1" of the storage apparatus A are associated, and the logical volume "LV3" and the disk pool "POOL2" of the storage apparatus A are associated. The area 9015 showing the state before plan execution also shows the fact that failure events have occurred in the drive "/var" on the physical server A, the data I/F on the physical server A, the data I/F of the storage apparatus A, the logical volume "LV2" of the storage apparatus A, and the disk pool "POOL1" of the storage apparatus A, and that a risk exists in the drive "/opt" on the physical server A.

The area 9016 showing the state after plan execution shows that the logical volume "LV2", which existed in the disk pool "POOL1", has come to exist in the POOL2, and that even after plan execution, a failure event remains in the disk pool "POOL1" of the storage apparatus A, and a risk remains in the drive "/opt" on the physical server A.

Detailed information related to the device with the mark 9023 showing the risk site is displayed in the display area 9017 showing the risk details. In the example of FIG. 21, the risk details information, which is on the physical server A drive "/opt" in the display area 9011, is displayed in the area 9017, and in the example shown in FIG. 21, the area 9017 denotes that the risk site is the physical server A drive "/opt", and that the timing at which the risk could occur is when an I/O is generated to the drive "/opt". The risk occurrence timing, for example, is determined based on the information acquired in Step 6002 of FIG. 19. For example, the management server 10000 may acquire the information of the performance value 11825 of the performance information table 11820, may detect the fact that the performance value related to the physical server A drive "/opt" is 0 msec and that an I/O has not occurred, may judge that the occurrence of an I/O could trigger the occurrence of a risk, and may store the relevant information in the risk occurrence timing 9019.

The plan details screen 9010 here comprises the display area 9011 and the display area 9017, but the display method is not limited thereto, and, for example, when the mark 9023 showing the risk site of the display area 9011 is clicked, the display area 9017 may be newly displayed as a separate screen. Or, when the risk site information in the display area 9001 of the plan presentation screen 9000 is clicked, the display area 9017 may be newly displayed as a separate screen. Also, when a diagram showing either an apparatus or a device, such as the physical server 30000 or the storage apparatus 20000 of the display area 9011 is clicked, the performance values of either the relevant apparatus or device before and after plan execution may be displayed.

According to Example 1, it is possible to associatively present a failure cause and a specific recovery plan for the failure, and to check the number of events, of the failure events related to the failure cause, that has been resolved in accordance with executing the plans, and by displaying the result, to present the administrator with a problem site, which latently remains as-is even after plan execution, together with the reason therefor as plan details information. This makes it possible for the administrator to select an appropriate plan, and to readily ascertain post-plan execution risk at plan selection time.

Example 2

Next, Example 2 will be explained. In the following explanation, the focus will be on explaining the differences with Example 1, and descriptions of similar components, programs having similar functions, and tables having similar items will be omitted.

Figure 22:
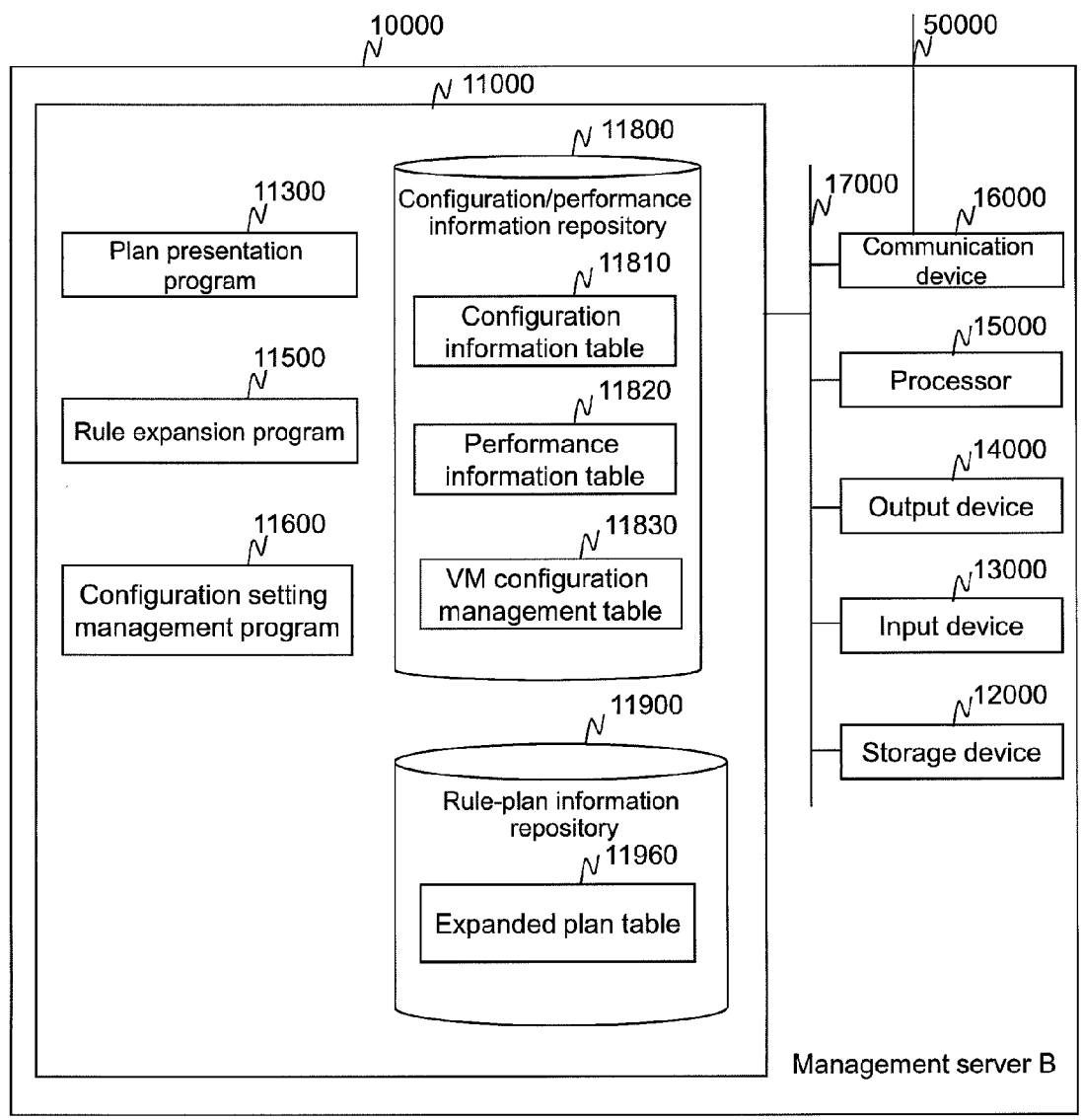
FIG. 22 is a constitutional diagram of an example of a management server related to Example 2.

FIG. 22 is a constitutional diagram of an example of a management server related to Example 2.

The management server 10000 comprises the same components as in Example 1, and, in addition, a VM configuration management table 11830 is stored in the configuration/performance information repository 11800 of the memory 11000. The VM configuration management table 11830 manages the corresponding relationship between a VM and a hypervisor (hereinafter also called "HV"), which logically creates and runs the VM, and VM setting information, for example, power status information and the like.

In the example shown in FIG. 22, the various programs and tables are stored in the memory 11000, but may be stored in either the storage device 12000 or another storage medium (not shown in the drawing). In accordance with this, the processor 15000 reads a target program on the memory 11000 at program execution time, and executes the program that was read. The above-described programs and the above-described tables may be stored in either the memory 21000 of the storage apparatus 20000 or the memory 31000 of the physical server 30000, and either the storage apparatus 20000 or the physical server 30000 may execute the stored programs. Another apparatus, such as a switch, may store the above-described programs and tables, and may execute the stored programs.

Figure 23:
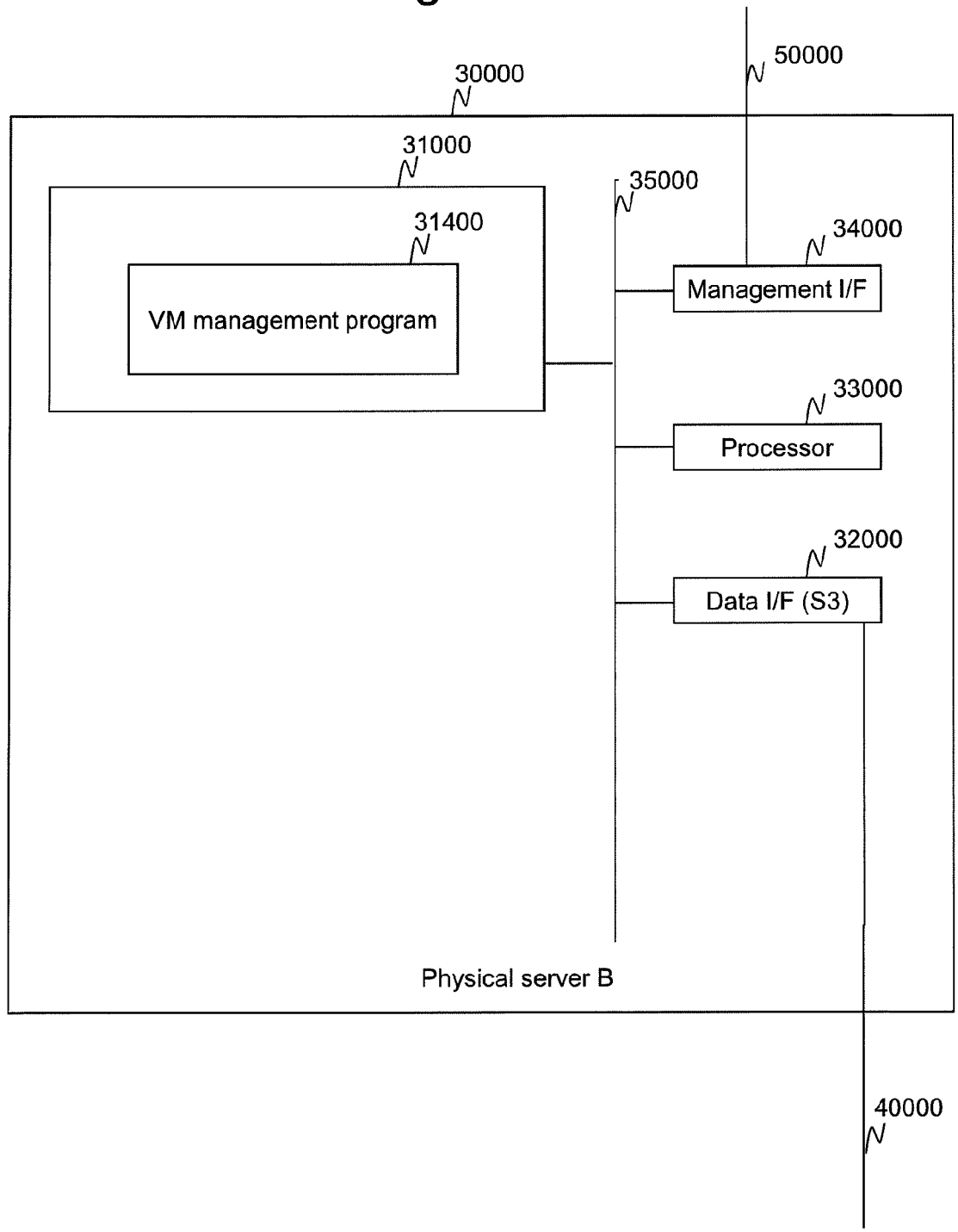
FIG. 23 is a constitutional diagram of an example of a physical server related to Example 2.

FIG. 23 is a constitutional diagram of an example of a physical server related to Example 2.

The physical server 30000 comprises the same components as in Example 1, and, in addition, a VM management program 31400 is stored in the memory 31000. The VM management program 31400 manages the configuration information and the performance information of the VM. The VM management program 31400 also carries out VM-related control, such as VM migration.

In the example shown in FIG. 23, various programs are stored in the memory 31000, but may be stored in another storage medium (not shown in the drawing). In accordance with this, the processor 33000 reads a target program on the memory 31000 at process execution time, and executes the program that was read.

Figure 24:
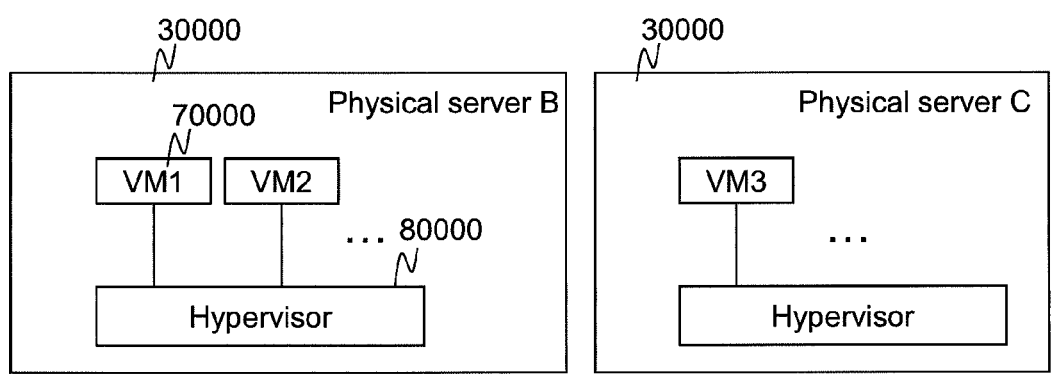
FIG. 24 is a logical constitutional diagram of an example of a physical server related to Example 2.

FIG. 24 is a logical constitutional diagram of an example of the physical server related to Example 2.

The physical server 30000 comprises an HV 80000, which logically creates a VM 70000, and runs the created VM 70000. The HV 80000 can control multiple VMs 70000 at one time. Each of the multiple VMs 70000 can execute an application just like a standalone physical computer.

Figure 25:
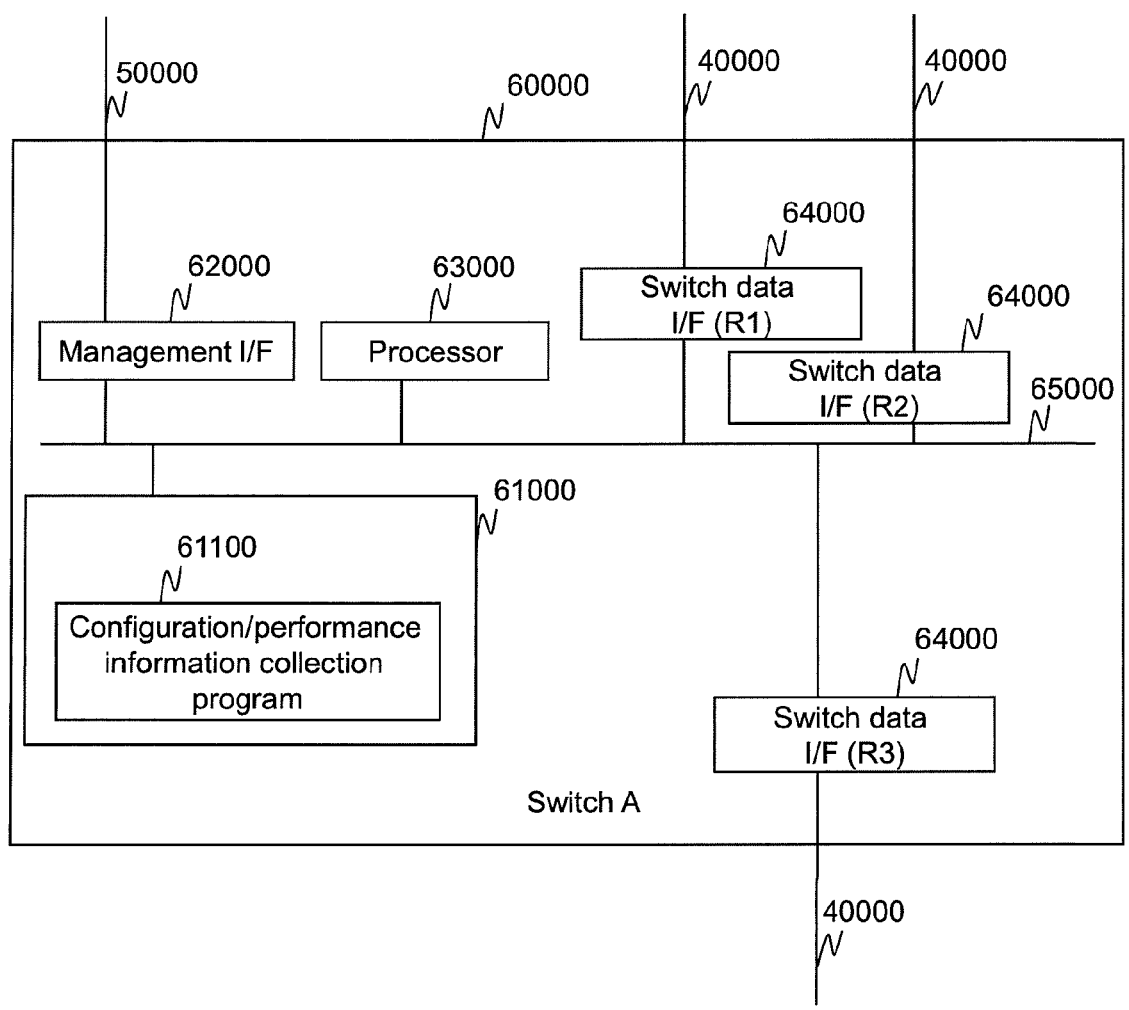
FIG. 25 is a constitutional diagram of an example of a switch related to Example 2.

FIG. 25 is a constitutional diagram of an example of a switch related to Example 2.

The switch 60000 comprises a memory 61000, a management I/F 62000, a processor 63000, and a switch data I/F 64000, and these apparatuses are coupled via an internal bus 65000 such as the internal bus 65000. The switch 60000 is an apparatus for selecting a communication route from the data I/F 32000 of the physical server 30000 to the data I/F 26000 of the storage 20000. A configuration/performance information collection program 61100 is stored in the memory 61000. The configuration/performance information collection program 61100 is for sending/receiving the management information and the performance information of the switch 60000 and the like to/from the management server 10000.

FIG. 26 is a constitutional diagram of an example of a configuration information table related to Example 2.

The configuration information table 11810 comprises the field of switch information 11818 in addition to the fields of the configuration information table 11810 related to Example 1. The switch information 11818 comprises a switch 11818A in which is stored the switch 60000 identifier, a switch data I/F IN 11818B in which is stored data showing the input data I/F of the switch 60000, and a switch data I/F OUT 11818C in which is stored data showing the output data I/F of the switch 60000. The switch information 11818 is arranged between the fields of the physical server 11811 and the storage 11814, but the relative position of this field shows the relative positions of the apparatus and device on the communication route. For example, the second entry from the top of FIG. 26 shows that switch B and switch C exist between the server data I/F "S2" of the physical server A and the storage data I/F "P2" of the storage apparatus A. More specifically, this entry shows that the physical server A server data I/F "S2" is coupled to the switch B data I/F "R10", the switch B data I/F "R11" and the switch C data I/F "R20" are coupled, and the switch C data I/F "R21" and the storage apparatus A storage data I/F "P2" are coupled. The VM 70000 configuration information is also stored in the information configuration table 11810 the same as the physical server 30000 configuration information. Therefore, an identifier for uniquely identifying the VM 70000 is stored in the physical server 11811. For example, the fifth entry from the top of FIG. 26 shows that the logical volume "LV10", which was created from the disk pool "POOL3" of storage B, is coupled to the VM1 via the storage B storage data I/F "P3", the switch A data I/F "R2", "R1" and the server data I/F "S3", and is recognized as logical volume "E:" on the VM1.

FIG. 27 is a constitutional diagram of an example of the VM configuration management table related to Example 2.

An entry is added to the VM configuration management table 11830 in accordance with the configuration setting management program 11600 being executed. The configuration setting management program 11600 comprises the fields of a virtual server 11831, a power status 11832, a physical server 11833, and a server data I/F 11834. An identifier for uniquely identifying a VM 70000 is stored in the virtual server 11831. Data showing the power status of the VM 70000, for example, "ON", "OFF", or "SUSPEND" is stored in the power status 11832. An identifier for uniquely identifying the physical server 30000 on which the VM 70000 is running is stored in the physical server 11833. An identifier for uniquely identifying the server data I/F of the physical server 30000 is stored in the server data I/F 11834.

FIG. 28 is a constitutional diagram of an example of the performance information table related to Example 2.

Figure 29:
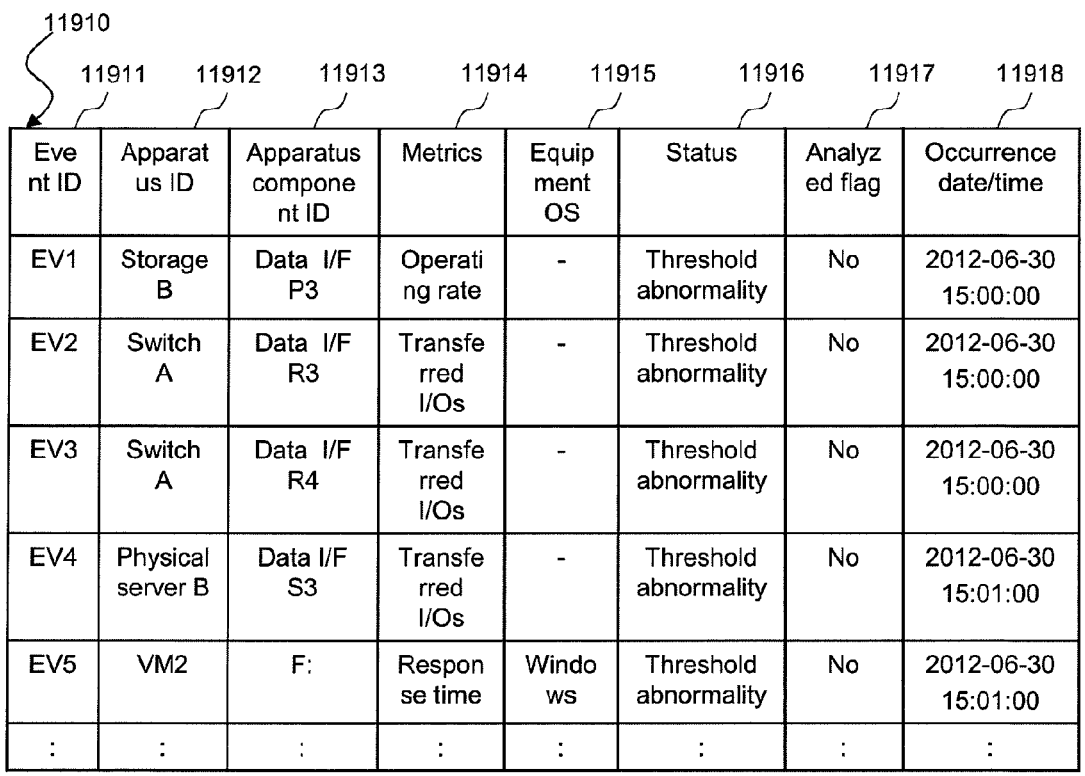
FIG. 29 is a constitutional diagram of an example of an event management table related to Example 2.

The configuration of the performance information table 11820 related to Example 2 is substantially the same as the configuration of the performance information table 11820 related to Example 1. VM 70000 performance information, hypervisor 80000 performance information, and switch 60000 performance information are also stored in the performance information table 11820 related to Example 2 as performance information related to either an apparatus or a device comprising the computer system. Here, the VM 70000 and the hypervisor 8000 are also treated as apparatuses. For example, an identifier for uniquely identifying either the VM 70000, the hypervisor 80000, or the switch 60000 is stored in the apparatus ID 11821. FIG. 29 is a constitutional diagram of an example of the event management table related to Example 2.

The configuration of the event management table 11910 related to Example 2 is substantially the same as the configuration of the event management table 11910 related to Example 1. In the event management table 11910 related to Example 2, information related to an event that has occurred in the VM 70000, information related to an event that has occurred in the hypervisor 80000, and information related to an event that has occurred in the switch 60000 are also stored as information related to an event, which occurs in either an apparatus or a device comprising the computer system.

FIG. 30A is a first constitutional diagram of a general rule table related to Example 2. FIG. 30B is a second constitutional diagram of a general rule table related to Example 2.

The configuration of the general rule table 11920 related to Example 2 is substantially the same as the configuration of the general rule table 11920 related to Example 1. In Example 2, a VM 70000-related event, a hypervisor 80000-related event, and a switch 60000-related event are also used as a condition event, which is defined by the condition part 11921 and the conclusion part 11922 of the general rule.

FIG. 31 is a constitutional diagram of an example of a rule-plan association table related to Example 2.

The configuration of the rule-plan association table 11940 related to Example 2 is substantially the same as the configuration of the rule-plan association table 11940 related to Example 1. In Example 2, general rules "Rule 3" and "Rule 4" are taken up and explained as general rules, and general plans "Plan 1" and "Plan 6" are taken up and explained as general plans.

FIG. 32A is a first constitutional diagram of the expanded rule table related to Example 2. FIG. 32B is a second constitutional diagram of the expanded rule table related to Example 2.

The configuration of the expanded rule table 11950 related to Example 2 is substantially the same as the configuration of the expanded rule table 11950 related to Example 1. In Example 2, a VM 70000-related event, a hypervisor 80000-related event, and a switch 60000-related event are also used as a condition event, which is defined by the condition part 11951 and the conclusion part 11952 of the expanded rule.

FIG. 33A is a first constitutional diagram of the expanded plan table related to Example 2. FIG. 33B is a second constitutional diagram of the expanded plan table related to Example 2. FIG. 33C is a third constitutional diagram of the expanded plan table related to Example 2.

The configuration of the expanded plan table 11960 related to Example 2 is substantially the same as the configuration of the expanded plan table 11960 related to Example 1. The same as in Example 1, the fields included in the plan target 11964 will differ in accordance with the contents of the plan.

The expanded plan shown in either FIG. 33B or FIG. 33C is an expanded plan based on the general plan "Plan 6", that is, an expanded plan related to a VM migration, and the plan target 11964, for example, comprises the fields of a target VM 1196B, a migration source 1196C, and a migration destination 1196D. The target VM 1196B comprises the fields of an ID 1196BA in which is stored the identifier of the VM 70000 (hereinafter referred to as "target VM"), which is the target of the VM migration, and a performance 1196BB in which is stored the target VM post-migration performance value. The migration source 1196C comprises the fields of an ID 1196CA in which is stored the identifier of the hypervisor 80000, which is the migration source of the target VM (hereinafter referred to as "migration-source hypervisor"), and a performance 1196CB in which is stored the performance value of the migration-source hypervisor after the target VM has been migrated. The migration destination 1196D comprises the fields of an ID 1196DA in which is stored the identifier of the hypervisor 80000, which is the migration destination of the target VM (hereinafter referred to as "migration-destination hypervisor"), and a performance 1196DB in which is stored the performance value of the migration-destination hypervisor after the target VM has been migrated. The plan creation program 11100 acquires the identifiers stored in the ID 1196BA, the ID 1196CA, and the ID 1196DA from the configuration information table 11810 and so forth, and stores these identifiers in the ID 1196DA. Furthermore, any method may be used to calculate the value of the performance information predicted values stored in the performance 1196BB, the performance 1196CB, and the performance 1196DB, and, for example, the plan creation program 11100 may determine the predicted values in accordance with either adding or subtracting the IOPS as shown in Example 1. An example of performance information has been described here, but cost information, or time information, such as system downtime resulting from a failure, may be stored. A single hypervisor 80000 serves as the migration source and the migration destination here, but a set of multiple hypervisors 80000, which share resources, or a data store inside the hypervisor 80000 may serve as the migration source and the migration destination.

FIG. 34 is a constitutional diagram of an example of the analysis result management table related to Example 2.

The configuration of the analysis result management table 11970 related to Example 2 is substantially the same as the configuration of the analysis result management table 11970 related to Example 1. In Example 2, the VM 70000 identifier, the hypervisor 80000 identifier, the switch 60000 identifier, and the identifiers of the devices thereof can be stored in a cause apparatus ID 11971 and a cause component ID 11972. Also, the identifier of an event related to the VM 70000, the identifier of an event related to the hypervisor 80000, and the identifier of an event related to the switch 60000 can be stored in the received event ID 11976.

Figure 35:
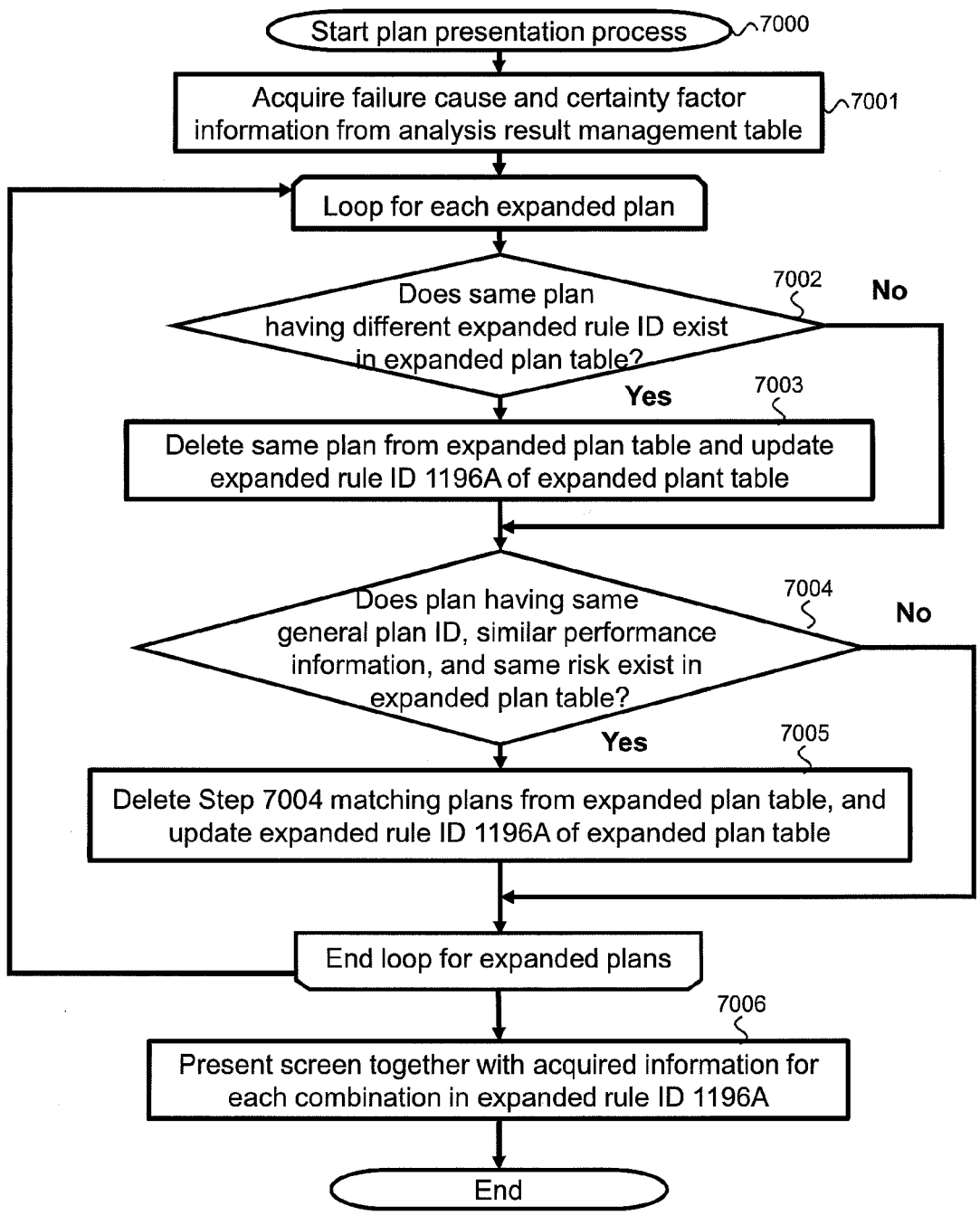
FIG. 35 is a flowchart of a plan presentation process related to Example 2.

FIG. 35 is a flowchart of the plan presentation process related to Example 2.

The plan presentation process is executed in accordance with the management server 10000 processor 15000 executing the plan presentation program 11300 deployed on the memory 11000.

First, the plan presentation program 11300 acquires information showing a failure cause from the analysis result management table 11970, that is, the values of the cause apparatus ID 11971, the cause component ID 11972, the metrics 11973, and the certainty factor 11974 (Step 7001).

Next, the plan presentation program 11300 executes the processing of Steps 7002 through 7005 below with respect to each of one or more expanded plans shown by one or more expanded plan tables 11960 stored in the rule-plan information repository 11900. The plan presentation program 11300 determines whether or not there exists among the one or more expanded plans shown by the one or more expanded plan tables 11960 stored in the rule-plan information repository 11900 an expanded plan (hereinafter referred to as "first consolidation-target plan"), which has an expanded rule ID 1196A value that differs from that of the processing-target expanded plan, that is, a corresponding expanded rule that is different, and, in addition, has the same processing content as that of the processing-target expanded plan (Step 7002).

In a case where a first consolidation-target plan does not exist (Step 7002: No), the plan presentation program 11300 advances the processing to Step 7004. Alternatively, in a case where a first consolidation-target plan exists (Step 7002: Yes), the plan presentation program 11300 deletes the first consolidation-target plan from the expanded plan table 11960, updates the value of the expanded rule ID 1196A of the expanded plan table 11960 comprising the processing-target expanded plan (Step 7003), and advances the processing to Step 7004.

For example, in the examples of FIGS. 33B and 33C, the expanded plans are such that the expanded plan "ExPlan 6-1" and the expanded plan "ExPlan 6-3", and the expanded plan "ExPlan 6-2" and the expanded plan "ExPlan 6-4" have corresponding expanded rules that differ from one another, and, in addition, have the same processing content. Therefore, in a case where the processing-target expanded plan is the expanded plan "ExPlan 6-1", the plan presentation program 11300 identifies the expanded plan "ExPlan 6-3" as the first consolidation-target plan in Step 7002, deletes the expanded plan "ExPlan 6-3" from the expanded plan table 11960 in Step 7003, and updates the value in the expanded rule ID 1196A of the expanded plan table 11960 comprising the expanded plan "ExPlan 6-1" to data showing the expanded rule "ExRule 3-1" and the expanded rule "ExRule 4-1", for example, to "ExRule 3-1, ExRule 4-1". Furthermore, in a case where the processing-target expanded plan is the expanded plan "ExPlan 6-2", the plan presentation program 11300 identifies the expanded plan "ExPlan 6-4" as the first consolidation-target plan in Step 7002, deletes the expanded plan "ExPlan 6-4" from the expanded plan table 11960 in Step 7003, and updates the value in the expanded rule ID 1196A of the expanded plan table 11960 comprising the expanded plan "ExPlan 6-2" to "ExRule 3-1, ExRule 4-1". The value in the expanded rule ID 1196A of an existing expanded plan table 11960 is updated here, but a new expanded plan table 11960 in which "ExRule 3, ExRule 4" is stored in the expanded rule ID 1196A may be prepared.

In Step 7004, the plan presentation program 11300 determines whether or not there exists in the one or more expanded plans shown by the one or more expanded plan tables 11960 stored in the rule-plan information repository 11900 an expanded plan (hereinafter referred to as "second consolidation-target plan"), which has a general plan ID 11962 that is the same as the processing-target expanded plan, that is, which has the same general plan as a basis, and, in addition, has similar performance information and has the same risk.

In a case where a second consolidation-target plan does not exist (Step 7004: No), the plan presentation program 11300 advances the processing to the next process without executing Step 7005. Alternatively, in a case where a second consolidation-target plan exists (Step 7004: Yes), the plan presentation program 11300 identifies from among the processing-target expanded plan and one or more second consolidation-target plans an expanded plan (hereinafter referred to as "best plan") having the best predicted value for the post-plan execution performance value. Then, the plan presentation program 11300 deletes from the expanded plan table 11960 the expanded plan, which is not the best plan of the processing-target expanded plan and the one or more second consolidation-target plans, and updates the value in the expanded rule ID 1196A of the expanded plan table 11960 (Step 7005).

For example, in the examples of FIGS. 33A and 33B, of the expanded plan "ExPlan 1-1", the expanded plan "ExPlan 1-2", and the expanded plan "ExPlan 1-3", which are expanded plans having the same general rule as a basis, and, in addition, similar performance information and the same risk, the expanded plan "ExPlan 1-1" is the best plan in that the migration-target volume performance is the best. Therefore, only the best plan "ExPlan 1-1" is left as-is, and the other expanded plan "ExPlan 1-2" and expanded plan "ExPlan 1-3" are deleted. Also, of the expanded plan "ExPlan 6-1" and the expanded plan "ExPlan 6-2", which are expanded plans having the same general rule as a basis, and, in addition, similar performance information and the same risk, the expanded plan "ExPlan 6-1" is the best plan in that the target VM performance is the best. Therefore, only the best plan "ExPlan 6-1" is left as-is, and the other expanded plan "ExPlan 6-2" is deleted.

The range for judging that the performance information is similar, for example, may be fixedly configured beforehand as the I/O response time being within the range of equal to or less than ±1 msc, and may be configured by the administrator via the input device 13000.

In Step 7005, the plan presentation program 11300 only leaves the best plan, for example, the one expanded plan having the fastest I/O response time, and deletes the other expanded plan(s), but may leave as-is multiple expanded plans having good predicted values for the post-plan execution performance values. The number of expanded plans left after consolidation, for example, may be fixedly decided beforehand, and may be configured by the administrator via the input device 13000. Also, the number of post-consolidation expanded plans may be decided so that all of the expanded plans are capable of being displayed in the output screen. The object of this processing is to prevent the plan selection operation performed by the administrator from becoming troublesome due to the display of a large number of similar expanded plans. For example, rather than deleting an expanded plan, a method, which displays only an expanded plan having a good post-plan execution performance value and does not display another expanded plan, and which switches between displaying and not displaying by clicking a prescribed button, may be used.

After completing the processing (Steps 7002 through 7005) for all the expanded plans, the plan presentation program 11300, based on the information showing the failure cause and the certainty factor acquired in Step 7001 and the expanded plan table 11960 stored in the rule-plan information repository 11900, creates a plan presentation screen 9000 (refer to FIG. 36) and causes the output device 14000 to display the created plan presentation screen 9000 (Step 7006). Thereafter, the plan presentation program 11300 ends the plan presentation process.

Figure 36:
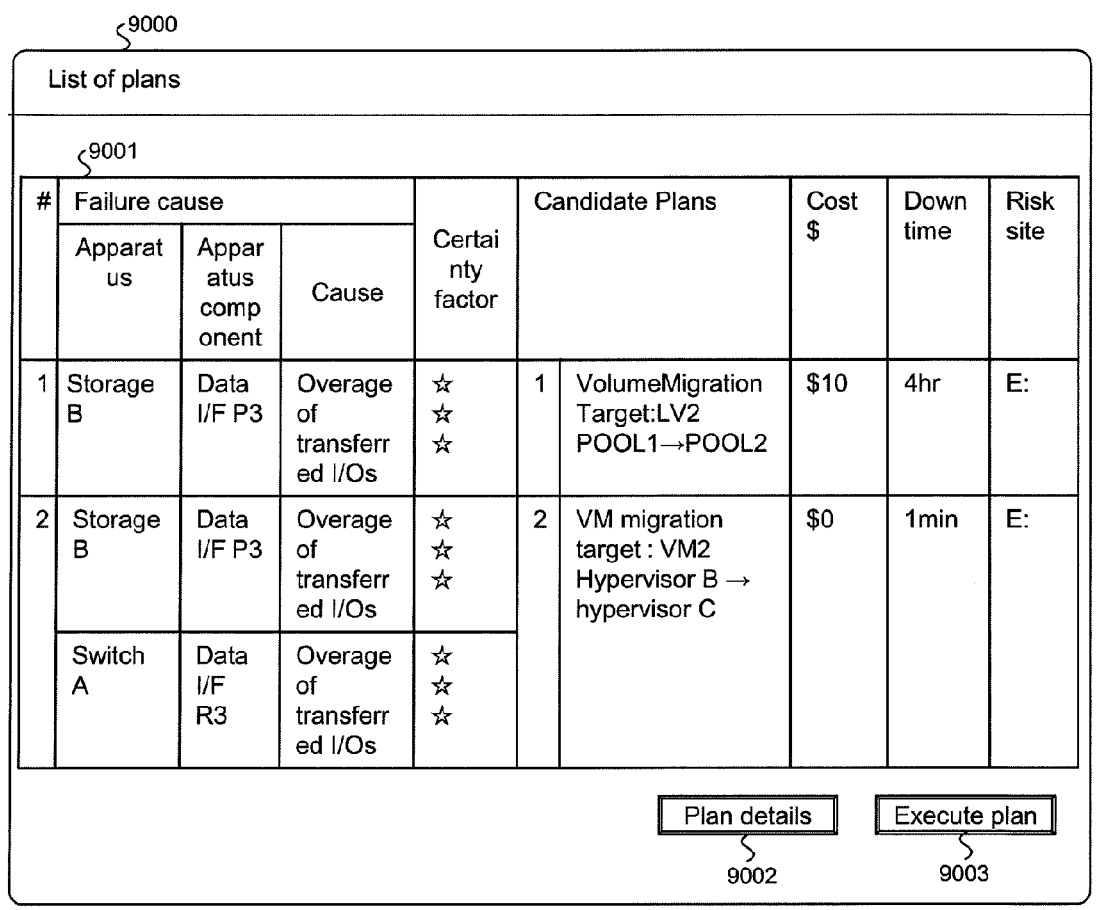
FIG. 36 is a constitutional diagram of an example of a plan presentation screen related to Example 2.

FIG. 36 is a constitutional diagram of an example of the plan presentation screen related to Example 2.

The configuration of the plan presentation screen 9000 related to Example 2 is substantially the same as the configuration of the plan presentation screen 9000 related to Example 1.

In Example 2, the expanded plans shown in FIGS. 33A, 33B, and 33C are created in accordance with the plan creation process. Specifically, the expanded plan "ExPlan 1-1", the expanded plan "ExPlan 1-2", and the expanded plan "ExPlan 1-3" are created as volume migration-related expanded plans, and the expanded plan "ExPlan 6-1", the expanded plan "ExPlan 6-2", the expanded plan "ExPlan 6-3", and the expanded plan "ExPlan 6-4" are created as VM migration-related expanded plans. That is, a total of seven expanded plans are created. According to the plan presentation process related to Example 2 shown in FIG. 35, of the expanded plan "ExPlan 1-1", the expanded plan "ExPlan 1-2", and the expanded plan "ExPlan 1-3", only the expanded plan "ExPlan 1-1", which is the plan having the best migration-target volume performance, is left as-is, and the expanded plan "ExPlan 1-2" and the expanded plan "ExPlan 1-3" are deleted. Also, according to the plan presentation process, of the expanded plan "ExPlan 6-1", the expanded plan "ExPlan 6-2", the expanded plan "ExPlan 6-3", and the expanded plan "ExPlan 6-4", only the expanded plan "ExPlan 6-1", which is the one plan via which the performance of the target VM will become the best, is left as-is, and the expanded plan "ExPlan 6-2", the expanded plan "ExPlan 6-3", and the expanded plan "ExPlan 6-4" are deleted. This example shows that it is possible to consolidate the expanded plan corresponding to the general rule in which the failure cause is the storage apparatus 20000 and the expanded plan corresponding to the general rule in which the failure cause is the switch 60000. In this screen 9000, essentially, any display method may be used as long as it makes it possible to illustrate the fact that a plan with respect to failures having different root causes is shared in common, and the display method is not limited to the one shown in FIG. 36.

According to Example 2, it is possible to associatively present a failure cause and a specific recovery plan for the failure, and to check the number of events, of the failure events related to the failure cause, that has been resolved in accordance with executing the plans, and by displaying the result, to present the administrator with a problem site, which latently remains as-is even after plan execution, together with the reason therefor as plan details information. This makes it possible for the administrator to select an appropriate plan, and to readily ascertain post-plan execution risk at plan selection time. Also, by consolidating expanded plans via which identical or similar effects are obtained into a single plan, it is possible to curb the presentation of redundant plans, and, in a case where numerous recovery plans exist with respect to a failure, it is possible to reduce the number of plans presented to the administrator and to lower the administrator's costs with respect to plan details checking operations and plan selection operations.

Example 3

Next, Example 3 will be explained. In the following explanation, the focus of the explanation will be on the differences with Example 1 and Example 2, and descriptions of similar components, programs having similar functions, and tables having similar items will be omitted.

Figure 37:
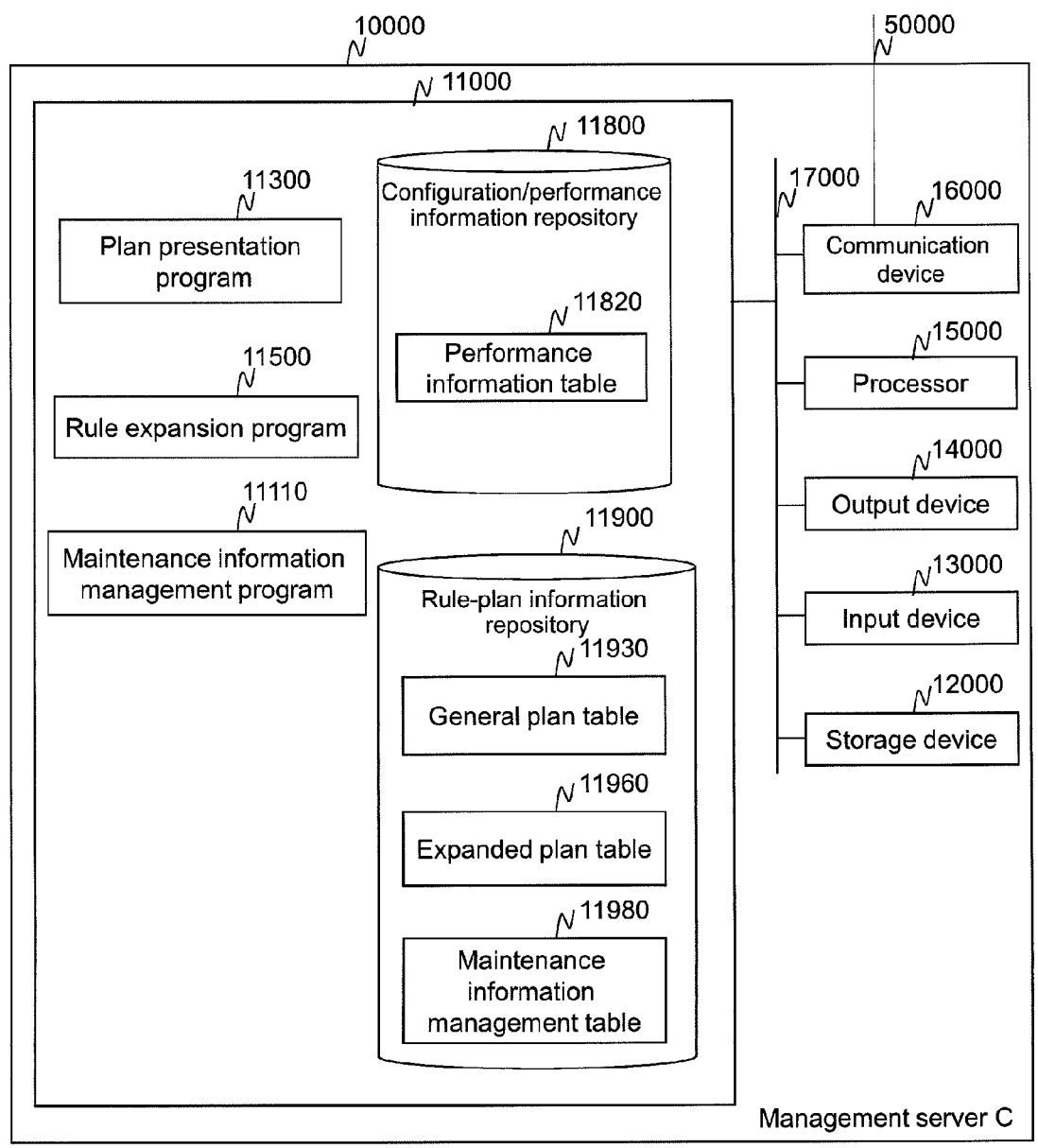
FIG. 37 is a constitutional diagram of an example of a management server related to Example 3.

FIG. 37 is a constitutional diagram of an example of a management server related to Example 3.

The management server 10000 comprises the same components as in Example 2, and, in addition, a maintenance information management program 11110 is stored in the memory 11000. In addition, a maintenance information management table 11980 is stored in the rule-plan information repository 11900. The maintenance information management table 11980 manages information related to replacement and maintenance operations due to apparatus renewal.

In the example shown in FIG. 37, the various programs and tables are stored in the memory 11000, but these programs and tables may be stored in either the storage device 12000 or another storage medium (not shown in the drawing). In accordance with this, the processor 15000 reads a target program on the memory 11000 at program execution time, and executes the program that was read. The above-described programs and the above-described tables may be stored in either the storage apparatus 20000 memory or the physical server 30000 memory, and either the storage apparatus 20000 or the physical server 30000 may execute the stored programs. Another apparatus, such as a switch 60000, may store the above-described programs and tables, and may execute the stored programs.

Figure 38:
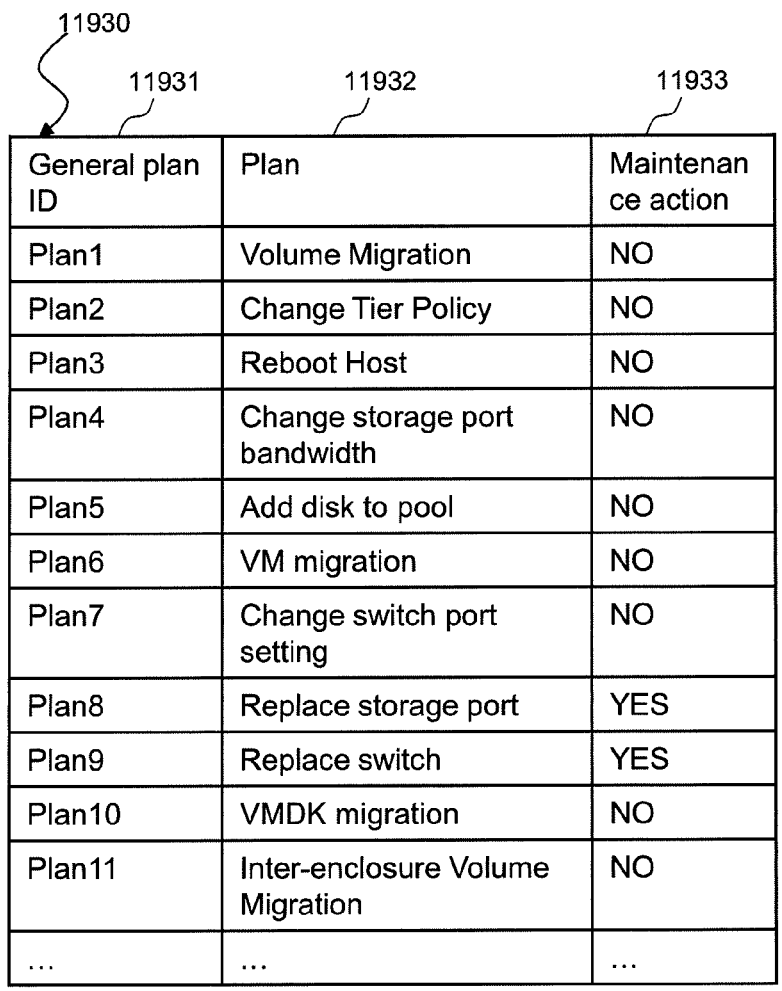
FIG. 38 is a constitutional diagram of an example of a general plan table related to Example 3.

FIG. 38 is a constitutional diagram of an example of a general plan table related to Example 3.

The general plan table 11930 manages a list of plans available in the computer system. The general plan table 11930 comprises the fields of a general plan ID 11931, a plan 11932, and a maintenance action 11933. A general plan ID, which is the identifier of the general plan, is stored in the general plan ID 11931. Information showing the plans, which are available in the computer system, is stored in the plan 11932. Information showing whether or not the relevant plan is a plan related to a maintenance schedule is stored in the maintenance action 11933. For example, a plan in which physical hardware is to be replaced, such as the storage port replacement of the general plan "Plan 8" and the switch replacement of the general plan "Plan 9", is regarded as a plan related to a maintenance schedule.

FIG. 39 is a constitutional diagram of an example of a rule-plan association table related to Example 3.

The configuration of the rule-plan association table 11940 related to Example 3 is substantially the same as the configuration of the rule-plan association table 11940 related to Example 1. In Example 3, general rule "Rule 4" is taken up and explained as the general rule, and general plans "Plan 6" and "Plan 9" are taken up and explained as the general plans.

FIG. 40A is a first constitutional diagram of the expanded plan table related to Example 3. FIG. 40B is a second constitutional diagram of the expanded plan table related to Example 3.

The configuration of the expanded plan table 11960 related to Example 3 is substantially the same as the configuration of the expanded plan table 11960 related to Example 1. The same as in Example 1, the fields included in the plan target 11964 will differ in accordance with the contents of the plan.

Regarding the expanded plan based on the general plan "Plan 9" of FIG. 40B, that is, the expanded plan related to replacing a switch, the plan target 11964, for example, comprises the fields of a replacement-target switch 1196E in which is stored the identifier of the switch 60000, which is targeted for replacement (hereinafter referred to as "replacement-target switch"), and a Cost 1196F in which is stored data denoting the replacement cost. The plan creation program 11100 acquires the identifier of the replacement-target switch from the configuration information table 11810, and stores this identifier in replacement-target switch 1196E. The plan creation program 11100 acquires the value stored in the Cost 1196F from the maintenance information management table 11980, and stores this value in the Cost 1196F. An example in which only the replacement target identification information and the cost information are stored has been described here, but other information, for example, information showing about how much time it will take to replace the switch 60000 may be stored.

Figure 41:
FIG. 41 is a constitutional diagram of an example of a maintenance information management table related to Example 3.

FIG. 41 is a constitutional diagram of an example of the maintenance information management table related to Example 3.

The maintenance information management table 11980 manages schedule information in accordance with which the administrator performs a maintenance operation, such as hardware replacement. This table 11980, for example, is created manually and inputted by the administrator. The maintenance information management table 11980 comprises the fields of an apparatus 11981, an apparatus component 11982, a replacement reason 11983, a replacement date/time 11984, an affected service 11985, and a cost 11986. The apparatus ID of an apparatus targeted for a maintenance operation is stored in the apparatus 11981. The identifier of a device targeted for a maintenance operation is stored in the apparatus component ID 11982. Information showing the reason that a replacement was scheduled is stored in the replacement reason 11983. Information showing the date and time of the replacement is stored in the replacement date/time 11984. The identifier of a service, which will be affected by replacing a device targeted for the maintenance operation, is stored in the affected service 11985. Information showing the cost of replacing the device targeted for the maintenance operation is stored in the cost 11986.

Figure 42:
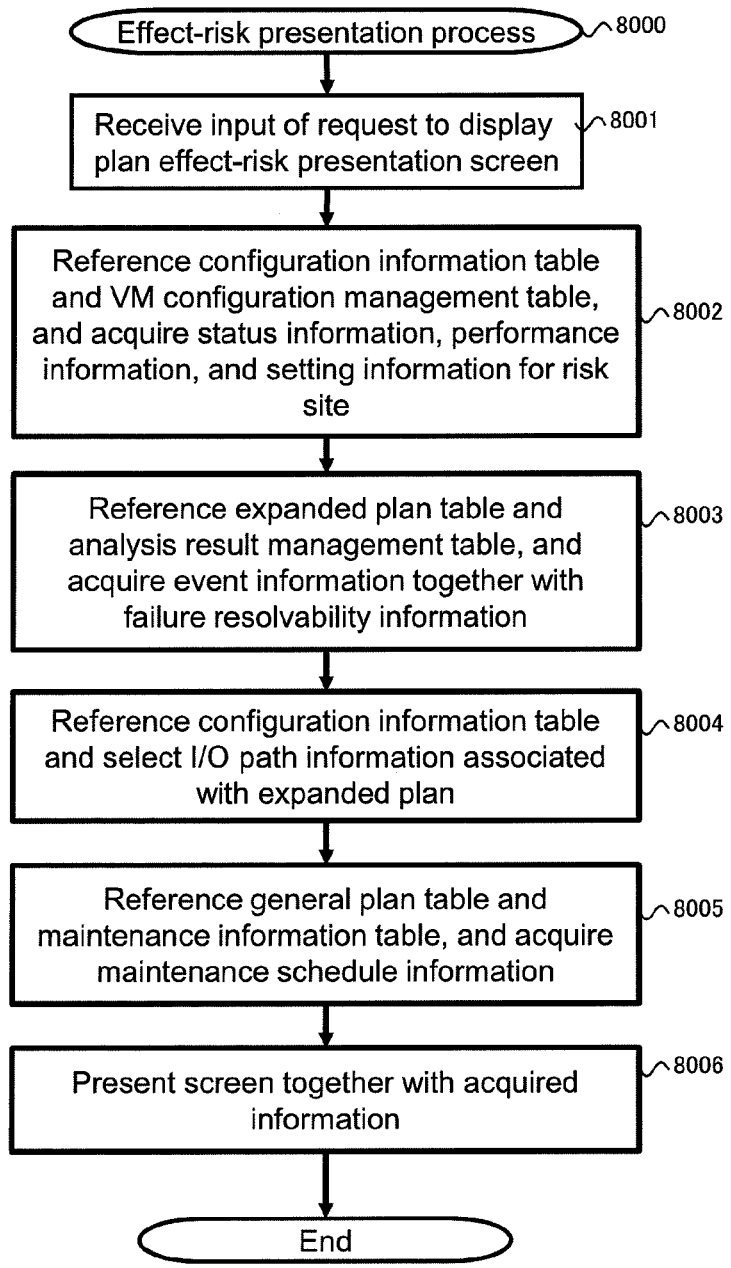
FIG. 42 is a flowchart of an effect-risk presentation process related to Example 3.

FIG. 42 is a flowchart of the effect-risk presentation process related to Example 3.

The processing of Steps 8001 through 8004 is the same processing as the processing of Steps 6001 through 6004 in the effect-risk presentation process related to Example 1, and as such, explanations of these steps will be omitted.

In Step 8005, the plan presentation program 11300 references the information in the maintenance action 11933 of the general plan table 11930 and the maintenance information table 11980, and acquires information related to a maintenance schedule.

Thereafter, the plan presentation program 11300 creates a plan details screen 9010 (refer to FIG. 43) based on the information acquired in Steps 8002 through 8005, and causes the output device 14000 to display the created plan details screen 9010 (Step 8006). Thereafter, the plan presentation program 11300 ends the effect-risk presentation process.

Figure 43:
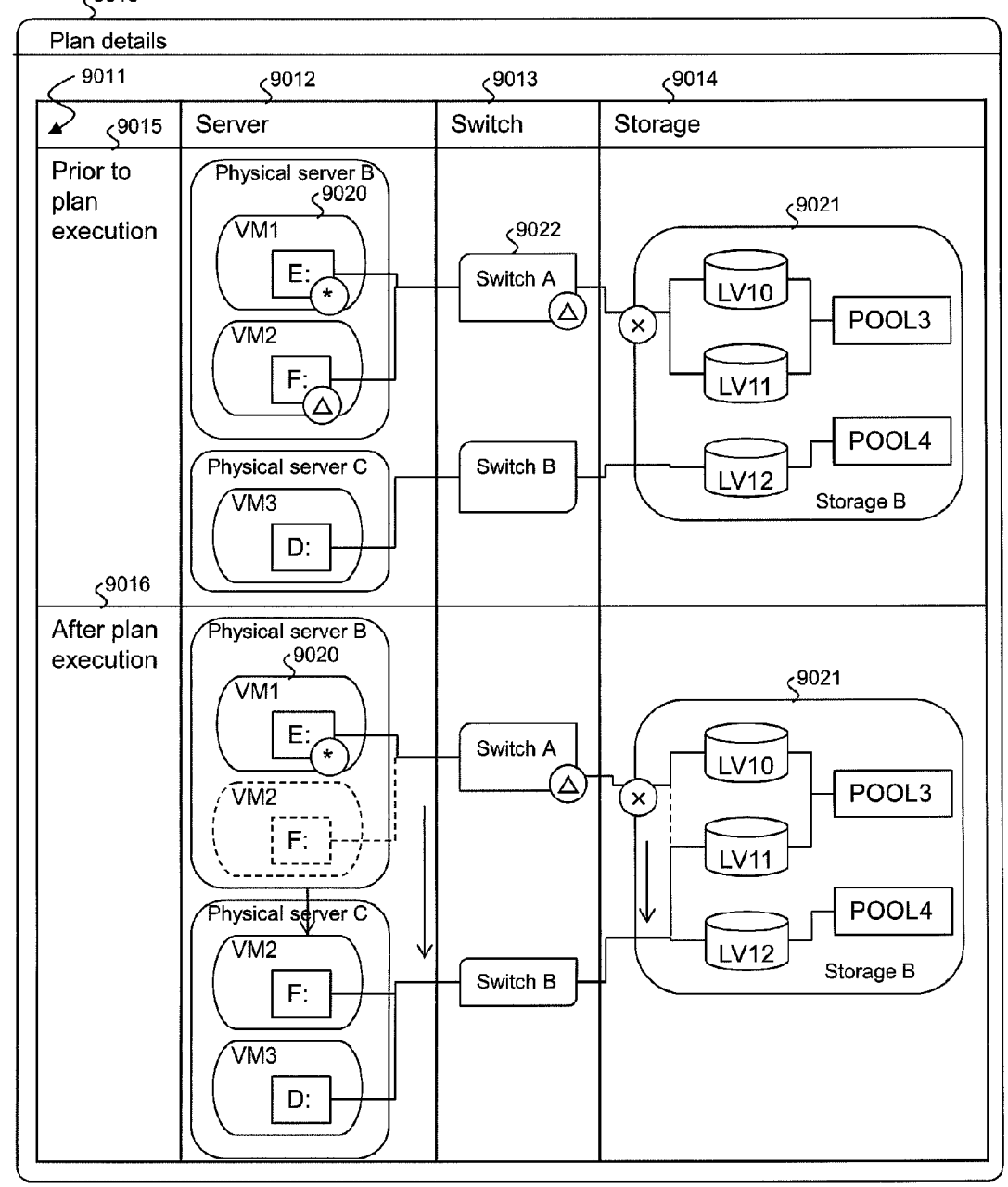
FIG. 43 is a constitutional diagram of an example of a plan details screen related to Example 3.

FIG. 43 is a constitutional diagram of an example of the plan details screen related to Example 3.

The configuration of the plan details screen 9010 related to Example 3 is substantially the same as the configuration of the plan details screen 9010 related to Example 1.

In the example shown in FIG. 43, the area 9015 showing the state before plan execution shows the fact that the VM1 drive "E:", the switch A, the data I/F "P3" of the storage B, the logical volume "LV10" of the storage B, and the disk pool "POOL3" are associated, the VM2 drive "F:", the switch A, the logical volume "LV11" of the storage B, and the disk pool "POOL3" are associated, and the VM3 drive "D:", the switch B, the logical volume "LV12" of the storage B, and the disk pool "POOL4" are associated. The area 9015 showing the state before plan execution also shows the fact that failure events have occurred in the VM2 drive "F:", the switch A data I/F, and the storage B data I/F, and that a risk exists in the VM1 drive "E:".

The area 9016 showing the state after plan execution shows that the VM2, which had been running on the hypervisor 80000 of the physical server B, is running on the hypervisor 80000 of the physical server C, and that after plan execution, the VM2 drive "F:", the switch B, the storage B data I/F, the logical volume "LV11" of the storage B, and the disk pool "POOL3" are associated, a failure event remains in the switch A data I/F and the storage B data I/F, and a risk remains in the VM1.

In Example 3, the area 9017, which shows the risk details, denotes that the risk site is the VM1 drive "E:", and that the timing at which the risk could occur is when the power to the drive "E:" is turned ON. The risk occurrence timing, for example, is determined based on the information acquired in Step 8002 of FIG. 42. For example, the management server 10000 may acquire the information in the power status 11832 of the VM configuration management table 11830, may detect the fact that the VM1 power status is OFF, may judge that the resumption of business operations accompanying the powering ON of the VM could trigger the occurrence of a risk, and may store the relevant information in the risk occurrence timing 9019.

A display area 9022 for showing the maintenance schedule, for example, comprises the fields of an area 9023 in which is displayed the identifier of either an apparatus or a device targeted for replacement in a maintenance operation, an area 9024 is which is displayed a replacement reason, and an area 9025 in which is displayed a replacement date/time. A replacement target, which is displayed in the display area 9022 showing the maintenance schedule, for example, is limited to either an apparatus or a device in which a failure event has occurred, and this information is acquired via the processing of Step 8005 in the effect-risk presentation process of FIG. 42. The information, for example, the cost information shown in the maintenance information management table 11980 of FIG. 41 may be collectively displayed in the display area 9022. The administrator, who references the information related to the maintenance schedule, for example, is able to check the replacement date/time in accordance with the maintenance of either the apparatus or device where the failure occurred, and, along with taking actions with respect to the failure, to either replace the switch ahead of schedule, or, since switch replacement is near at hand, to select a VM migration-based plan as a temporary measure even though a certain amount of risk remains.

In Example 3, the display area 9011, the display area 9017, and the display area 9022 are displayed in the same screen, but the display method is not limited thereto, and, for example, when a diagram showing either the apparatus or the device configured in the maintenance schedule of the display area 9011, for example, switch A, is clicked, the display area 9022 may be newly displayed as a separate screen. Or, when a plan displayed in the display area 9001 of the plan presentation screen 9000 is clicked, the display area 9022 may be newly displayed as a separate screen. When a diagram showing either an apparatus or a device, such as the physical server 30000 or the storage apparatus 20000 in the display area 9011 is clicked, the performance values of the relevant apparatus or device before and after plan execution may be displayed.

According to Example 3, it is possible to associatively present a failure cause and a specific recovery plan for the failure, and to check the number events, of the failure events related to the failure cause, that has been resolved in accordance with executing the plans, and by displaying the result, to present the administrator with a problem site, which latently remains as-is even after plan execution, together with the reason therefor as plan details information. This makes it possible for the administrator to select an appropriate plan, and to readily ascertain post-plan execution risk at plan selection time. Also, in the case of a plan, which can be associated with a maintenance schedule, a check can be performed in conjunction with a maintenance schedule in the plan details screen 9010, making it easier for the administrator to ascertain the importance of the affects of the maintenance, thereby enabling the administrator to select a plan that will reduce costs.

Needless to say, the present invention is not limited to the examples explained hereinabove, and various changes are possible without departing from the gist thereof.

REFERENCE SIGNS LIST

10000 Management server
20000 Storage apparatus
30000 Physical server

The invention claimed is:

1. A management system for managing a computer system, which comprises multiple monitoring-target devices, comprising:
   a storage device; and
   a control device coupled to the storage device,
   wherein the storage device is configured to store
      a general rule, which shows a corresponding relationship between one or more condition events, which are related to any of the multiple monitoring-target devices, and a conclusion event, which is related to any of the multiple monitoring-target devices and constitutes a cause in a case where the one or more condition events have occurred, this general rule moreover denoting a monitoring-target device related to the condition event and the conclusion event according to the relevant monitoring-target device type;
      general plan information, which shows a corresponding relationship between the general rule and one or more general plans, which are recovery plans available in a case where the conclusion event of the general rule is a cause;
      unresolved information, which shows, for each combination of the general rule and the general plan, a condition event of the relevant general rule that remains unresolved in a case where the relevant general plan has been implemented; and
      configuration information, which shows a coupling relationship between the multiple monitoring-target devices,
   wherein the control device is configured to
      create, based on the general rule and the configuration information, multiple expanded rules, which denote, by means of data showing an identified monitoring-target device, the type of monitoring-target device related to the condition event and the conclusion event,
      perform, based on the created multiple expanded rules in a case where an event related to any of the multiple monitoring-target devices has occurred, a cause analysis by regarding the occurred event as the condition event, and identifying a first conclusion event, which constitutes a candidate for the cause of the occurred event,
      create, based on the general plan information, one or more expanded plans, which are recovery plans that can be implemented in a case where the first conclusion event is a cause, and expand, by taking into account the actual configuration of the computer system, a general plan corresponding to the general rule, which constitutes the basis of an expanded rule comprising the first conclusion event,
      identify, based on the unresolved information for each of the created one or more expanded plans, an unresolved event, which remains unresolved in a case where the relevant expanded plan has been implemented, and identifying, based on the identified unresolved event, a risk site, which is a monitoring-target device for which a problem remains even after the relevant expanded plan has been implemented, and
      display data showing the first conclusion event, the created one or more expanded plans, and the identified risk site.

2. A management system according to claim 1,
   wherein the control device is configured to
      identify, with respect to the created one or more expanded plans, a condition event, which remains unresolved and corresponds to a combination of a general plan, which constitutes the basis of the relevant expanded plan, and a general rule, which constitutes the basis of a first expanded rule comprising the first conclusion event,
identify as the unresolved event a condition event of the first expanded rule corresponding to the identified condition event, and
identify as the risk site any one or more monitoring-target devices from among a monitoring-target device related to the identified unresolved event, and a monitoring-target device comprising a coupling relationship with a monitoring-target device related to the identified unresolved event.

3. A management system according to claim 2,
wherein the control device is configured to
in a case where a general plan, which corresponds to a general rule constituting the basis of a first expanded rule comprising the first conclusion event, is a volume migration, create a first expanded plan related to a volume migration, which regards a monitoring-target device, which is a volume related to any condition event and conclusion event of the first expanded rule, as the migration-source volume, and regards a monitoring-target device, which is a volume comprising a coupling relationship with the migration-source volume, as a migration-destination volume,
compute, based on an I/O response time for the migration-source volume and the migration-destination volume with respect to the first expanded plan, a predicted value for the I/O response time of the migration-source volume and the migration-destination volume after the first expanded plan has been implemented, and
display the I/O response time predicted value.

4. A management system according to claim 3,
wherein the control device is configured to
in a case where a general plan, which corresponds to a general rule constituting the basis of a first expanded rule comprising the first conclusion event, is disk addition to pool, create a first expanded plan related to disk addition to pool, which regards a monitoring-target device, which is a pool related to any condition event and conclusion event of the first expanded rule, as the disk addition-target pool,
compute, based on an I/O response time for the add-target pool and a before-and-after disk addition capacity ratio of the add-target pool with respect to the first expanded plan, a predicted value for the I/O response time of the add-target pool after the first expanded plan has been implemented, and
display the I/O response time predicted value.

5. A management system according to claim 4,
wherein the control device is configured to
compute, with respect to each of the created one or more expanded plans and based on a performance value related to a monitoring-target device, which is related to the relevant expanded plan, a predicted value for the performance value after implementation of the relevant expanded plan related to the monitoring-target device, which is related to the relevant expanded plan, and
further display the predicted value for the performance value.

6. A management system according to claim 5,
wherein the control device is configured to
consolidate either the same or similar multiple expanded plans from among the created one or more expanded plans into a single expanded plan, and
display data showing the consolidated expanded plan.

7. A management system according to claim 6,
wherein the storage device is configured to further store maintenance schedule information, which shows a schedule of maintenance operations to be performed for any of the multiple monitoring-target devices, and
wherein the control device is configured to further display data showing the schedule of maintenance operations to be performed for a monitoring-target device, which is related to the expanded plan.

8. A management system according to claim 7,
wherein the storage device is configured to further store cost information showing, with respect to each of the one or more general plans, the cost required for implementing the relevant general plan, and
wherein the control device is configured to
compute, with respect to each of the created one or more expanded plans, the cost required for implementing the relevant expanded plan based on a cost required for implementing a general plan constituting the basis of the relevant expanded plan, and
further display the computed cost.

9. A computer program for a management method for managing a computer system, which comprises multiple monitoring-target devices,
the computer program causing a computer to execute:
creating, based on a general rule, which shows a corresponding relationship between one or more condition events related to any of the multiple monitoring-target devices and a conclusion event related to any of the multiple monitoring-target devices constituting a cause in a case where the one or more condition events have occurred, and which denotes, in accordance with the type of the relevant monitoring-target device, a monitoring-target device, which is related to the condition event and the conclusion event, and based on configuration information, which shows a coupling relationship between the multiple monitoring-target devices, multiple expanded rules denoting, in accordance with data showing an identified monitoring-target device, a monitoring-target device, which is related to the condition event and the conclusion event;
performing, based on the created multiple expanded rules in a case where an event related to any of the multiple monitoring-target devices has occurred, a cause analysis regarding the occurred event as the condition event, and identifying a first conclusion event, which constitutes a candidate for the cause of the occurred event;
creating, based on general plan information showing a corresponding relationship between the general rule and one or more general plans, which are recovery plans that can be implemented in a case where the conclusion event of the general rule is a cause, one or more expanded plans, which are recovery plans that can be implemented in a case where the first conclusion event is a cause, and which expand, by taking into account the actual configuration of the computer system, a general plan corresponding to the general rule constituting the basis of an expanded rule, which comprises the first conclusion event;
identifying, based on unresolved information, which shows, for each combination of a general rule and a general plan, a condition event of the relevant general rule, which remains unresolved in a case where the relevant general plan has been implemented, for each of the created one or more expanded plans, an unresolved event, which remains unresolved in a case where the relevant expanded plan has been implemented, and identifying, based on the identified the unresolved event, a risk site, which is a monitoring-target device for which a problem remains even after the relevant expanded plan has been implemented; and displaying data, which shows the first conclusion event, the created one or more expanded plans, and the identified risk site.

10. A computer program according to claim 9, which causes a computer to execute:
identifying, with respect to each of the created one or more expanded plans, a condition event, which remains unresolved and corresponds to a combination of a general plan, which constitutes the basis of the relevant expanded plan, and a general rule, which constitutes the basis of a first expanded rule comprising the first conclusion event;
identifying as the unresolved event a condition event of the first expanded rule corresponding to the relevant identified condition event; and
identifying as the risk site any one or more monitoring-target devices from among a monitoring-target device related to the relevant identified unresolved event, and a monitoring-target device comprising a coupling relationship with a monitoring-target device, which is related to the relevant identified unresolved event.

11. A computer program according to claim 10, wherein, in a case where a general plan, which corresponds to a general rule constituting the basis of a first expanded rule comprising the first conclusion event, is a volume migration, this computer program causing a computer to execute:
creating a first expanded plan related to a volume migration, which regards a monitoring-target device, which is a volume related to any condition event and conclusion event of the first expanded rule, as the migration-source volume, and regards a monitoring-target device, which is a volume comprising a coupling relationship with the migration-source volume, as a migration-destination volume;
computing, with respect to the first expanded plan and based on an I/O response time for the migration-source volume and the migration-destination volume, a predicted value for the I/O response time for the migration-source volume and the migration-destination volume after the first expanded plan has been implemented; and
displaying the I/O response time predicted value.

12. A computer program according to claim 9, which causes a computer to execute:
computing, with respect to each of the created one or more expanded plans and based on a performance value related to a monitoring-target device, which is related to the relevant expanded plan, a predicted value for a performance value after implementation of the relevant expanded plan related to a monitoring-target device, which is related to the relevant expanded plan; and
further displaying the predicted value of the performance value.

13. A computer program according to claim 9, which causes a computer to execute:
consolidating either the same or similar multiple expanded plans from among the created one or more expanded plans into a single expanded plan; and
displaying data showing the consolidated expanded plan.

14. A computer program according to claim 9, wherein the computer program causes a computer to execute:
further displaying, based on maintenance schedule information, which shows a schedule of maintenance operations to be performed for any of the multiple monitoring-target devices, data showing the schedule of maintenance operations to be performed for a monitoring-target device, which is related to the expanded plan.

15. A computer program according to claim 9, which causes a computer to execute:
computing, with respect to each of the created one or more expanded plans and based on cost information showing, with respect to each of the one or more general plans, the cost required for implementing the relevant general plan, the cost required for implementing the relevant expanded plan; and
further displaying the computed cost.

* * * * *